(12) United States Patent
Hamamoto et al.

(10) Patent No.: US 9,878,593 B2
(45) Date of Patent: Jan. 30, 2018

(54) VEHICLE AIR CONDITIONER

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Osaka (JP); Katsuyoshi Wakano, Osaka (JP)

(73) Assignees: JAPAN CLIMATE SYSTEMS CORPORATION, Hiroshima (JP); Panasonic Corporation, Osaka (JP)

( * ) Notice: Subject to any disclaimer, the term of this patent is extended or adjusted under 35 U.S.C. 154(b) by 398 days.

(21) Appl. No.: 14/462,874

(22) Filed: Aug. 19, 2014

(65) Prior Publication Data

US 2014/0352341 A1 Dec. 4, 2014

Related U.S. Application Data

(63) Continuation of application No. PCT/JP2013/001130, filed on Feb. 26, 2013.

(30) Foreign Application Priority Data

Feb. 28, 2012 (JP) .................................. 2012-041417
Feb. 28, 2012 (JP) .................................. 2012-041421
(Continued)

(51) Int. Cl.
*B60H 1/00* (2006.01)
*B60H 1/32* (2006.01)
(Continued)

(52) U.S. Cl.
CPC ..... *B60H 1/00907* (2013.01); *B60H 1/00321* (2013.01); *B60H 1/00921* (2013.01);
(Continued)

(58) Field of Classification Search
CPC ....................... B60H 1/00907; B60H 1/00321; B60H 1/321; B60H 1/3213; B60H 1/323;
(Continued)

(56) References Cited

U.S. PATENT DOCUMENTS 3,572,052 A * 3/1971 Toth ...................... A47F 3/0443
62/155
5,180,004 A * 1/1993 Nguyen ............... B60H 1/3227
165/135
(Continued)

FOREIGN PATENT DOCUMENTS

JP S62-218769 A 9/1987
JP H07-096739 A 4/1995
(Continued)

OTHER PUBLICATIONS

International Search Report; PCT/JP2013/001130; dated Jun. 18, 2013.

*Primary Examiner* — Dominick L Plakkoottam
*Assistant Examiner* — Kirstin Oswald
(74) *Attorney, Agent, or Firm* — Studebaker & Brackett PC

(57) ABSTRACT

A heat pump device includes an air conditioning control device configured to switch the heat pump device among a plurality of operation modes including an air-heating operation mode in which an indoor heat exchanger serves as a radiator and an outdoor heat exchanger serves as a heat absorber, and an air-cooling operation mode in which the indoor heat exchanger serves as a heat absorber and the outdoor heat exchanger serves as a radiator. The air condi- (Continued)

tioning control device switch a refrigerant pipe such that refrigerant is, in the air-cooling operation mode, supplied to part of the outdoor heat exchanger serving as a refrigerant inlet in the air-heating operation mode.

2 Claims, 33 Drawing Sheets

(30) Foreign Application Priority Data

Mar. 22, 2012 (JP) ................................ 2012-065634
Jun. 5, 2012 (JP) ................................ 2012-128250

(51) Int. Cl.
*B60H 1/22* (2006.01)
*F25B 6/04* (2006.01)
*F25B 5/04* (2006.01)
*F25B 41/04* (2006.01)
*F25B 47/02* (2006.01)

(52) U.S. Cl.
CPC ............. *B60H 1/22* (2013.01); *B60H 1/321* (2013.01); *B60H 1/323* (2013.01); *B60H 1/3213* (2013.01); *F25B 5/04* (2013.01); *F25B 6/04* (2013.01); *F25B 41/04* (2013.01); *F25B 47/022* (2013.01); *B60H 2001/00942* (2013.01); *B60H 2001/2271* (2013.01); *F25B 2313/0315* (2013.01); *F25B 2341/0662* (2013.01); *F25B 2347/023* (2013.01); *F25B 2700/11* (2013.01)

(58) Field of Classification Search
CPC ................ B60H 1/00921; B60H 1/22; B60H 2001/00942; B60H 2001/2271; F25B 5/04; F25B 41/04; F25B 47/022; F25B 6/04; F25B 2700/11; F25B 2341/0662; F25B 2313/0315; F25B 2347/023

USPC ............................. 62/243, 244, 278, 324.6
See application file for complete search history.

(56) References Cited

U.S. PATENT DOCUMENTS

| | | | | | |
|---|---|---|---|---|---|
| 5,299,431 | A | * | 4/1994 | Iritani | B60H 1/00021 62/159 |
| 5,325,912 | A | * | 7/1994 | Hotta | B60H 1/00392 165/204 |
| 5,330,385 | A | * | 7/1994 | Hotta | B60H 1/00392 165/42 |
| 5,598,887 | A | | 2/1997 | Ikeda et al. | |
| 6,347,528 | B1 | | 2/2002 | Iritani et al. | |
| 6,568,199 | B1 | | 5/2003 | Manohar et al. | |
| 2001/0003311 | A1 | * | 6/2001 | Karl | B60H 1/00921 165/202 |
| 2001/0020529 | A1 | * | 9/2001 | Karl | B60H 1/00007 165/202 |
| 2009/0120610 | A1 | * | 5/2009 | Coyle | B60H 1/00321 165/67 |

FOREIGN PATENT DOCUMENTS

| | | |
|---|---|---|
| JP | H07-232547 A | 9/1995 |
| JP | H09-240266 A | 9/1997 |
| JP | H10-044758 A | 2/1998 |
| JP | H10-100663 A | 4/1998 |
| JP | 2000-203249 A | 7/2000 |
| JP | 2001-030744 A | 2/2001 |
| JP | 2003-222414 A | 8/2003 |
| JP | 2004-182168 A | 7/2004 |
| JP | 2005-343285 A | 12/2005 |
| JP | 2011-005983 A | 1/2011 |
| JP | 2011-255734 A | 12/2011 |
| JP | 2011-255735 A | 12/2011 |

* cited by examiner

DEFROSTING OPERATION MODE UNDER EXTREMELY-LOW
OUTDOOR AIR TEMPERATURE

— HIGH-PRESSURE REFRIGERANT
= LOW-PRESSURE REFRIGERANT

VEHICLE AIR CONDITIONER

CROSS-REFERENCE TO RELATED APPLICATIONS

This is a continuation of International Application No. PCT/JP2013/001130 filed on Feb. 26, 2013, which claims priority to Japanese Patent Application No. 2012-041417 filed on Feb. 28, 2012, Japanese Patent Application No. 2012-041421 filed on Feb. 28, 2012, Japanese Patent Application No. 2012-065634 filed on Mar. 22, 2012, and Japanese Patent Application No. 2012-128250 filed on Jun. 5, 2012. The entire disclosures of these applications are incorporated by reference herein.

BACKGROUND

The present disclosure relates to a vehicle air conditioner mounted on a vehicle.

Conventionally, e.g., air conditioners each including a heat pump device have been known as air conditioners mounted on hybrid vehicles, electric vehicles, etc. These heat pump devices for vehicles are each configured such that an electric compressor, an outdoor heat exchanger disposed outside a vehicle compartment, an expansion valve, and an indoor heat exchanger disposed inside the vehicle compartment are connected together in this order through refrigerant pipes (see, e.g., Japanese Unexamined Patent Publication No. 2011-005983).

When the heat pump device is in an air-heating operation mode, refrigerant flows such that the indoor heat exchanger serves as a radiator and that the outdoor heat exchanger serves as a heat absorber. When the heat pump device is in an air-cooling operation mode, refrigerant flows such that the indoor heat exchanger serves as a heat absorber and that the outdoor heat exchanger serves as a radiator.

In Japanese Unexamined Patent Publication No. 2011-005983, the flow direction of refrigerant flowing through the outdoor heat exchanger in the air-heating operation mode is opposite to the flow direction of refrigerant flowing through the outdoor heat exchanger in the air-cooling operation mode.

For example, a vehicle air conditioner of Japanese Unexamined Patent Publication No. 2011-255735 includes an upstream indoor heat exchanger disposed on an upstream side in the flow direction of air, and a downstream indoor heat exchanger disposed on a downstream side in the flow direction of air. Moreover, a four-way valve is provided at a refrigerant pipe, and switches to switch operation modes such as an air-heating operation mode and an air-cooling operation mode.

The downstream indoor heat exchanger serves as a radiator in both of the air-heating operation mode and the air-cooling operation mode. On the other hand, the upstream indoor heat exchanger serves as a radiator in the air-heating operation mode, and serves as a heat absorber in the air-cooling operation mode.

As another example, a vehicle air conditioner of Japanese Unexamined Patent Publication No. H09-240266 includes, as indoor heat exchangers, an upstream indoor heat exchanger disposed on an upstream side in the flow direction of air, and a downstream indoor heat exchanger disposed on a downstream side in the flow direction of air. The downstream indoor heat exchanger serves as a radiator in both of an air-heating operation mode and an air-cooling operation mode. On the other hand, the upstream indoor heat exchanger serves as a heat absorber in both of the air-heating operation mode and the air-cooling operation mode.

Since strong air-heating is required for the air-heating operation mode particularly under low outdoor air temperature, there is a possibility that an air-heating capacity becomes insufficient when the upstream indoor heat exchanger serves as the heat absorber in the air-heating operation mode as described in Japanese Unexamined Patent Publication No. H09-240266.

In view of the foregoing, the upstream indoor heat exchanger may serve as a radiator in the air-heating operation mode as described in, e.g., Japanese Unexamined Patent Publication No. 2011-255735. That is, the refrigerant pipes are connected such that refrigerant discharged from the compressor flows through the upstream indoor heat exchanger after flowing through the downstream indoor heat exchanger. This allows air heated by the upstream indoor heat exchanger to be re-heated in the downstream indoor heat exchanger, and therefore there is an advantage that the air-heating capacity can be improved. On the other hand, since depressurized refrigerant is, in the air-cooling operation mode, supplied to the upstream indoor heat exchanger to cause the upstream indoor heat exchanger to serve as the heat absorber, air-cooling can be also performed.

SUMMARY

Since it is difficult to ensure a broad mounting space for a heat exchanger mounted on a vehicle, a need is growing in size reduction of the heat exchanger. However, the size reduction of the heat exchanger results in a decrease in heat transfer area, and therefore heat exchange performance is lowered.

Thus, the internal structure of the heat exchanger may be devised so that the flow of refrigerant in the heat exchanger can be optimized and that refrigerant flowing into the heat exchanger can be distributed to tubes as uniform as possible to promote heat exchange between outdoor air and the refrigerant. This allows both of size reduction of the heat exchanger and improvement of the heat exchange performance of the heat exchanger.

However, when the flow direction of refrigerant flowing through the outdoor heat exchanger is, as described in Japanese Unexamined Patent Publication No. 2011-005983, different between the air-heating operation mode and the air-cooling operation mode, if the refrigerant flows in an inappropriate opposite direction, even the foregoing internal structure configured considering distribution of refrigerant flowing into the heat exchanger may adversely influence the refrigerant distribution.

That is, both of the heat absorption performance of the outdoor heat exchanger in the air-heating operation mode and the heat dissipation performance of the outdoor heat exchanger in the air-cooling operation mode cannot be realized at a high level.

First to third aspects of the present disclosure have been made in view of the foregoing, and a first object of the present disclosure is to realize high heat exchange performance with favorable refrigerant distribution in an outdoor heat exchanger even in any of an air-heating operation mode and an air-cooling operation mode.

When an upstream indoor heat exchanger serves as a radiator depending on an operation mode, high-temperature refrigerant flows into the upstream indoor heat exchanger. On the other hand, when the upstream indoor heat exchanger serves as a heat absorber, low-temperature refrigerant flows into the upstream indoor heat exchanger.

For example, when high-temperature refrigerant flows into the upstream indoor heat exchanger in the air-heating operation mode, the high-temperature refrigerant flows through a refrigerant pipe connected to the upstream indoor heat exchanger, and therefore the refrigerant pipe is heated. When the operation mode is switched from the air-heating operation mode to the air-cooling operation mode in this state, low-temperature refrigerant flows through the refrigerant pipe heated with the high-temperature refrigerant. When the low-temperature refrigerant flows through the pre-heated refrigerant pipe as just described, the low-temperature refrigerant is heated, resulting in thermal loss.

When the operation mode is switched from the air-cooling operation mode to the air-heating operation mode, high-temperature refrigerant flows through a refrigerant pipe cooled with low-temperature refrigerant. As a result, thermal loss also occurs in this case.

Due to thermal loss, extra power of a compressor is consumed, and this causes a delay in start-up of air-cooling and air-heating. Consequently, passenger's comfort may be lowered.

Fourth and fifth aspects of the present disclosure have been made in view of the foregoing, and a second object of the present disclosure is to reduce thermal loss in switching of an operation mode of a heat pump device to save energy and improve passenger's comfort.

According to the vehicle air conditioner of Japanese Unexamined Patent Publication No. 2011-255735, since high-pressure refrigerant discharged from the compressor is depressurized and flows into the upstream indoor heat exchanger only in the case of the air-cooling operation mode, the pressure capacity and repetitive compression strength of the upstream indoor heat exchanger can be lower than those of the downstream indoor heat exchanger.

However, according to Japanese Unexamined Patent Publication No. 2011-255735, the upstream indoor heat exchanger serves as the radiator in order to improve the air-heating capacity in the air-heating operation mode. Thus, since high-pressure refrigerant discharged from the compressor flows into the upstream indoor heat exchanger, it is necessary to improve the pressure capacity etc. of the upstream indoor heat exchanger, resulting in a cost increase.

Sixth to eighth aspects of the present disclosure have been made in view of the foregoing, and a third object of the present disclosure is to, in the case where both of two heat exchangers arranged inside a vehicle compartment serve as radiators in an air-heating operation mode and one of the heat exchangers serves as a heat absorber in an air-cooling operation mode, realize low pressure capacity and low repetitive compression strength of the heat exchanger serving as the heat absorber in the air-cooling operation mode to reduce cost.

According to the vehicle air conditioner of Japanese Unexamined Patent Publication No. 2011-255735, since high-pressure refrigerant discharged from the compressor is depressurized and flows into the upstream indoor heat exchanger only in the case of the air-cooling operation mode, the pressure capacity and repetitive compression strength of the upstream indoor heat exchanger can be lower than those of the downstream indoor heat exchanger.

However, according to Japanese Unexamined Patent Publication No. 2011-255735, the upstream indoor heat exchanger serves as the radiator in order to improve the air-heating capacity in the air-heating operation mode. Thus, since high-pressure refrigerant discharged from the compressor flows into the upstream indoor heat exchanger, it is necessary to improve the pressure capacity etc. of the upstream indoor heat exchanger, resulting in a cost increase.

Ninth and tenth aspects of the present disclosure have been made in view of the foregoing, and a fourth object of the present disclosure is to, in the case where both of two heat exchangers arranged inside a vehicle compartment serve as radiators in an air-heating operation mode and one of the heat exchangers serves as a heat absorber in an air-cooling operation mode, realize low pressure capacity and low repetitive compression strength of the heat exchanger serving as the heat absorber in the air-cooling operation mode to reduce cost.

In order to accomplish the first object, a refrigerant inlet side and a refrigerant outlet side of an outdoor heat exchanger are, in a first aspect of the disclosure, not switched depending on an operation mode.

The first aspect of the disclosure is intended for a vehicle air conditioner including a heat pump device including a compressor configured to compress refrigerant, an indoor heat exchanger disposed inside a vehicle compartment, and an outdoor heat exchanger disposed outside the vehicle compartment; and an indoor air conditioning unit housing the indoor heat exchanger, including an air blower configured to send air-conditioning air to the indoor heat exchanger, and configured to generate conditioned air to supply the conditioned air into the vehicle compartment. The heat pump device further includes an air conditioning control device capable of switching the heat pump device among a plurality of operation modes including an air-heating operation mode in which the indoor heat exchanger serves as a radiator and the outdoor heat exchanger serves as a heat absorber, and an air-cooling operation mode in which the indoor heat exchanger serves as a heat absorber and the outdoor heat exchanger serves as a radiator. The air conditioning control device is configured to switch a refrigerant flow path such that refrigerant is, in the air-cooling operation mode, supplied to part of the outdoor heat exchanger serving as a refrigerant inlet in the air-heating operation mode.

According to the foregoing configuration, refrigerant is supplied to the same refrigerant inlet of the outdoor heat exchanger between the air-heating operation mode and the air-cooling operation mode. Thus, in, e.g., the case where a refrigerant distribution structure suitable for causing the outdoor heat exchanger to serve as the heat absorber in the air-heating operation mode is provided at the outdoor heat exchanger, refrigerant can also flow, in the air-cooling operation mode, in the same direction as that of the air-heating operation mode in the outdoor heat exchanger. Thus, favorable refrigerant distribution can be realized using such a distribution structure.

A second aspect of the disclosure is intended for the vehicle air conditioner of the first aspect of the disclosure, in which the heat pump device includes a first indoor heat exchanger disposed inside the vehicle compartment, and a second indoor heat exchanger disposed upstream of the first indoor heat exchanger in a flow direction of air in the vehicle compartment, the first and second indoor heat exchangers are housed in the indoor air conditioning unit, the air blower is configured to send air-conditioning air to the first and second indoor heat exchangers, the air conditioning control device switches the heat pump device among an air-heating operation mode in which the first and second indoor heat exchangers serve as radiators and the outdoor heat exchanger serves as a heat absorber, a dehumidification air-heating operation mode in which the first indoor heat exchanger serves as a radiator and the second indoor heat exchanger and the outdoor heat exchanger serve as heat absorbers, an air-cooling operation mode in which the first indoor heat exchanger serves as a radiator, the second indoor heat exchanger serves as a heat absorber, and the outdoor heat exchanger serves as a radiator, a first defrosting operation mode in which high-pressure refrigerant discharged from the compressor is guided to the outdoor heat exchanger while the first and second indoor heat exchangers remain as the radiators, and a second defrosting operation mode in which high-pressure refrigerant discharged from the compressor is guided to the outdoor heat exchanger while the first indoor heat exchanger remains as the radiator and the second indoor heat exchanger remains as the heat absorber, and the air conditioning control device switches the refrigerant flow path such that refrigerant is, in the dehumidification air-heating operation mode, the first defrosting operation mode, and the second defrosting operation mode, supplied to the part of the outdoor heat exchanger serving as the refrigerant inlet in the air-heating operation mode.

According to the foregoing configuration, refrigerant can flow in the same direction in the outdoor heat exchanger not only in the air-heating operation mode and the air-cooling operation mode but also in the dehumidification air-heating operation mode, the first defrosting operation mode, and the second defrosting operation mode. Thus, favorable refrigerant distribution can be realized using such a distribution structure.

A third aspect of the disclosure is intended for the vehicle air conditioner of the second aspect of the disclosure, in which the air conditioning control device is configured to switch the heat pump device to the first defrosting operation mode by using a refrigerant pipe identical to a refrigerant pipe used in the air-heating operation mode, and switch the heat pump device to the second defrosting operation mode by using a refrigerant pipe identical to a refrigerant pipe used in the dehumidification air-heating operation mode.

According to the foregoing configuration, the refrigerant pipe is not switched before and after the air-heating operation mode is switched to the first defrosting operation mode and the dehumidification air-heating operation mode is switched to the second defrosting operation mode. Thus, useless heat dissipation and heat absorption of refrigerant due to switching of the refrigerant pipe do not occur.

In order to accomplish the second object, the pipe through which low-temperature refrigerant is supplied to the indoor heat exchanger and the pipe through which high-temperature refrigerant is supplied to the indoor heat exchanger are, in a fourth aspect of the disclosure, differentiated from each other, and are switched depending on the operation mode.

The fourth aspect of the disclosure is intended for a vehicle air conditioner including a heat pump device including a compressor configured to compress refrigerant, an indoor heat exchanger disposed inside a vehicle compartment, and an outdoor heat exchanger disposed outside the vehicle compartment, and configured such that the compressor, the indoor heat exchanger, and the outdoor heat exchanger are connected together in a circular shape through a refrigerant pipe; and an indoor air conditioning unit housing the indoor heat exchanger, including an air blower configured to send air-conditioning air to the indoor heat exchanger, and configured to generate conditioned air to supply the conditioned air into the vehicle compartment. The refrigerant pipe includes a low-temperature refrigerant-dedicated pipe connected to the indoor heat exchanger and configured to supply only low-temperature refrigerant to the indoor heat exchanger, and a high-temperature refrigerant-dedicated pipe connected to the indoor heat exchanger and configured to supply only high-temperature refrigerant to the indoor heat exchanger. The heat pump device further includes an air conditioning control device configured to switch the heat pump device among a plurality of operation modes including an air-heating operation mode in which the indoor heat exchanger serves as a radiator and the outdoor heat exchanger serves as a heat absorber, and an air-cooling operation mode in which the indoor heat exchanger serves as a heat absorber and the outdoor heat exchanger serves as a radiator, and a flow path switching device configured to switch a refrigerant flow path such that refrigerant flows through the high-temperature refrigerant-dedicated pipe in the air-heating operation mode and that refrigerant flows through the low-temperature refrigerant-dedicated pipe in the air-cooling operation mode.

According to the foregoing configuration, in the air-heating operation mode, high-temperature is supplied to the indoor heat exchanger through the high-temperature refrigerant-dedicated pipe. On the other hand, in the air-cooling operation mode, low-temperature refrigerant is supplied to the indoor heat exchanger through the low-temperature refrigerant-dedicated pipe.

Thus, when the heat pump device is switched from the air-heating operation mode to the air-cooling operation mode, low-temperature refrigerant can be supplied to the indoor heat exchanger in an unchanged form without the low-temperature flowing through the high-temperature refrigerant pipe through which high-temperature refrigerant flows before switching of the operation mode. Thus, occurrence of thermal loss is reduced. Moreover, when the heat pump device is switched from the air-cooling operation mode to the air-heating operation mode, high-temperature refrigerant can be supplied to the indoor heat exchanger in an unchanged form without the high-temperature flowing through the low-temperature refrigerant pipe through which low-temperature refrigerant flows before switching of the operation mode. Thus, occurrence of thermal loss is reduced.

A fifth aspect of the disclosure is intended for the vehicle air conditioner of the fourth aspect of the disclosure, in which the indoor heat exchanger includes an upstream path positioned on an upstream side in a flow direction of outdoor air, and a downstream path positioned downstream of the upstream path in the flow direction of outdoor air, and the upstream path is connected to a downstream side of the downstream path in a flow direction of refrigerant.

According to the foregoing configuration, in the air-cooling operation mode, low-temperature refrigerant is supplied to the downstream path in the flow direction of air. After the refrigerant flows through the downstream path, the refrigerant flows through the upstream path in the flow direction of air. Since the flow of refrigerant in the indoor heat exchanger is countercurrent to the flow of outdoor air, air-cooling can be efficiently performed, and air-cooling performance is improved.

Moreover, since the flow of high-temperature refrigerant is countercurrent to the flow of outdoor air in the air-heating operation mode, air-heating can be efficiently performed, and air-heating performance is improved.

In order to accomplish the third object, refrigerant depressurized to the extent that a heat exchanger serving as a heat absorber in an air-cooling operation mode can serve as a radiator in an air-heating operation mode flows, in a sixth aspect of the disclosure, into the heat exchanger serving as the heat absorber in the air-cooling operation mode.

The sixth aspect of the disclosure is intended for a vehicle air conditioner including a heat pump device including a compressor configured to compress refrigerant, a first indoor heat exchanger disposed inside a vehicle compartment, a second indoor heat exchanger disposed upstream of the first indoor heat exchanger in a flow direction of air in the vehicle compartment, an outdoor heat exchanger disposed outside the vehicle compartment, and an expansion valve, and configured such that the compressor, the first and second indoor heat exchangers, the expansion valve, and the outdoor heat exchanger are connected together through a refrigerant pipe; an indoor air conditioning unit housing the first and second indoor heat exchangers, including an air blower configured to send air-conditioning air to the first and second indoor heat exchangers, and configured to generate conditioned air to supply the conditioned air into the vehicle compartment; and an air conditioning control device configured to control the heat pump device and the indoor air conditioning unit. A pressure reduction device disposed between the first and second indoor heat exchangers and configured to reduce pressure of refrigerant flowing into the second indoor heat exchanger is provided at the heat pump device. The air conditioning control device is configured to switch an operation mode of the heat pump device among a plurality of operation modes including an air-cooling operation mode in which the second indoor heat exchanger serves as a heat absorber and the first indoor heat exchanger and the outdoor heat exchanger serve as radiators, and an air-heating operation mode in which the first and second indoor heat exchangers serve as radiators and the outdoor heat exchanger serves as a heat absorber. In the air-heating operation mode, the pressure reduction device is in a pressure reduction state, and a pressure reduction degree of the pressure reduction device is set such that the second indoor heat exchanger serves as the radiator.

According to the foregoing configuration, in the air-heating operation mode, refrigerant depressurized by the pressure reduction device flows into the second indoor heat exchanger. Since the pressure reduction degree is set such that the second indoor heat exchanger serves as the radiator, both of the first and second indoor heat exchangers serve as the radiators. Thus, a sufficient air-heating capacity in the air-heating operation mode can be realized.

As just described, since refrigerant depressurized by the pressure reduction device flows into the second indoor heat exchanger, the pressure capacity and repetitive compression strength of the second indoor heat exchanger can be low.

The refrigerant pipe may include a connection pipe connecting between a refrigerant outlet side of the first indoor heat exchanger and a refrigerant inlet side of the second indoor heat exchanger, and the pressure reduction device may be provided at the connection pipe.

According to the foregoing configuration, after high-pressure refrigerant discharged from the compressor flows into the first indoor heat exchanger, the refrigerant flows into the second indoor heat exchanger through the connection pipe. Thus, the surface temperature of the first indoor heat exchanger is higher than that of the second indoor heat exchanger. In the air-heating operation mode, after air-conditioning air passes through the second indoor heat exchanger, the air-conditioning air passes through the first indoor heat exchanger. Since the temperature of the first indoor heat exchanger is higher than that of the second indoor heat exchanger, the air-conditioning air can be sufficiently heated on the downstream side in the flow direction of air. In this case, refrigerant depressurized by the pressure reduction device provided at the connection pipe can flow into the second indoor heat exchanger.

The refrigerant pipe may include a high-pressure refrigerant pipe which is connected to the refrigerant inlet side of the second indoor heat exchanger and through which high-pressure refrigerant flows, and a low-pressure refrigerant pipe which is connected to the refrigerant inlet side of the second indoor heat exchanger and through which low-pressure refrigerant flows. The heat pump device may include a refrigerant flow path switching device configured to select the refrigerant pipe such that refrigerant flows into the second indoor heat exchanger through one of the high-pressure refrigerant pipe and the low-pressure refrigerant pipe. The refrigerant flow path switching device may include a high-pressure on-off valve configured to open/close the high-pressure refrigerant pipe, and a low-pressure on-off valve configured to open/close the low-pressure refrigerant pipe. The pressure reduction device may be built in the high-pressure on-off valve.

According to the foregoing configuration, the pressure reduction device is built in the high-pressure on-off valve forming the refrigerant flow path switching device configured to select the high-pressure refrigerant pipe or the low-pressure refrigerant pipe. Thus, the number of components can be reduced, as well as reducing the number of joint parts among the refrigerant pipes.

A seventh aspect of the disclosure is intended for the vehicle air conditioner of the sixth aspect of the disclosure, in which the pressure reduction degree of the pressure reduction device is changed depending on pressure of refrigerant flowing into the second indoor heat exchanger.

According to the foregoing configuration, the internal pressure of the second indoor heat exchanger can be equal to or less than a certain value. This enhances the reliability of the second indoor heat exchanger, and stabilizes the air-heating capacity of the second indoor heat exchanger.

An eighth aspect of the disclosure is intended for the vehicle air conditioner of the sixth or seventh aspect of the disclosure, in which, when the pressure reduction degree of the pressure reduction device is minimum, if the pressure of refrigerant flowing into the second indoor heat exchanger increases, the air conditioning control device decreases a discharge amount of the compressor of the heat pump device.

According to the foregoing configuration, the discharge amount of the compressor is decreased when the pressure of refrigerant flowing into the second indoor heat exchanger after the pressure reduction degree of the pressure reduction device is adjusted. Thus, a change in energy amount consumed by the compressor can be reduced. In addition, an increase in internal pressure of the second indoor heat exchanger can be reduced.

In order to accomplish the fourth object, the flow of refrigerant is, in a ninth aspect of the disclosure, controlled such that the internal pressure of an indoor heat exchanger serving as a heat absorber in an air-cooling operation mode and serving as a radiator in an air-heating operation mode does not exceed predetermined pressure in the air-heating operation mode.

The ninth aspect of the disclosure is intended for a vehicle air conditioner including a heat pump device including a compressor configured to compress refrigerant, a first indoor heat exchanger disposed inside a vehicle compartment, a second indoor heat exchanger disposed upstream of the first indoor heat exchanger in a flow direction of air in the vehicle compartment, an outdoor heat exchanger disposed outside the vehicle compartment, and an expansion valve, and configured such that the compressor, the first and second indoor heat exchangers, the expansion valve, and the outdoor heat exchanger are connected together through a refrigerant pipe; an indoor air conditioning unit housing the first and second indoor heat exchangers, including an air blower configured to send air-conditioning air to the first and second indoor heat exchangers, and configured to generate conditioned air to supply the conditioned air into the vehicle compartment; and an air conditioning control device configured to control the heat pump device and the indoor air conditioning unit. The air conditioning control device is configured to switch an operation mode of the heat pump device among a plurality of operation modes including an air-cooling operation mode in which the second indoor heat exchanger serves as a heat absorber and the first indoor heat exchanger and the outdoor heat exchanger serve as radiators, and an air-heating operation mode in which the first and second indoor heat exchangers serve as radiators and the outdoor heat exchanger serves as a heat absorber. The heat pump device further includes a refrigerant inlet which is connected to the first indoor heat exchanger and into which refrigerant flows from the first indoor heat exchanger, a non-air-heating-side refrigerant outlet which is connected to part of the heat pump device other than the second indoor heat exchanger and through which refrigerant flows into the part of the heat pump device, and a switching valve configured to cause, in the air-heating operation mode, the refrigerant inlet and the non-air-heating-side refrigerant outlet to communicate with each other when internal pressure of the second indoor heat exchanger reaches predetermined pressure.

According to the foregoing configuration, in the air-heating operation mode, since refrigerant flowing out from the first indoor heat exchanger flows into the second indoor heat exchanger, both of the first and second indoor heat exchangers serve as the radiators. Thus, a sufficient air-heating capacity in the air-heating operation mode can be realized.

In the air-heating operation mode, when the internal pressure of the second indoor heat exchanger reaches the predetermined pressure, the switching valve causes the refrigerant inlet and the non-air-heating-side refrigerant outlet to communicate with each other. Thus, refrigerant flowing out from the first indoor heat exchanger flows into the part of the heat pump device other than the second indoor heat exchanger. This prevents the internal pressure of the second indoor heat exchanger from exceeding the predetermined pressure, and therefore the pressure capacity and repetitive compression strength of the second indoor heat exchanger can be low.

The switching valve may be a mechanical valve opened/closed by the pressure of refrigerant on an refrigerant inlet side of the second indoor heat exchanger.

According to the foregoing configuration, a control device etc. for controlling the switching valve is not necessarily provided, and a simple configuration can prevent the internal pressure of the second indoor heat exchanger from exceeding the predetermined pressure.

The heat pump device may include a pressure sensor configured to determine the pressure of refrigerant on the refrigerant inlet side of the second indoor heat exchanger. When it is, based on the refrigerant pressure determined by the pressure sensor, determined that the internal pressure of the second indoor heat exchanger reaches the predetermined pressure, the air conditioning control device may control the switching valve such that refrigerant flowing into the refrigerant inlet flows through the non-air-heating-side refrigerant outlet.

According to the foregoing configuration, since the internal pressure of the second indoor heat exchanger can be finely controlled, both of high air-heating performance and high durability of the second indoor heat exchanger can be realized.

A tenth aspect of the disclosure is intended for the vehicle air conditioner of the ninth aspect of the disclosure, in which the expansion valve of the heat pump device is disposed upstream of the outdoor heat exchanger in a flow direction of refrigerant, and the non-air-heating-side refrigerant outlet is connected to an upstream side of the expansion valve in the flow direction of refrigerant.

According to the foregoing configuration, it can be ensured that the pressure of refrigerant flowing out from the non-air-heating-side refrigerant outlet in the air-heating operation mode is reduced by the pressure reduction valve. Thus, while a sufficient amount of heat absorbed by the outdoor heat exchanger can be ensured in the air-heating operation mode, an increase in pressure of the entirety of the heat pump device can be reduced.

According to the first aspect of the disclosure, in the air-heating operation mode, refrigerant is supplied to the part of the outdoor heat exchanger serving as the refrigerant inlet. Thus, even in any of the air-heating operation mode and the air-cooling operation mode, high heat exchange performance can be realized with favorable refrigerant distribution in the outdoor heat exchanger.

According to the second aspect of the disclosure, even in any of the dehumidification air-heating operation mode and the defrosting operation modes, high heat exchange performance can be realized with favorable refrigerant distribution in the outdoor heat exchanger.

According to the third aspect of the disclosure, switching of the heat pump device between the air-heating operation mode and the first defrosting operation mode and switching of the heat pump device between the dehumidification air-heating operation mode and the second defrosting operation mode can be performed without switching the refrigerant pipe. Thus, useless heat dissipation and heat absorption of refrigerant do not occur, and a defrosting operation can be efficiently performed.

According to the fourth aspect of the disclosure, high-temperature refrigerant flows through the high-temperature refrigerant-dedicated pipe in the air-heating operation mode, and low-temperature refrigerant flows through the low-temperature refrigerant-dedicated pipe in the air-cooling operation mode. Thus, occurrence of thermal loss can be reduced. Moreover, energy can be saved, and passenger's comfort can be improved.

According to the fifth aspect of the disclosure, the flow of refrigerant in the indoor heat exchanger is a countercurrent in both of the air-cooling operation mode and the air-heating operation mode. Thus, air-cooling performance and air-heating performance can be enhanced.

According to the sixth aspect of the disclosure, the pressure reduction device configured to depressurize refrigerant flowing into the second indoor heat exchanger is provided between the first and second indoor heat exchangers, and is in the pressure reduction state in the air-heating operation mode. Accordingly, the second indoor heat exchanger serves as the radiator. This sufficiently increases the air-heating capacity in the air-heating operation mode. Moreover, the pressure capacity and repetitive compression strength of the second indoor heat exchanger serving as the heat absorber in the air-cooling operation mode can be low, and cost can be reduced.

According to the seventh aspect of the disclosure, the pressure reduction degree of the pressure reduction device is changed depending on the pressure of refrigerant flowing into the second indoor heat exchanger. Thus, the reliability of the second indoor heat exchanger can be enhanced, and the air-heating capacity of the second indoor heat exchanger can be stabilized.

According to the eighth aspect of the disclosure, the discharge amount of the compressor is decreased when the pressure of refrigerant flowing into the second indoor heat exchanger increases in the state in which the pressure reduction degree of the pressure reduction device is the minimum. Thus, a change in energy amount consumed by the compressor can be reduced, as well as reducing an increase in internal pressure of the second indoor heat exchanger.

According to the ninth aspect of the disclosure, in the air-heating operation mode in which the first and second indoor heat exchangers serve as the radiators, when the internal pressure of the second indoor heat exchanger reaches the predetermined pressure, refrigerant flows into the part of the heat pump device other than the second indoor heat exchanger. Thus, while the air-heating capacity in the air-heating operation mode can be sufficiently enhanced, the pressure capacity and repetitive compression strength of the second indoor heat exchanger serving as the heat absorber in the air-cooling operation mode can be low. Thus, cost can be reduced.

According to the tenth aspect of the disclosure, refrigerant flowing out from the non-air-heating-side refrigerant outlet is supplied to the pressure reduction valve. Thus, while a sufficient amount of heat absorbed by the outdoor heat exchanger can be ensured in the air-heating operation mode, air-heating performance can be enhanced. Moreover, an increase in pressure of the entirety of the heat pump device can be reduced.

DETAILED DESCRIPTION

Embodiments of the present disclosure will be described below in detail with reference to drawings. Note that the embodiments described below will be set forth merely for the purpose of preferred examples in nature, and are not intended to limit the scope, applications, and use of the disclosure.

First Embodiment

Figure 1:
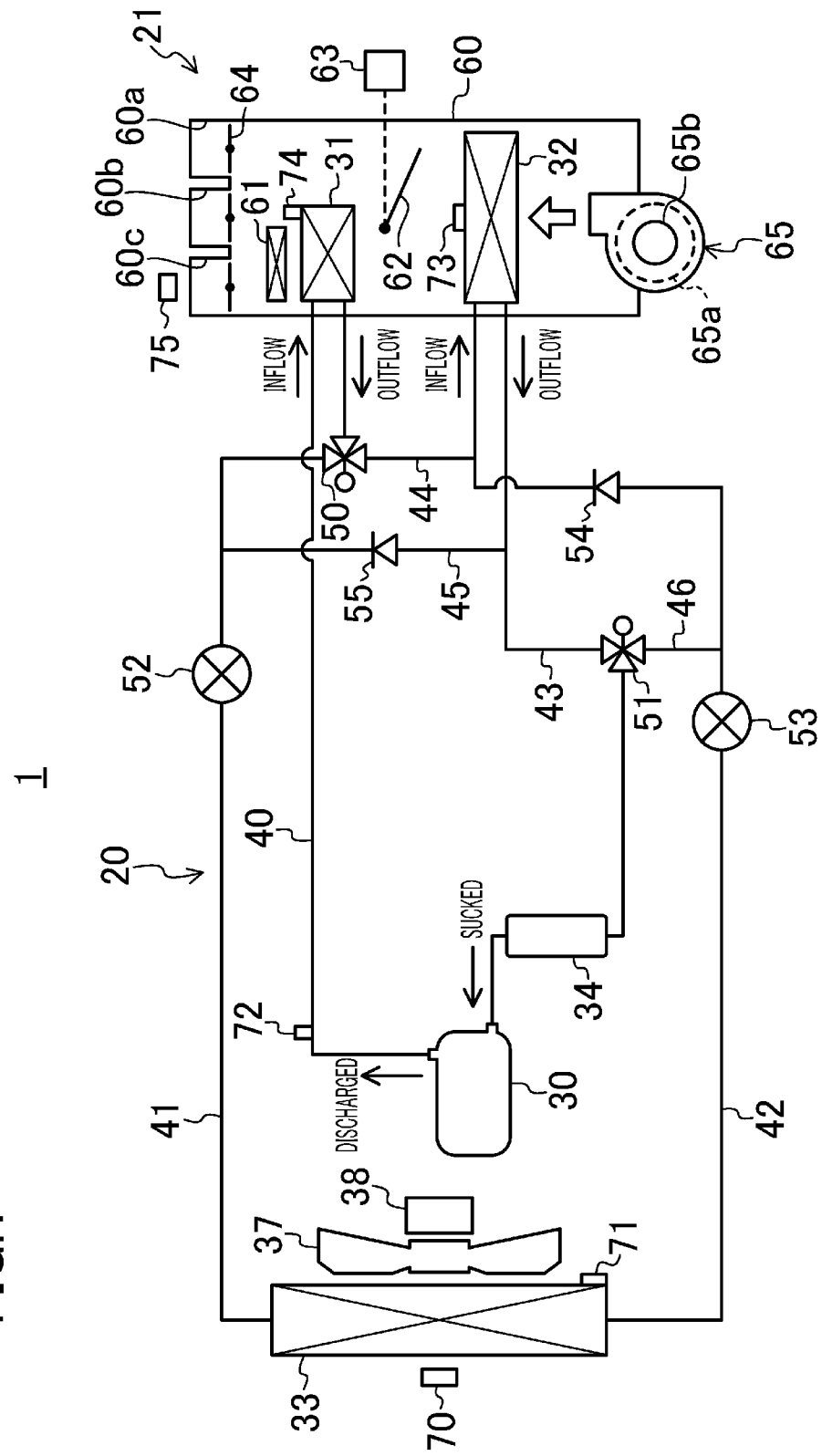
FIG. 1 is a schematic configuration diagram of a vehicle air conditioner of a first embodiment.

FIG. 1 is a schematic configuration diagram of a vehicle air conditioner 1 of a first embodiment (i.e., an embodiment of first to third aspects of the present disclosure) of the present disclosure. A vehicle on which the vehicle air conditioner 1 is mounted is an electric vehicle including a storage battery for running the vehicle and a motor for running the vehicle.

The vehicle air conditioner 1 includes a heat pump device 20, an indoor air conditioning unit 21, and an air conditioning control device 22 (illustrated in FIG. 2) configured to control the heat pump device 20 and the indoor air conditioning unit 21.

The heat pump device 20 includes an electric compressor 30 configured to compress refrigerant, a downstream indoor heat exchanger (first indoor heat exchanger) 31 disposed inside a vehicle compartment, an upstream indoor heat exchanger (second indoor heat exchanger) 32 disposed upstream of the downstream indoor heat exchanger 31 in the flow direction of air in the vehicle compartment, an outdoor heat exchanger 33 disposed outside the vehicle compartment, an accumulator 34, main refrigerant pipes 40-43 connecting the components 30-34 together, and first and third branched refrigerant pipes 44-46.

The electric compressor 30 is a conventional well-known electric compressor to be mounted on a vehicle, and is driven by an electric motor. The discharge amount of the electric compressor 30 per unit time can be changed in such a manner that the rotational speed of the electric compressor 30 is changed. The electric compressor 30 is connected to the air conditioning control device 22 such that ON/OFF of the electric compressor 30 and the rotational speed of the electric compressor 30 are controlled. Power is supplied from the storage battery to the electric compressor 30.

Figure 3:
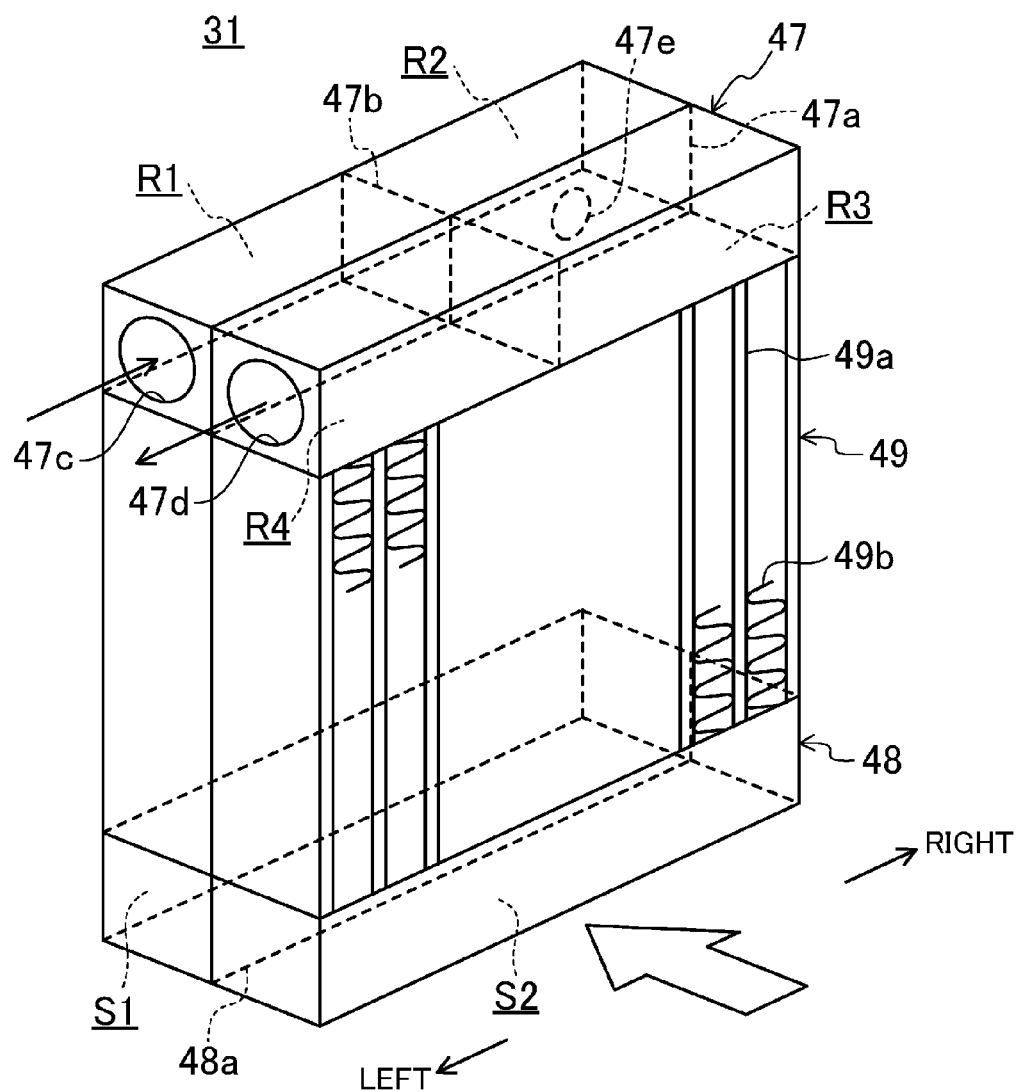
FIG. 3 is a perspective view of a downstream indoor heat exchanger from an upstream side in the flow direction of air.

Referring to FIG. 3, the downstream indoor heat exchanger 31 includes an upper header tank 47, a lower header tank 48, and a core 49. In the core 49, tubes 49a extending in the vertical direction and fins 49b extending in the vertical direction are integrated together so as to be alternately arranged in the horizontal direction (i.e., a right-left direction as viewed in FIG. 3). Air-conditioning air passes between each adjacent ones of the tubes 49a. The flow direction of air-conditioning air is indicated by a white arrow. The tubes 49a are arranged in two lines in the flow direction of air.

Upstream ones of the tubes 49a in the flow direction of air and downstream ones of the tubes 49a in the flow direction of air are, at upper ends thereof, connected to the upper header tank 47 so as to communicate with the upper header tank 47. A first divider 47a is provided, which is configured to divide an internal space of the upper header tank 47 into upstream and downstream spaces in the flow direction of air. The space of the upper header tank 47 upstream of the first divider 47a in the flow direction of air communicates with the upper ends of upstream ones of the tubes 49a, and the space of the upper header tank 47 downstream of the first divider 47a in the flow direction of air communicates with the upper ends of downstream ones of the tubes 49a.

A second divider 47b is provided, which is configured to divide the internal space of the upper header tank 47 into right and left spaces. A communication hole 47e is formed at part of the first divider 47a on the right side of the second divider 47b.

A refrigerant inlet 47c is formed at part of a left side surface of the upper header tank 47 on the downstream side in the flow direction of air, and a refrigerant outlet 47d is formed at part of the left side surface of the upper header tank 47 on the upstream side in the flow direction of air.

As in the first divider 47a of the upper header tank 47, a divider 48a is provided, which is configured to divide an internal space of the lower header tank 48 into upstream and downstream spaces in the flow direction of air. The space of the lower header tank 48 upstream of the divider 48a in the flow direction of air communicates with lower ends of upstream ones of the tubes 49a, and the space of the lower header tank 48 downstream of the divider 48a in the flow direction of air communicates with lower ends of downstream ones of the tubes 49a.

According to the foregoing configuration, the downstream indoor heat exchanger 31 has the total of four paths. That is, refrigerant flowing into the downstream indoor heat exchanger 31 through the refrigerant inlet 47c first flows into a space R1 formed on the downstream side of the first divider 47a of the upper header tank 47 in the flow direction of air and formed on the left side of the second divider 47b, and then flows downward in ones of the tubes 49a communicating with the space R1.

Subsequently, the refrigerant flows into a space S1 formed on the downstream side of the divider 48a of the lower header tank 48 in the flow direction of air to flow toward the right side, and then flows upward in ones of the tubes 49a. Then, the refrigerant flows into a space R2 formed on the downstream side of the first divider 47a of the upper header tank 47 in the flow direction of air and formed on the right side of the second divider 47b.

Next, the refrigerant in the space R2 passes through the communication hole 47e of the first divider 47a, and flows into a space R3 formed on the upstream side of the first divider 47a of the upper header tank 47 in the flow direction of air and formed on the right side of the second divider 47b. Then, the refrigerant flows downward in ones of the tubes 49a communicating with the space R3.

Subsequently, the refrigerant flows into a space S2 formed on the upstream side of the divider 48a of the lower header tank 48 in the flow direction of air to flow toward the left side, and then flows upward in ones of the tubes 49a. Then, the refrigerant flows into a space R4 formed on the upstream side of the first divider 47a of the upper header tank 47 in the flow direction of air and formed on the left side of the second divider 47b, and is discharged to the outside through the refrigerant outlet 47d.

The upstream indoor heat exchanger 32 is merely larger than the downstream indoor heat exchanger 31, and has a structure similar to that of the downstream indoor heat exchanger 31. Thus, the detailed description of the upstream indoor heat exchanger 32 will not be repeated.

Figure 4:
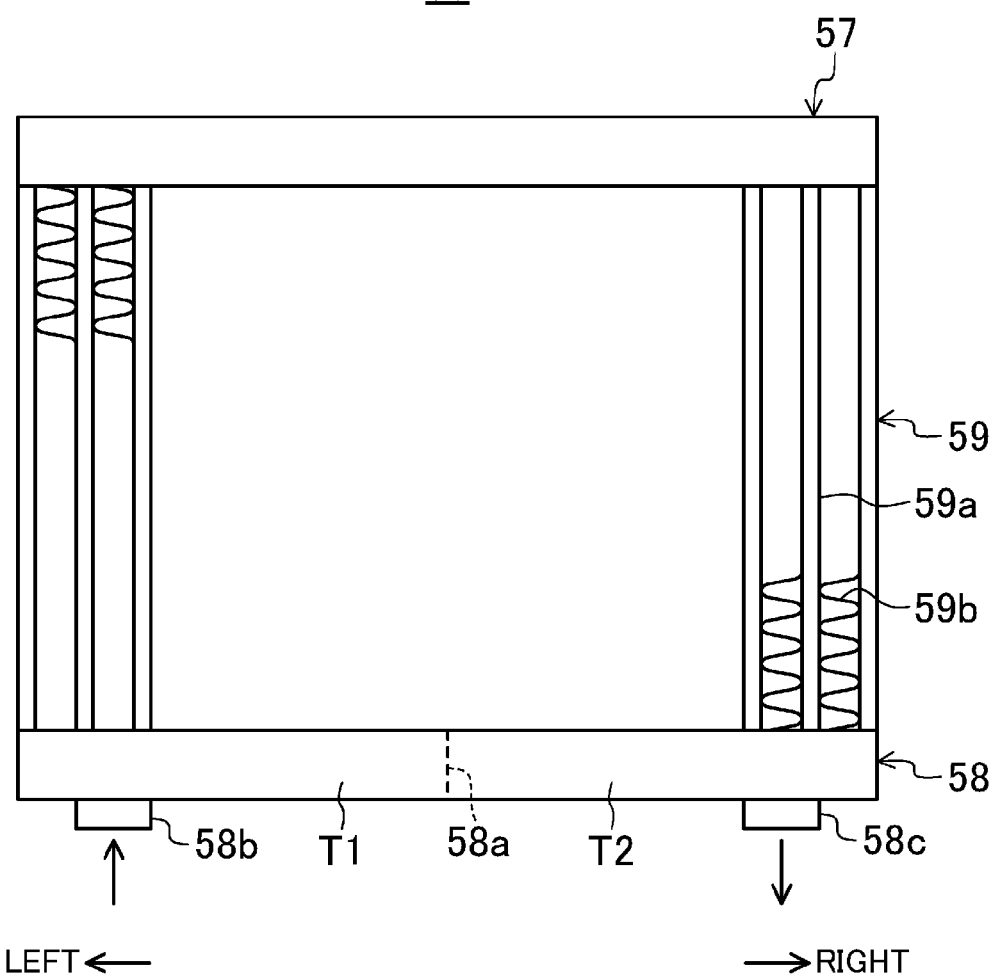
FIG. 4 is a front view of an outdoor heat exchanger.

The outdoor heat exchanger 33 is disposed near a front end in a motor room (equivalent to an engine room in an engine-driven vehicle) formed in a front part of the vehicle, and is exposed to traveling air. Referring to FIG. 4, the outdoor heat exchanger 33 includes an upper header tank 57, a lower header tank 58, and a core 59. In the core 59, tubes 59a extending in the vertical direction and fins 59b extending in the vertical direction are integrated together so as to be alternately arranged in the horizontal direction. Air-conditioning air passes between each adjacent ones of the tubes 59a.

The tubes 59a are, at upper ends thereof, connected to the upper header tank 57 so as to communicate with the upper header tank 57. The tubes 59a are, at lower ends thereof, connected to the lower header tank 58 so as to communicate with the lower header tank 58.

A divider 58a is provided, which is configured to divide an internal space of the lower header tank 58 into right and left spaces. An inlet pipe (refrigerant inlet) 58b through which refrigerant flows into the lower header tank 58 is provided on the left side at the lower header tank 58, and an outlet pipe 58c through which refrigerant flows out from the lower header tank 58 is provided on the right side at the lower header tank 58.

Thus, in the outdoor heat exchanger 33, refrigerant flowing into the outdoor heat exchanger 33 through the inlet pipe 58b flows into a space T1 formed on the left side of the divider 58*a* of the lower header tank 58, and then flows upward through ones of the tubes 59*a* communicating with the space T1. Subsequently, the refrigerant flows into the upper header tank 57 to flow toward the right side, and then flows downward in ones of the tubes 59*a*. Then, the refrigerant flows into a space T2 formed on the right side of the divider 58*a* of the lower header tank 58, and then flows out to the outside through the outlet pipe 58*c*.

Referring to FIG. 1, a cooling fan 37 is provided at the vehicle. The cooling fan 37 is driven by a fan motor 38, and is configured to send air to the outdoor heat exchanger 33. The fan motor 38 is connected to the air conditioning control device 22 such that ON/OFF of the fan motor 38 and the rotational speed of the fan motor 38 are controlled. Power is also supplied from the storage battery to the fan motor 38. Note that the cooling fan 37 is, e.g., a cooling fan capable of sending air to a radiator for cooling, e.g., an inverter for running the vehicle, and is operable under situations other than the situation where air conditioning is required.

The accumulator 34 is disposed near a suction port of the electric compressor 30 in the middle of the main refrigerant pipe 43.

The main refrigerant pipe 40 connects between a discharge port of the electric compressor 30 and the refrigerant inlet of the downstream indoor heat exchanger 31. Moreover, the main refrigerant pipe 41 connects between the refrigerant outlet of the downstream indoor heat exchanger 31 and the refrigerant inlet of the outdoor heat exchanger 33. The main refrigerant pipe 42 connects between the refrigerant outlet of the outdoor heat exchanger 33 and the refrigerant inlet of the upstream indoor heat exchanger 32. The main refrigerant pipe 43 connects between the refrigerant outlet of the upstream indoor heat exchanger 32 and the suction port of the electric compressor 30.

The first branched refrigerant pipe 44 is branched from the main refrigerant pipe 41, and is connected to the main refrigerant pipe 42. The second branched refrigerant pipe 45 is branched from the main refrigerant pipe 41, and is connected to the main refrigerant pipe 43. The third branched refrigerant pipe 46 is branched from the main refrigerant pipe 42, and is connected to the main refrigerant pipe 43.

The heat pump device 20 further includes a high-pressure flow path switching valve 50, a low-pressure flow path switching valve 51, a first expansion valve 52, a second expansion valve 53, a first check valve 54, and a second check valve 55.

The high-pressure flow path switching valve 50 and the low-pressure flow path switching valve 51 are electric three-way valves, and are controlled by the air conditioning control device 22. The high-pressure flow path switching valve 50 is provided in the middle of the main refrigerant pipe 41, and is connected to the first branched refrigerant pipe 44. The low-pressure flow path switching valve 51 is provided in the middle of the main refrigerant pipe 43, and is connected to the third branched refrigerant pipe 46.

The first expansion valve 52 and the second expansion valve 53 are electric valves, and are switchable between an expansion state in which a flow path is narrowed to expand refrigerant and a non-expansion state in which the flow path is opened so as not to expand refrigerant. The first expansion valve 52 and the second expansion valve 53 are controlled by the air conditioning control device 22. In the expansion state, the degree of opening of each of the first expansion valve 52 and the second expansion valve 53 is set depending on an air-conditioning load state.

The first expansion valve 52 is disposed at part of the main refrigerant pipe 41 closer to the outdoor heat exchanger 33 relative to the high-pressure flow path switching valve 50. The second expansion valve 53 is disposed at part of the main refrigerant pipe 42 closer to the outdoor heat exchanger 33 relative to the third branched refrigerant pipe 46.

The first check valve 54 is disposed at the main refrigerant pipe 42, and is configured to allow refrigerant to flow from the outdoor heat exchanger 33 toward the upstream indoor heat exchanger 32 in the main refrigerant pipe 42 and to prevent refrigerant from flowing in an opposite direction.

The second check valve 55 is disposed at the second branched refrigerant pipe 45, and is configured to allow refrigerant to flow from the main refrigerant pipe 43 toward the main refrigerant pipe 41 in the second branched refrigerant pipe 45 and to prevent refrigerant from flowing in an opposite direction.

The indoor air conditioning unit 21 includes a casing 60 housing the downstream indoor heat exchanger 31 and the upstream indoor heat exchanger 32, an air heater 61 housed in the casing 60, an air mix door (temperature adjustment door) 62, an air mix door actuator 63 configured to drive the air mix door 62, a discharge-mode switching door 64, and an air blower 65.

The air blower 65 is configured to select one of air (indoor air) inside the vehicle compartment or air (outdoor air) outside the vehicle compartment to send the selected air into the casing 60 as air-conditioning air. The air blower 65 includes a sirocco fan 65*a* and a blower motor 65*b* configured to rotatably drive the sirocco fan 65*a*. The blower motor 65*b* is connected to the air conditioning control device 22 such that ON/Oft of the blower motor 65*b* and the rotational speed of the blower motor 65*b* are controlled. Power is also supplied from the storage battery to the blower motor 65*b*.

The casing 60 is disposed inside an instrument panel (not shown in the figure) in the vehicle compartment. A defroster discharge port 60*a*, a vent discharge port 60*b*, and a heat discharge port 60*c* are formed at the casing 60. These discharge ports 60*a*-60*c* are each opened/closed by the discharge-mode switching door 64. Although not shown in the figure, the discharge-mode switching door 64 is operated by an actuator connected to the air conditioning control device 22. Examples of a discharge mode include a defroster mode for sending air-conditioning air to the defroster discharge port 60*a*, a vent mode for sending air-conditioning air to the vent discharge port 60*b*, a heat mode for sending air-conditioning air to the heat discharge port 60*c*, a defroster/heat mode for sending air-conditioning air to the defroster discharge port 60*a* and the heat discharge port 60*c*, and a bi-level mode for sending air-conditioning air to the vent discharge port 60*b* and the heat discharge port 60*c*.

The total amount of air-conditioning air introduced into the casing 60 passes through the upstream indoor heat exchanger 32.

In the casing 60, the air mix door 62 is housed between the upstream indoor heat exchanger 32 and the downstream indoor heat exchanger 31. The air mix door 62 is configured to adjust the temperature of discharged air in such a manner that the amount of air which has passed through the upstream indoor heat exchanger 32 and which is about to pass through the downstream indoor heat exchanger 31 is changed to determine a mixing ratio between air having passed through the upstream indoor heat exchanger 32 and air having passed through the downstream indoor heat exchanger 31.

The air heater 61 is housed downstream of the downstream indoor heat exchanger 31 in the casing 60. The air heater 61 may be, e.g., a PTC heater using a PTC element generating heat upon current application. The air heater 61 is connected to the air conditioning control device 22 such that ON/OFF of the air heater 61 and the amount of heat generation of the air heater 61 (the power supply amount of the air heater 61) are controlled. Power is also supplied from the storage battery to the air heater 61.

The vehicle air conditioner 1 further includes an outdoor air temperature sensor 70, an outdoor heat exchanger temperature sensor 71, a high-side refrigerant pressure sensor 72, an upstream indoor heat exchanger temperature sensor 73, a downstream indoor heat exchanger temperature sensor 74, and a discharged air temperature sensor 75. These sensors 70-75 are connected to the air conditioning control device 22.

The outdoor air temperature sensor 70 is disposed upstream of the outdoor heat exchanger 33 in the flow direction of air, and is configured to determine the temperature (outdoor air temperature TG) of outdoor air before the outdoor air flows into the outdoor heat exchanger 33. The outdoor heat exchanger temperature sensor 71 is disposed on a downstream surface of the outdoor heat exchanger 33 in the flow direction of air, and is configured to determine the surface temperature of the outdoor heat exchanger 33.

The high-side refrigerant pressure sensor 72 is disposed closer to the discharge port of the electric compressor 30 at the main refrigerant pipe 40, and is configured to determine the high-side refrigerant pressure of the heat pump device 20.

The upstream indoor heat exchanger temperature sensor 73 is disposed downstream of the upstream indoor heat exchanger 32 in the flow direction of air, and is configured to determine the surface temperature of the upstream indoor heat exchanger 32. The downstream indoor heat exchanger temperature sensor 74 is disposed downstream of the downstream indoor heat exchanger 31 in the flow direction of air, and is configured to determine the surface temperature of the downstream indoor heat exchanger 31.

The discharged air temperature sensor 75 is configured to determine the temperature of air discharged from the casing 60, and is disposed at a predetermined part of the vehicle compartment.

The air conditioning control device 22 is configured to set the operation mode of the heat pump device 20, the volume of air from the air blower 65, and the degree of opening of the air mix door 62 based on, e.g., a temperature set by a passenger, an outdoor air temperature, a temperature inside the vehicle compartment, and the amount of solar radiation. The air conditioning control device 22 controls the heat pump device 20 to the set operation mode and to control the air blower 65 and the air mix door actuator 63 to the set air volume and the set opening degree. The air conditioning control device 22 is, e.g., a well-known central processing unit, ROM, or RAM. Moreover, the air conditioning control device 22 is further configured to control the electric compressor 30 and the fan motor 38 depending on an air-conditioning load, and is also configured to control the air heater 61 if necessary.

As in a typical automatic air conditioning control, the air conditioning control device 22 controls, in a later-described main routine, switching of the operation mode of the heat pump device 20, the volume of air from the air blower 65, the degree of opening of the air mix door 62, switching of the discharge mode, the electric compressor 30, and the blower motor 65b. For example, although the fan motor 38 is basically operated during operation of the electric compressor 30, the fan motor 38 is operable even in a resting state of the electric compressor 30 when, e.g., cooling of the inverter is required.

The operation mode of the heat pump device 20 includes five types of operation modes: an air-heating operation mode; a dehumidification air-heating operation mode; an air-cooling operation mode; a defrosting operation mode (first defrosting operation mode) under extremely-low outdoor air temperature; and a defrosting operation mode (second defrosting operation mode) under low outdoor air temperature.

The air-heating operation mode is selected when the outdoor air temperature is, e.g., lower than 0° C. (under extremely-low outdoor air temperature). In the air-heating operation mode, the downstream indoor heat exchanger 31 and the upstream indoor heat exchanger 32 serve as radiators, and the outdoor heat exchanger 33 serves as a heat absorber.

Figure 5:
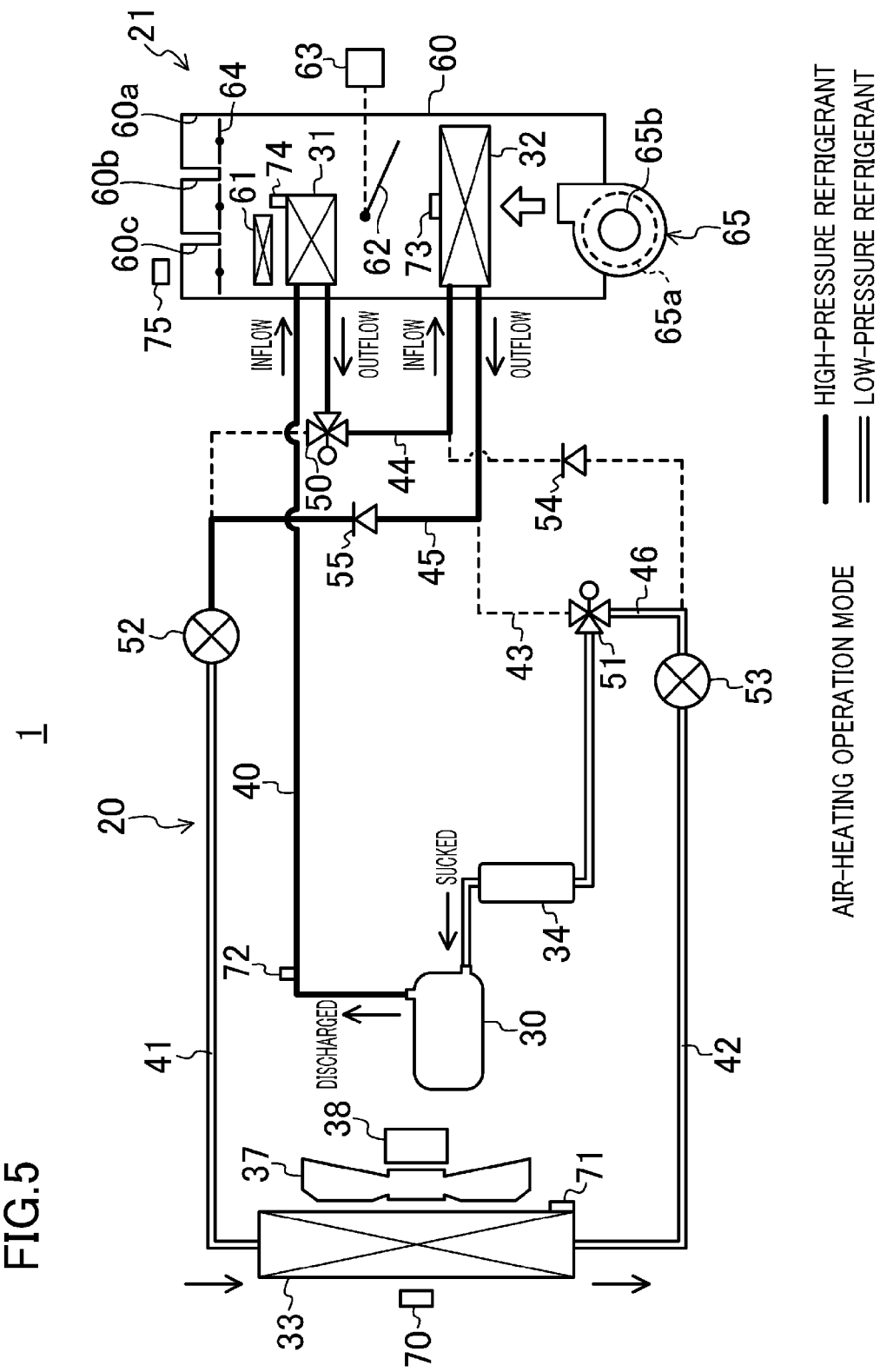
FIG. 5 is a diagram illustrating the case of an air-heating operation mode and corresponding to FIG. 1.

That is, the high-pressure flow path switching valve 50 switches, referring to FIG. 5, the flow path to cause refrigerant flowing out from the downstream indoor heat exchanger 31 to flow into the upstream indoor heat exchanger 32 through the inlet thereof. Moreover, the low-pressure flow path switching valve 51 switches the flow path to cause refrigerant flowing out from the outdoor heat exchanger 33 to flow into the accumulator 34. The first expansion valve 52 is in the expansion state, and the second expansion valve 53 is in the non-expansion state.

When the electric compressor 30 is operated in the foregoing state, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows from the main refrigerant pipe 41 to the upstream indoor heat exchanger 32 through the first branched refrigerant pipe 44. Then, the refrigerant circulates in the upstream indoor heat exchanger 32. That is, since high-temperature refrigerant flows into the downstream indoor heat exchanger 31 and the upstream indoor heat exchanger 32, air-conditioning air is heated by both of the downstream indoor heat exchanger 31 and the upstream indoor heat exchanger 32. As a result, a high air-heating capacity can be realized.

The refrigerant having circulated in the upstream indoor heat exchanger 32 flows from the main refrigerant pipe 43 to the main refrigerant pipe 41 through the second branched refrigerant pipe 45. The refrigerant flowing into the main refrigerant pipe 41 is expanded by passing through the first expansion valve 52, and then flows into the outdoor heat exchanger 33. The refrigerant flowing into the outdoor heat exchanger 33 absorbs heat from outdoor air. Then, the refrigerant passes through the main refrigerant pipe 42 and the third branched refrigerant pipe 46 in this order, and is sucked into the electric compressor 30 through the accumulator 34.

Figure 6:
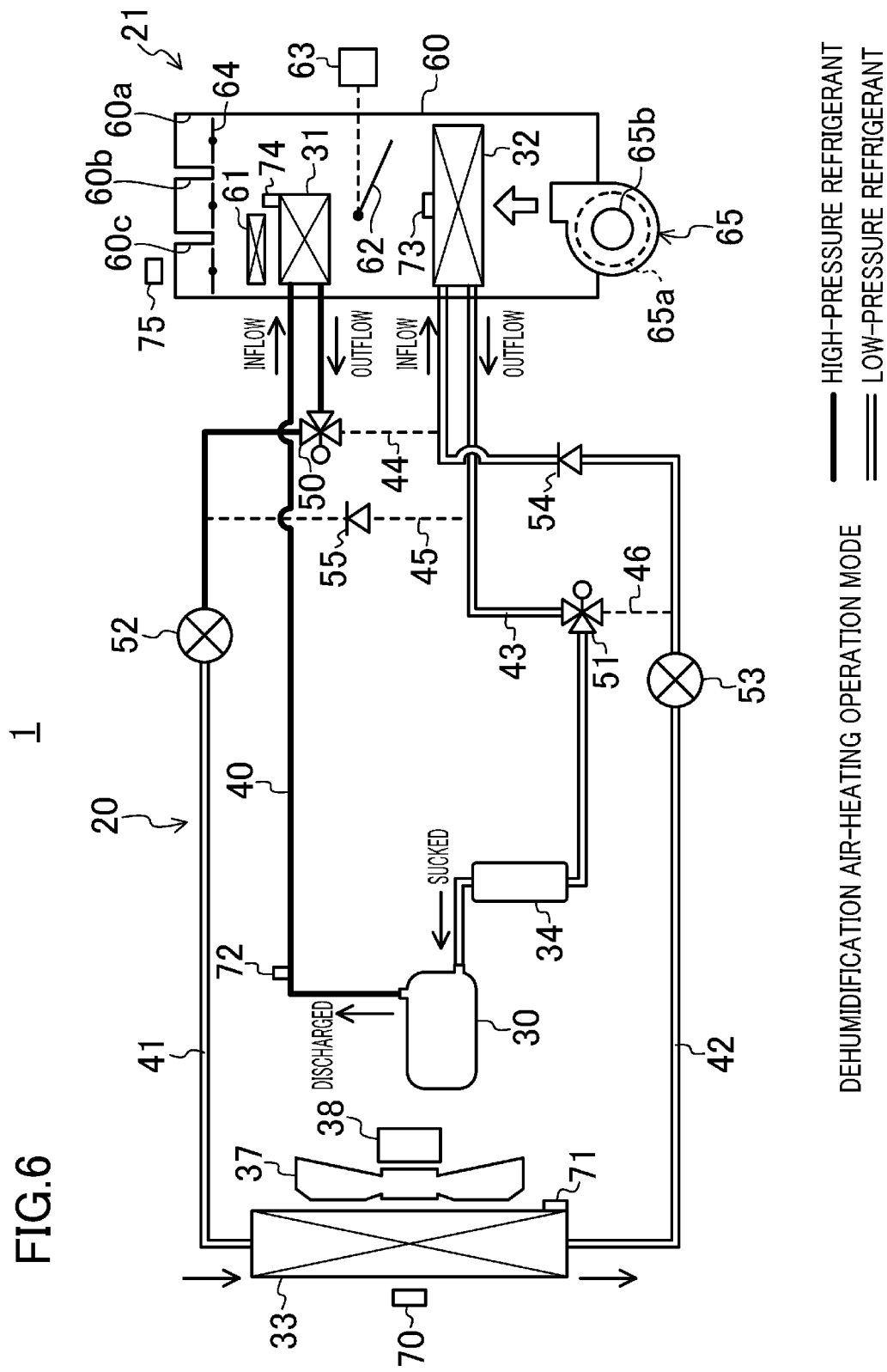
FIG. 6 is a diagram illustrating the case of a dehumidification air-heating operation mode and corresponding to FIG. 1.

Referring to FIG. 6, the dehumidification air-heating operation mode is selected when the outdoor air temperature is, e.g., equal to or higher than 0° C. and equal to or lower than 25° C. In the dehumidification air-heating operation mode, the downstream indoor heat exchanger 31 serves as a radiator, and the upstream indoor heat exchanger 32 and the outdoor heat exchanger 33 serve as heat absorbers.

That is, the high-pressure flow path switching valve 50 switches the flow path such that refrigerant flowing out from the downstream indoor heat exchanger 31 does not flow into the upstream indoor heat exchanger 32 through the inlet thereof and flows toward the first expansion valve 52. Moreover, the low-pressure flow path switching valve 51 switches the flow path to cause refrigerant flowing out from the upstream indoor heat exchanger 32 to flow into the accumulator 34. The first expansion valve 52 is in the expansion state, and the second expansion valve 53 is in the non-expansion state.

When the electric compressor 30 is operated in the foregoing state, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 is expanded by passing through the first expansion valve 52 of the main refrigerant pipe 41. Then, the refrigerant flows into the outdoor heat exchanger 33. The refrigerant flowing into the outdoor heat exchanger 33 absorbs heat from outdoor air, and flows into the upstream indoor heat exchanger 32 through the main refrigerant pipe 42. Subsequently, the refrigerant circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 7:
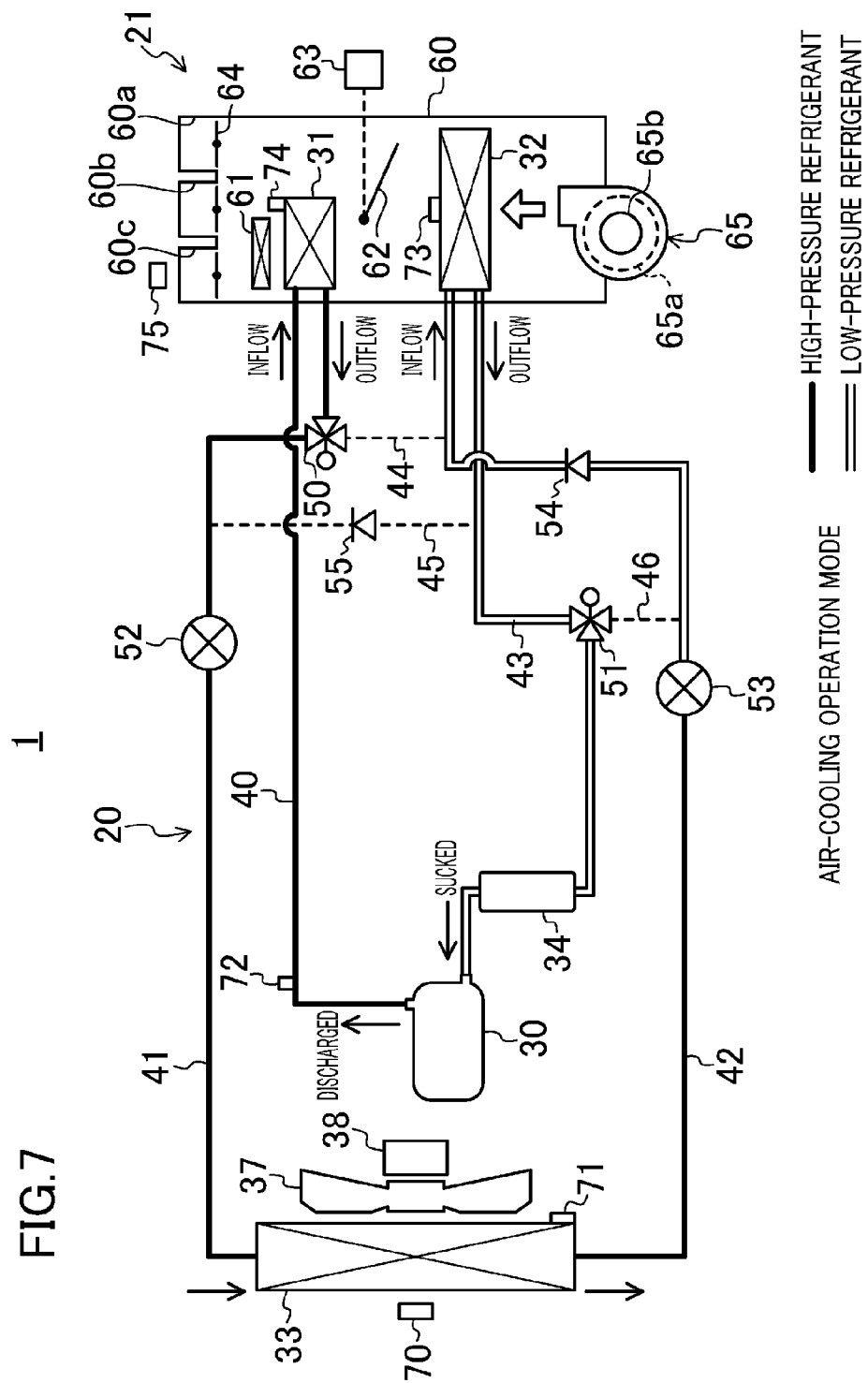
FIG. 7 is a diagram illustrating the case of an air-cooling operation mode and corresponding to FIG. 1.

Referring to FIG. 7, the air-cooling operation mode is selected when the outdoor air temperature is, e.g., higher than 25° C. In the air-cooling operation mode, the downstream indoor heat exchanger 31 serves as a radiator, the upstream indoor heat exchanger 32 serves as a heat absorber, and the outdoor heat exchanger 33 serves as a radiator.

That is, the high-pressure flow path switching valve 50 switches the flow path such that refrigerant flowing out from the downstream indoor heat exchanger 31 does not flow into the upstream indoor heat exchanger 32 through the inlet thereof and flows toward the first expansion valve 52. Moreover, the low-pressure flow path switching valve 51 switches the flow path to cause refrigerant flowing out from the upstream indoor heat exchanger 32 to flow into the accumulator 34. The first expansion valve 52 is in the non-expansion state, and the second expansion valve 53 is in the expansion state.

When the electric compressor 30 is operated in the foregoing state, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows, without being expanded, into the outdoor heat exchanger 33 through the main refrigerant pipe 41. The refrigerant flowing into the outdoor heat exchanger 33 dissipates heat, and is expanded by passing through the second expansion valve 53 of the main refrigerant pipe 42. Then, the refrigerant flows into the upstream indoor heat exchanger 32. The refrigerant flowing into the upstream indoor heat exchanger 32 circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 8:
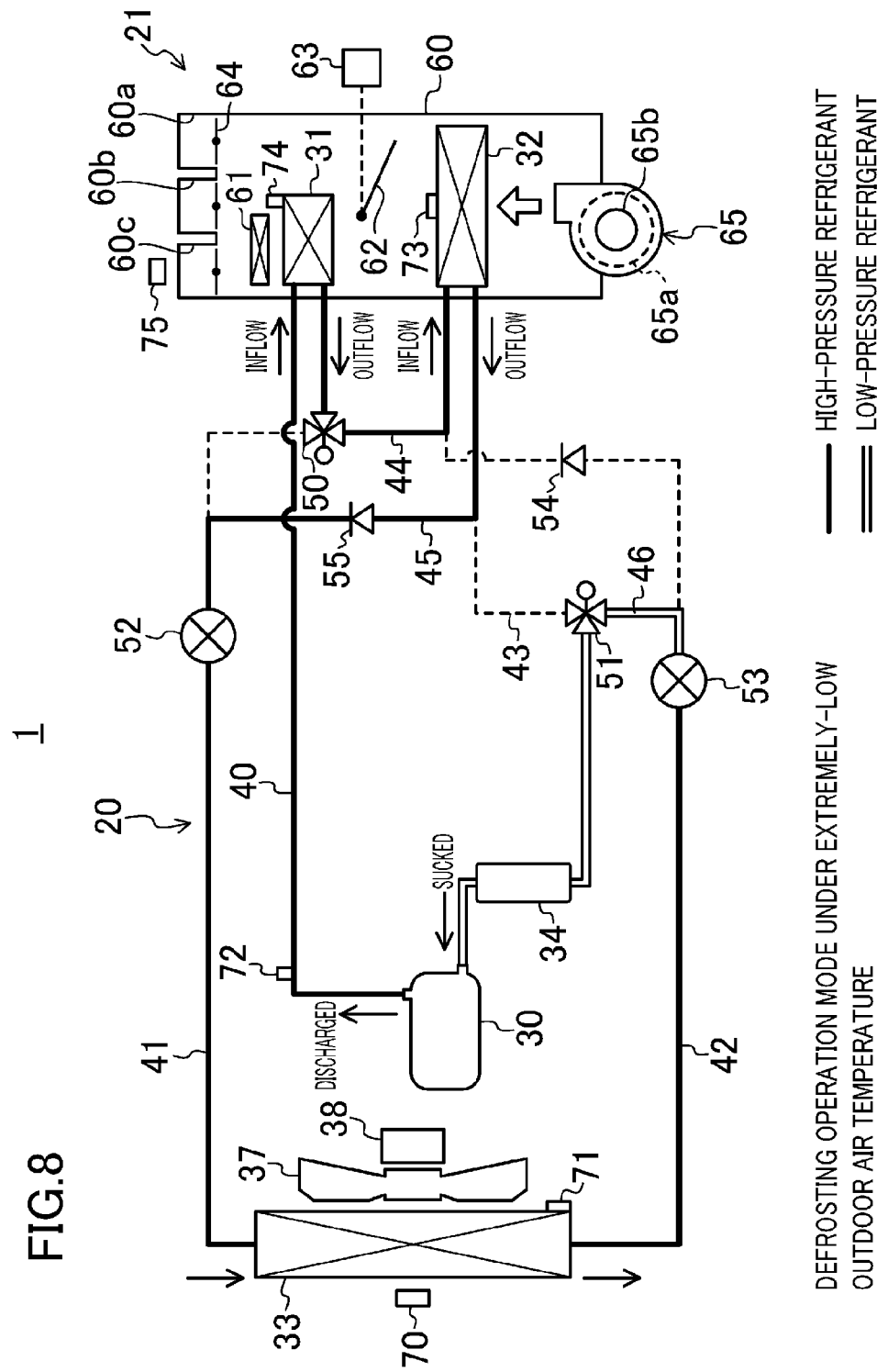
FIG. 8 is a diagram illustrating the case of a defrosting operation mode under extremely-low outdoor air temperature and corresponding to FIG. 1.

Referring to FIG. 8, the defrosting operation mode under extremely-low outdoor air temperature is selected when frost is formed on the outdoor heat exchanger 33 in the air-heating operation mode. In the air-heating operation mode, the downstream indoor heat exchanger 31 and the upstream indoor heat exchanger 32 serve as the radiators as described above. In the defrosting operation mode under extremely-low outdoor air temperature, while the downstream indoor heat exchanger 31 and the upstream indoor heat exchanger 32 remain as the radiators, high-pressure refrigerant discharged from the electric compressor 30 is guided to the outdoor heat exchanger 33.

That is, the high-pressure flow path switching valve 50 and the low-pressure flow path switching valve 51 remain in the same state as that of the air-heating operation mode, the first expansion valve 52 is in the non-expansion state, and the second expansion valve 53 is in the expansion state.

Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

Figure 9:
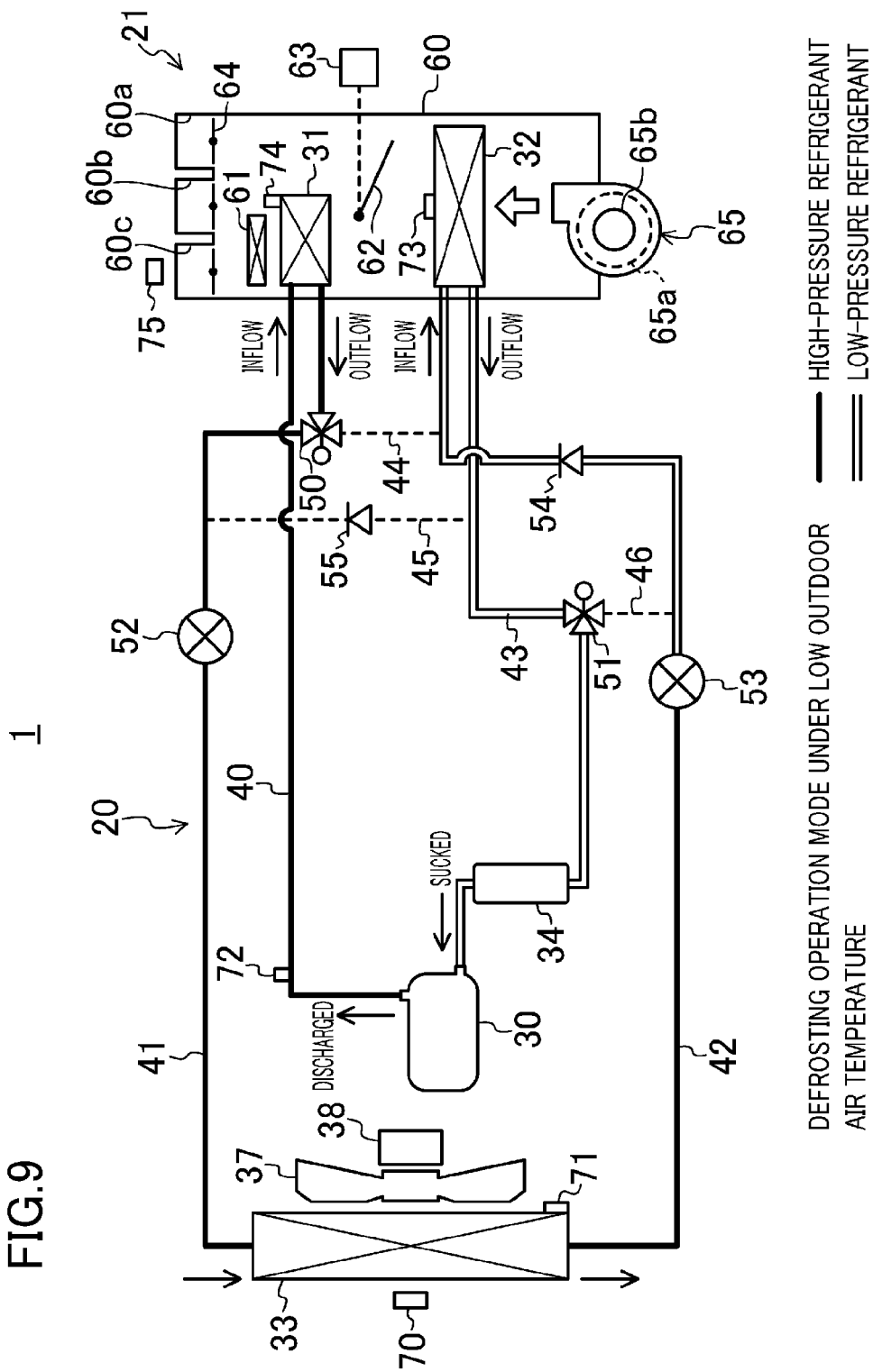
FIG. 9 is a diagram illustrating the case of a defrosting operation mode under low outdoor air temperature and corresponding to FIG. 1.

Referring to FIG. 9, the defrosting operation mode under low outdoor air temperature is selected when frost is formed on the outdoor heat exchanger 33 in the dehumidification air-heating operation mode. As described above, in the dehumidification air-heating operation mode, the downstream indoor heat exchanger 31 serves as the radiator, and the upstream indoor heat exchanger 32 serves as the heat absorber. In the defrosting operation mode under low outdoor air temperature, while the downstream indoor heat exchanger 31 remains as the radiator, and the upstream indoor heat exchanger 32 remains as the heat absorber, high-pressure refrigerant discharged from the electric compressor 30 is guided to the outdoor heat exchanger 33.

That is, the high-pressure flow path switching valve 50 and the low-pressure flow path switching valve 51 remain in the same state as that of the dehumidification air-heating operation mode, the first expansion valve 52 is in the non-expansion state, and the second expansion valve 53 is in the expansion state.

Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

In any of the air-heating operation mode, the dehumidification air-heating operation mode, the air-cooling operation mode, the defrosting operation mode under extremely-low outdoor air temperature, and the defrosting operation mode under low outdoor air temperature, the downstream indoor heat exchanger 31 serves as the radiator.

Moreover, in any of the foregoing operation modes, the refrigerant pipe through which refrigerant flows into the outdoor heat exchanger 33 is the main refrigerant pipe 41, and the refrigerant pipe through which refrigerant flows out from the outdoor heat exchanger 33 is the main refrigerant pipe 42. Thus, in the outdoor heat exchanger 33, refrigerant constantly flows in one direction. As compared to the case of a heat pump device configured such that refrigerant reversibly flows, the outdoor heat exchanger 33 may be configured considering only distribution of refrigerant in one direction. As a result, the heat exchange performance of the outdoor heat exchanger 33 can be relatively easily enhanced.

In any of the foregoing operation modes, after refrigerant flows through downstream ones of the tubes 49a of the downstream indoor heat exchanger 31 in the flow direction of air, the refrigerant can flow through upstream ones of the tubes 49a of the downstream indoor heat exchanger 31 in the flow direction of air, and then can be discharged. Thus, the downstream indoor heat exchanger 31 can be in such countercurrent arrangement that the flow of refrigerant in the downstream indoor heat exchanger 31 is countercurrent to the flow of outdoor air. Similarly, in any of the foregoing operation modes, after refrigerant flows through downstream ones of tubes (not shown in the figure) of the upstream indoor heat exchanger 32 in the flow direction of air, the refrigerant can flow through upstream ones of the tubes of the upstream indoor heat exchanger 32 in the flow direction of air, and then can be discharged. Thus, the upstream indoor heat exchanger 32 can be also in the countercurrent arrangement.

Since the downstream indoor heat exchanger 31 is in the countercurrent arrangement, higher-temperature refrigerant flows through the downstream part of the downstream indoor heat exchanger 31 in the flow direction of air particularly in the air-heating operation mode. Thus, air-heating can be efficiently performed, and air-heating performance can be improved.

Moreover, since the upstream indoor heat exchanger 32 is in the countercurrent arrangement, lower-temperature refrigerant flows through the downstream part of the upstream indoor heat exchanger 32 in the flow direction of air particularly in the air-cooling operation mode. Thus, air-cooling can be efficiently performed, and air-cooling performance can be improved.

Figure 2:
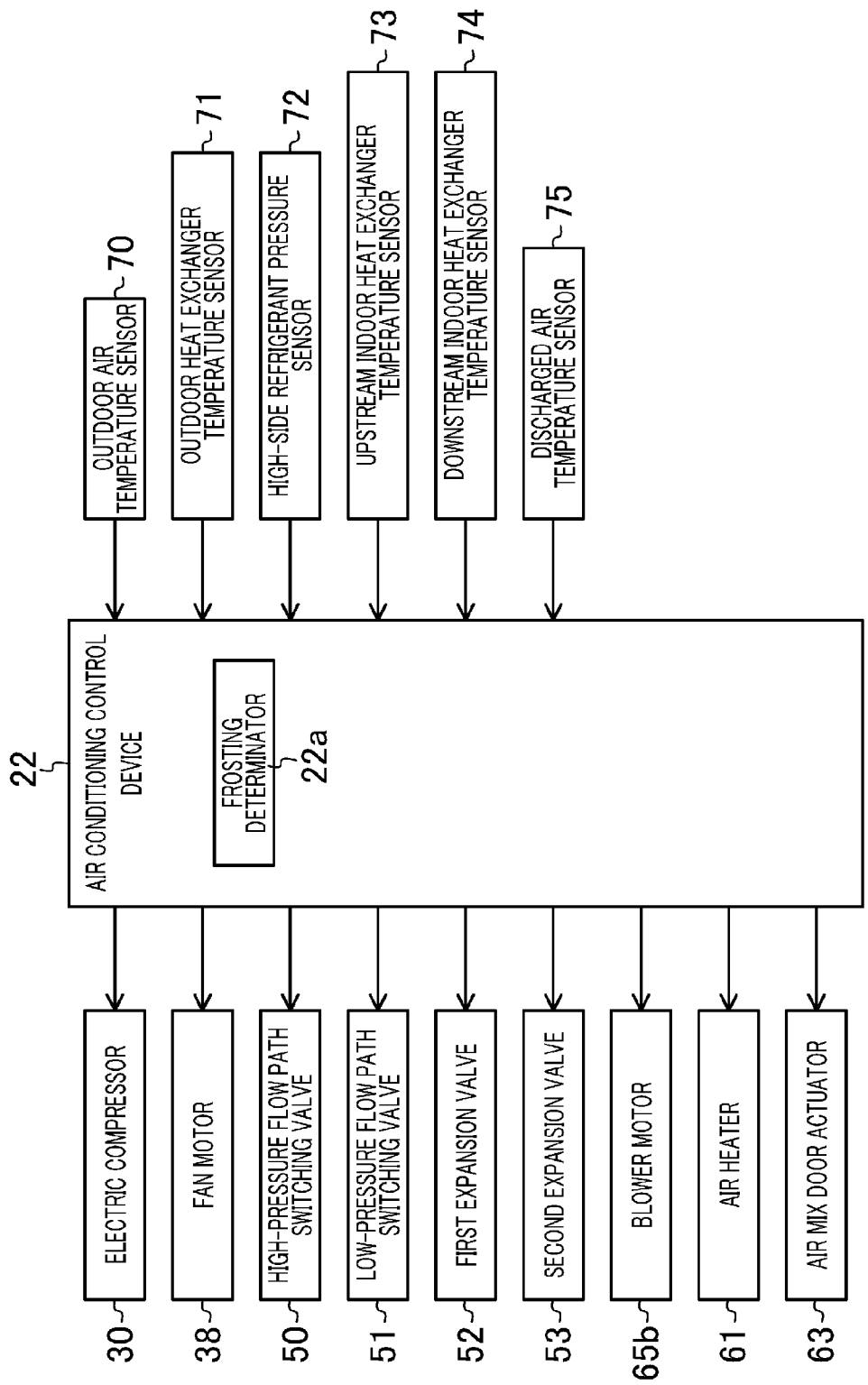
FIG. 2 is a block diagram of the vehicle air conditioner.

Referring to FIG. 2, the air conditioning control device 22 includes a frosting determinator 22a configured to determine whether or not frost adheres to the outdoor heat exchanger 33. The frosting determinator 22a determines that frost adheres to the outdoor heat exchanger 33 when a value obtained by subtracting the surface temperature of the outdoor heat exchanger 33 determined by the outdoor heat exchanger temperature sensor 71 from an outdoor air temperature TG determined by the outdoor air temperature sensor 70 is greater than, e.g., 20 (° C.). That is, frosting determination is performed based on the fact that, when frost adheres to the outdoor heat exchanger 33, refrigerant cannot absorb heat in the outdoor heat exchanger 33 and a refrigerant temperature does not increase. Thus, a value of "20" may be other values as long as it can be, based on such a value, determined whether or not frost adheres to the outdoor heat exchanger 33.

Figure 10:
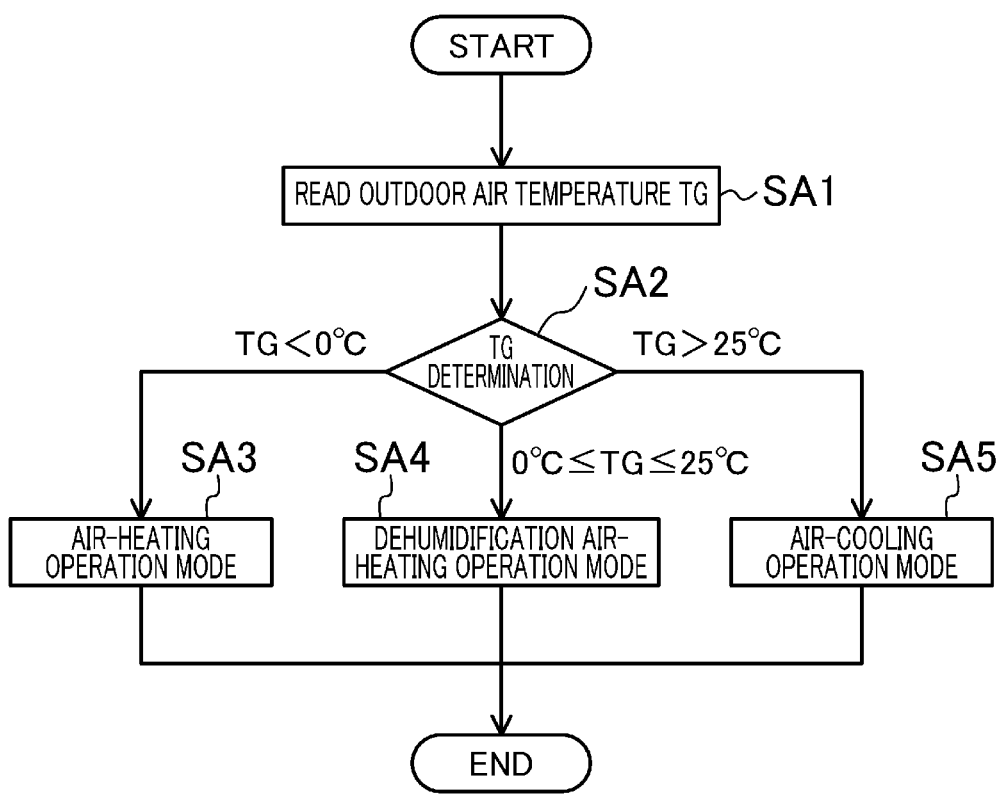
FIG. 10 is a flowchart illustrating the steps of control performed by an air conditioning control device.

Next, the steps of control performed by the air conditioning control device 22 will be described with reference to FIGS. 10-12. FIG. 10 illustrates the main routine. At step SA1 after "START," an outdoor air temperature TG determined by the outdoor air temperature sensor 70 is read. At step SA2 subsequent to step SA1, it is determined whether the outdoor air temperature TG is lower than 0° C., equal to or higher than 0° C. and equal to or lower than 25° C., or higher than 25° C.

When it is, at step SA2, determined that the outdoor air temperature TG is lower than 0° C., the process proceeds to step SA3. Then, the heat pump device 20 is switched to the air-heating operation mode, and the process proceeds to "END" of the main routine. In the air-heating operation mode, the heat mode is mainly selected as the discharge mode of the indoor air conditioning unit 21. Moreover, the air mix door 62 is operated such that the temperature of discharged air reaches a target temperature.

When it is, at step SA2, determined that the outdoor air temperature TG is equal to or higher than 0° C. and equal to or lower than 25° C., the process proceeds to step SA4. Then, the heat pump device 20 is switched to the dehumidification air-heating operation mode, and the process proceeds to "END" of the main routine. When it is, at step SA2, that the outdoor air temperature TG is higher than 25° C., the process proceeds to step SA5. The heat pump device 20 is switched to the air-cooling operation mode, and the process proceeds to "END" of the main routine.

Figure 11:
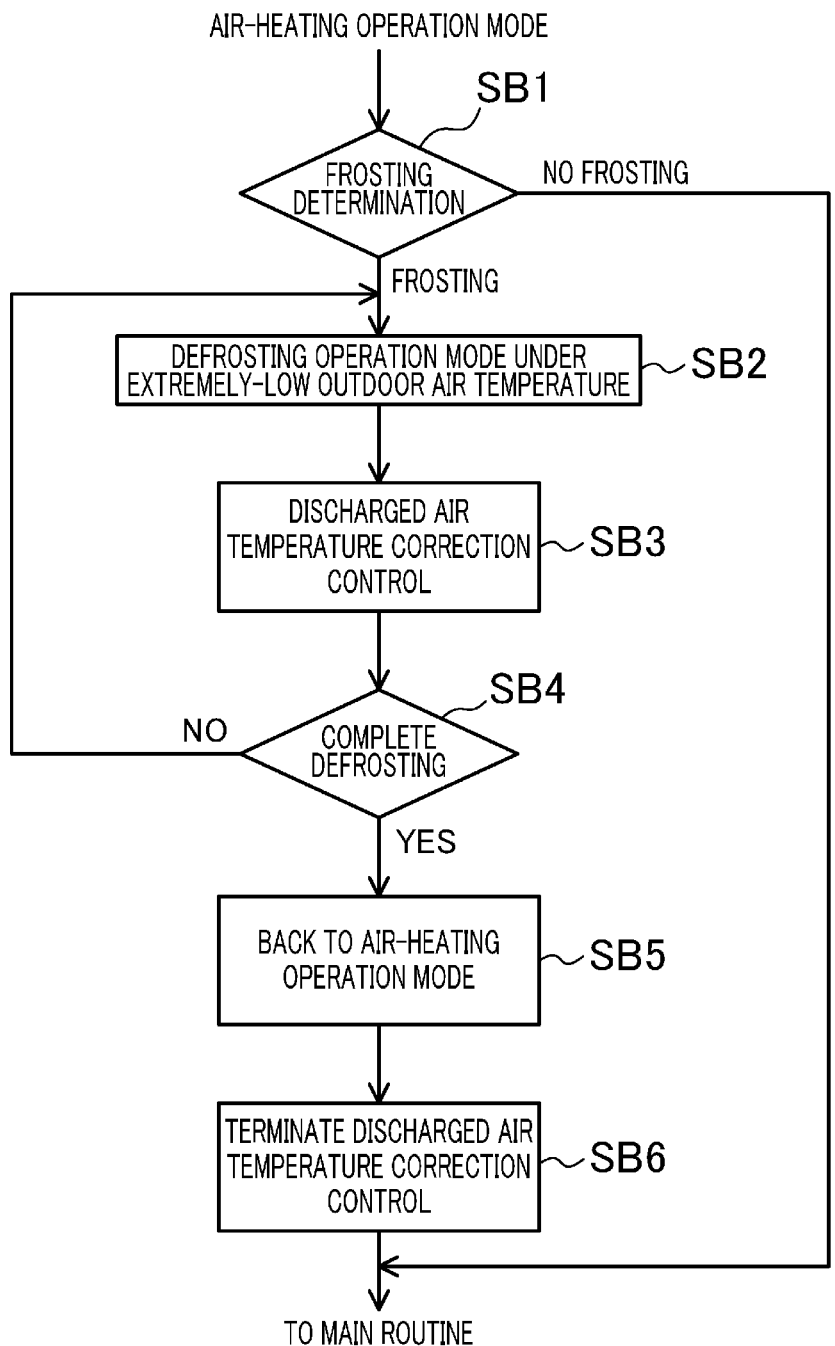
FIG. 11 is a flowchart illustrating the steps of control when the air-heating operation mode is selected.

At step SA3, subroutine control in the air-heating operation mode as illustrated in FIG. 11 is performed. At step SB1 of such control, it is determined whether or not frost adheres to the outdoor heat exchanger 33. This is performed by the frosting determinator 22a. When a value obtained by subtracting the surface temperature of the outdoor heat exchanger temperature sensor 71 from the outdoor air temperature TG is greater than 20, it is determined that frost adheres to the outdoor heat exchanger 33, and the process proceeds to step SB2. On the other hand, when the value obtained by subtracting the surface temperature of the outdoor heat exchanger temperature sensor 71 from the outdoor air temperature TG is equal to or less than 20, it is determined that frost does not adhere to the outdoor heat exchanger 33, and the process returns to the main routine.

At step SB2, the heat pump device 20 is switched to the defrosting operation mode under extremely-low outdoor air temperature. While the electric compressor 30 remains in operation, the operation mode is switched.

When the heat pump device 20 is switched from the air-heating operation mode (illustrated in FIG. 5) to the defrosting operation mode (illustrated in FIG. 8) under extremely-low outdoor air temperature, the first expansion valve 52 of the heat pump device 20 is switched from the expansion state to the non-expansion state. Accordingly, high-pressure refrigerant is supplied to the outdoor heat exchanger 33 to cause the outdoor heat exchanger 33 to serve as the radiator, thereby increasing the surface temperature of the outdoor heat exchanger 33. As a result, frost on the outdoor heat exchanger 33 is melted.

Since the first expansion valve 52 is merely switched to the non-expansion state in switching of the heat pump device 20 to the defrosting operation mode under extremely-low outdoor air temperature, the defrosting operation mode under extremely-low outdoor air temperature can be performed while refrigerant keeps flowing through the same refrigerant pipe as the refrigerant pipe through which refrigerant flows in the air-heating operation mode. Thus, useless heat dissipation and heat absorption of refrigerant due to switching of the refrigerant pipe do not occur.

Since switching of the heat pump device 20 to the defrosting operation mode under extremely-low outdoor air temperature causes the outdoor heat exchanger 33 to serve as the radiator, there is a concern that the temperature of refrigerant flowing into the downstream indoor heat exchanger 31 and the upstream indoor heat exchanger 32 decreases.

For such a reason, in the first embodiment, after the heat pump device 20 is switched to the defrosting operation mode under extremely-low outdoor air temperature at the step SB2, the process proceeds to step SB3, and discharged air temperature correction control for correcting the temperature of air discharged form the indoor air conditioning unit 21 to the inside of the vehicle compartment is performed.

Specifically, the following four types of control are performed: air mix door control; compressor control; air heater control; and air blower control.

The air mix door control is for correcting operation of the air mix door 62 such that the temperature of discharged air increases. That is, since the downstream indoor heat exchanger 31 is positioned upstream of the upstream indoor heat exchanger 32 in the flow direction of air, higher-temperature refrigerant as compared to that of the upstream indoor heat exchanger 32 circulates in the downstream indoor heat exchanger 31, and therefore the surface temperature of the downstream indoor heat exchanger 31 is higher than that of the upstream indoor heat exchanger 32. The air mix door 62 is operated such that the volume of air passing through the downstream indoor heat exchanger 31 increases.

The compressor control is for increasing the discharge amount of the electric compressor 30 in the defrosting operation mode under extremely-low outdoor air temperature beyond that in the air-heating operation mode. Since an increase in discharge amount of the electric compressor 30 results in an increase in temperature of refrigerant flowing into the downstream indoor heat exchanger 31 and the upstream indoor heat exchanger 32, a decrease in temperature of discharged air can be reduced.

In the compressor control, the upper limit of the discharge amount of the electric compressor 30 is set based on the high-side refrigerant pressure of the heat pump device 20 determined by the high-side refrigerant pressure sensor 72. Specifically, when the high-side refrigerant pressure increases to a predetermined value, the discharge amount of the electric compressor 30 is reduced such that the internal pressure of the downstream indoor heat exchanger 31 and the upstream indoor heat exchanger 32 does not abnormally increase.

In the compressor control, the control may be performed, which is for setting the upper limit of the discharge amount of the electric compressor 30 based on refrigerant pressure determined by the high-side refrigerant pressure sensor 72 and the surface temperature of the upstream indoor heat exchanger 32 determined by the upstream indoor heat exchanger temperature sensor 73. In such control, when the high-side refrigerant pressure increases to a predetermined value, the discharge amount of the electric compressor 30 is reduced such that the internal pressure of the upstream indoor heat exchanger 32 does not abnormally increase, and is controlled such that the surface temperature of the upstream indoor heat exchanger 32 does not decrease to the temperature at which frosting is likely to occur.

The air heater control is for operating the air heater 61 to heat air-conditioning air. The amount of heat generated from the air heater 61 is changeable by, e.g., an outdoor air temperature, the surface temperature of the upstream indoor heat exchanger 32 determined by the upstream indoor heat exchanger temperature sensor 73, and the surface temperature of the downstream indoor heat exchanger 31 determined by the downstream indoor heat exchanger temperature sensor 74.

In the air blower control, the air blower 65 is controlled such that the volume of air to be sent decreases. Specifically, the volume of air to be sent from the air blower 65 in the defrosting operation mode under extremely-low outdoor air temperature is decreased lower than that in the air-heating operation mode. Thus, a decrease in temperature of discharged air can be reduced.

The air mix door control, the compressor control, the air heater control, and the air blower control are performed in this order with temporal priority being assigned. However, if a decrease in temperature of discharged air can be reduced only by, e.g., the air mix door control, only the air mix door control may be performed.

Similarly, only the air mix door control and the compressor control may be performed, or only the air mix door control, the compressor control, and the air heater control may be performed.

The control of the air mix door 62 has an advantage that power consumption is low. Since the highest priority is assigned to the air mix door control, power consumption of the vehicle is reduced.

Since higher priority is assigned to the compressor control, the temperature of discharged air can be finely adjusted in such a manner that the discharge amount of the electric compressor 30 is changed. Moreover, since the priority of the air heater control is lowered, power consumption by operation of the air heater 61 can be reduced. Further, since the lowest priority is assigned to the air blower control, there is an advantage that a passenger is less likely to feel a sense of discomfort even when the temperature of discharged air decreases to some extent. Since the temporal priority is assigned to the foregoing controls, power consumption can be reduced while a passenger's sense of discomfort can be reduced.

Any two or more of the air mix door control, the compressor control, the air heater control, and the air blower control may be performed. In this case, the priority is preferably assigned as described above.

After the discharged air temperature correction control is performed as described above, the process proceeds to step SB4, and it is determined whether or not defrosting of the outdoor heat exchanger 33 is completed. Examples of such defrosting determination include the determination made by a timer when a predetermined period of time (e.g., one minute) is elapsed since the defrosting operation mode under extremely-low outdoor air temperature begins, and the determination made based on the above-described difference between the outdoor air temperature TG and the surface temperature of the outdoor heat exchanger 33.

When it is, at step SB4, determined as "NO," i.e., it is determined that defrosting is not completed yet, the process returns to step SB2 to continue the defrosting operation mode under extremely-low outdoor air temperature. When it is, at step SB4, determined as "YES," i.e., it is determined that defrosting is completed (it is assumed that the defrosting is completed), the process proceeds to step SB5.

At step SB5, the heat pump device 20 is switched back to the air-heating operation mode. That is, the first expansion valve 52 of the heat pump device 20 in the non-expansion state is switched to the expansion state. In this state, the electric compressor 30 remains in operation.

The first expansion valve 52 is merely switched to the expansion state in switching of the heat pump device 20 from the defrosting operation mode under extremely-low outdoor air temperature to the air-heating operation mode. Thus, the heat pump device 20 can be switched back to the air-heating operation mode while refrigerant keeps flowing through the same refrigerant pipe as the refrigerant pipe through which refrigerant flows in the defrosting operation mode under extremely-low outdoor air temperature. Consequently, useless heat dissipation and heat absorption of refrigerant due to switching of the refrigerant pipe do not occur.

After the heat pump device 20 is switched back to the air-heating operation mode, the process proceeds to step SB6, and the discharged air temperature correction control performed at step SB3 is terminated. At step SB6, the air blower control, the air heater control, the compressor control, and the air mix door control are terminated in this order with temporal priority being assigned.

Since the air blower control is terminated with the highest priority, the air blower control can be terminated at an early stage when the temperature of discharged air decreases to some extent, and therefore a passenger is less likely to feel a sense of discomfort. Moreover, since the priority of termination of the air heater control is increased, power consumption can be reduced. Further, since the lowest priority is assigned to termination of the air mix door control, power consumption can be reduced while passenger's comfort can be maintained.

After step SB6, the process returns to the main routine.

Figure 12:
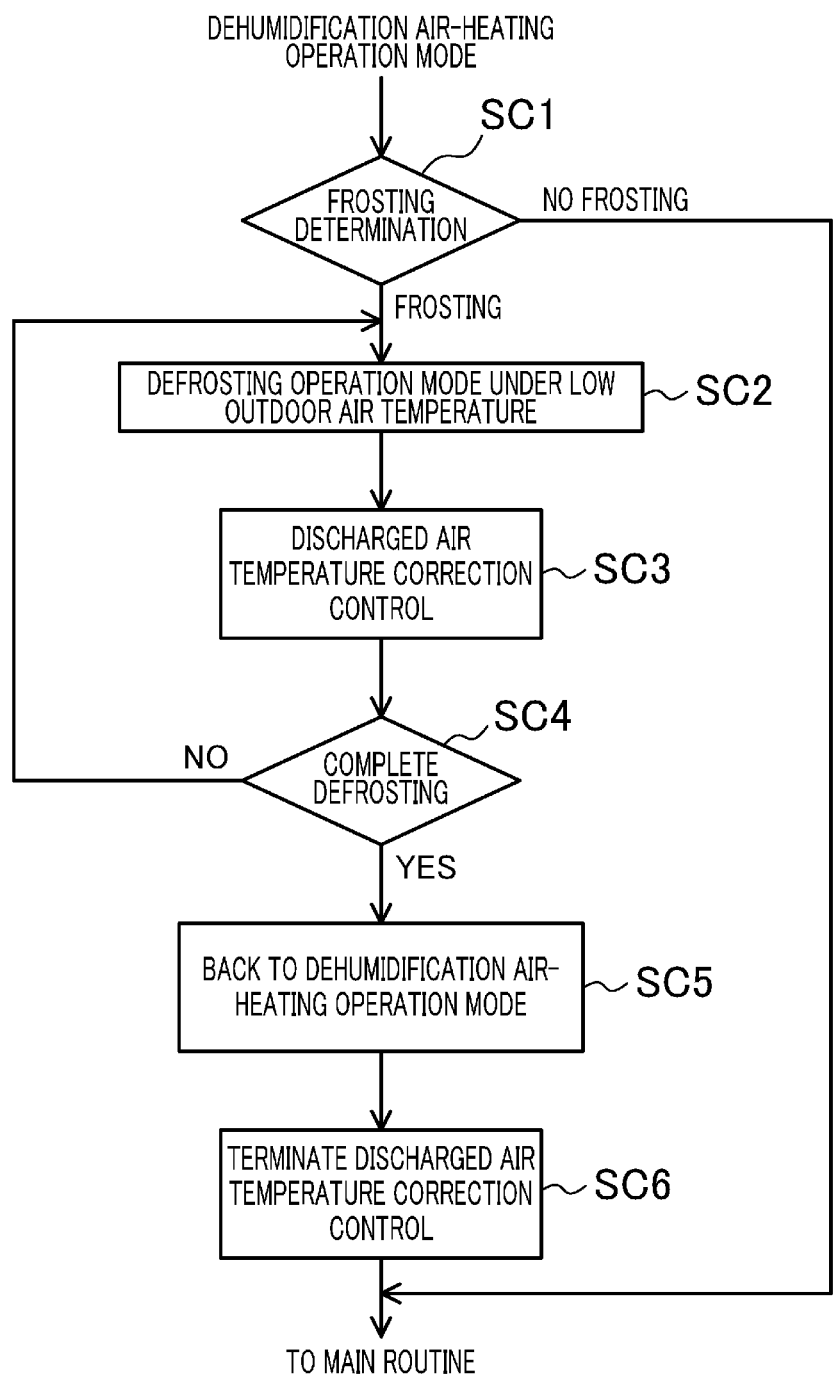
FIG. 12 is a flowchart illustrating the steps of control when the dehumidification air-heating operation mode is selected.

When the dehumidification air-heating operation mode is selected at step SA4 of the main routine illustrated in FIG. 10, subroutine control in the dehumidification air-heating operation mode as illustrated in FIG. 12 is performed. In such control, frosting determination is made at step SC1. This is the same as step SB1 of the air-heating operation mode. When it is determined that no frost adheres to the outdoor heat exchanger 33, the process returns to the main routine. When it is determined frost adheres to the outdoor heat exchanger 33, the process proceeds to step SC2, and the heat pump device 20 is switched to the defrosting operation mode under low outdoor air temperature. In this state, the electric compressor 30 remains in operation.

When the heat pump device 20 is switched from the dehumidification air-heating operation mode (illustrated in FIG. 6) to the defrosting operation mode (illustrated in FIG. 9) under low outdoor air temperature, the first expansion valve 52 of the heat pump device 20 is switched from the expansion state to the non-expansion state. Accordingly, high-pressure refrigerant is supplied to the outdoor heat exchanger 33 to cause the outdoor heat exchanger 33 to serve as the radiator, thereby increasing the surface temperature of the outdoor heat exchanger 33. As a result, frost on the outdoor heat exchanger 33 is melted.

Since the first expansion valve 52 is merely switched to the non-expansion state in switching of the heat pump device 20 to the defrosting operation mode under low outdoor air temperature, the defrosting operation mode under low outdoor air temperature can be performed while refrigerant keeps flowing through the same refrigerant pipe as the refrigerant pipe through which refrigerant flows in the dehumidification air-heating operation mode. Thus, useless heat dissipation and heat absorption of refrigerant due to switching of the refrigerant pipe do not occur.

Since switching of the heat pump device 20 to the defrosting operation mode under low outdoor air temperature causes the outdoor heat exchanger 33 to serve as the radiator, there is a concern that the temperature of refrigerant flowing into the downstream indoor heat exchanger 31 and the upstream indoor heat exchanger 32 decreases.

For such a reason, in the first embodiment, the discharged air temperature correction control is performed at step SC3 as in step SB3 of the defrosting operation mode under extremely-low outdoor air temperature.

After the discharged air temperature correction control, the process proceeds to step SC4, and it is determined whether or not defrosting of the outdoor heat exchanger 33 is completed. Step SC4 is similar to step SB4 of the defrosting operation mode under extremely-low outdoor air temperature.

When it is, at step SC4, determined as "NO," i.e., it is determined that defrosting is not completed yet, the process returns to step SC2. When it is, at step SC4, determined as "YES," i.e., it is determined that defrosting is completed (it is assumed that defrosting is completed), the process proceeds to step SC5.

At step SC5, the heat pump device 20 is switched back to the dehumidification air-heating operation mode. That is, the first expansion valve 52 of the heat pump device 20 in the non-expansion state is switched to the expansion state. In this state, the electric compressor 30 remains in operation.

The first expansion valve 52 is merely switched to the expansion state in switching of the heat pump device 20 from the defrosting operation mode under low outdoor air temperature to the dehumidification air-heating operation mode. Thus, the heat pump device 20 can be switched back to the dehumidification air-heating operation mode while refrigerant keeps flowing through the same refrigerant pipe as the refrigerant pipe through which refrigerant flows in the defrosting operation mode under low outdoor air temperature. Consequently, useless heat dissipation and heat absorption of refrigerant due to switching of the refrigerant pipe do not occur.

After the heat pump device 20 is switched back to the dehumidification air-heating operation mode, the process proceeds to step SC6, and the discharged air temperature correction control performed at step SC3 is terminated. At step SC6, the control similar to step SB6 of the defrosting operation mode under extremely-low outdoor air temperature is performed. After step SC6, the process returns to the main routine.

As described above, according to the vehicle air conditioner 1 of the first embodiment, refrigerant flows into the inlet pipe 58b of the outdoor heat exchanger 33 in both of the air-heating operation mode and the air-cooling operation mode.

Thus, refrigerant is supplied to the inlet pipe 58b of the outdoor heat exchanger 33 in both of the air-heating operation mode and the air-cooling operation mode. Consequently, in, e.g., the case where a refrigerant distribution structure suitable for causing the outdoor heat exchanger 33 to serve as the heat absorber in the air-heating operation mode is provided at the outdoor heat exchanger 33, refrigerant can also flow, in the air-cooling operation mode, in the same direction as that of the air-heating operation mode in the outdoor heat exchanger 33. Thus, favorable refrigerant distribution can be realized using such a distribution structure.

As a result, favorable refrigerant distribution in the outdoor heat exchanger 33 and high heat exchanger performance can be realized in any of the air-heating operation mode and the air-cooling operation mode.

Similarly, favorable refrigerant distribution in the outdoor heat exchanger 33 can be also realized in each of the dehumidification air-heating operation mode, the first defrosting operation mode, and the second defrosting operation mode.

In the case where frost is formed on the outdoor heat exchanger 33 in the air-heating operation mode, high-pressure refrigerant can be guided to the outdoor heat exchanger 33 while the downstream indoor heat exchanger 31 and the upstream indoor heat exchanger 32 remain as the radiators. In the case where frost is formed on the outdoor heat exchanger 33 in the dehumidification air-heating operation mode, high-pressure refrigerant can be guided to the outdoor heat exchanger 33 while the downstream indoor heat exchanger 31 remains as the radiator and the upstream indoor heat exchanger 32 remains as the heat absorber. This can reduce a change in temperature of air discharged into the vehicle compartment upon switching of the heat pump device 20 to a defrosting operation, and therefore a passenger's sense of discomfort is reduced.

Switching of the heat pump device 20 between the air-heating operation mode and the defrosting operation mode under extremely-low outdoor air temperature and switching of the heat pump device 20 between the dehumidification air-heating operation mode and the defrosting operation mode under low outdoor air temperature can be performed without switching the refrigerant pipe. Thus, useless heat dissipation and heat absorption of refrigerant do not occur, and the defrosting operation can be efficiently performed.

Moreover, while the electric compressor 30 is in operation, switching of the heat pump device 20 between the air-heating operation mode and the defrosting operation mode under extremely-low outdoor air temperature and switching of the heat pump device 20 between the dehumidification air-heating operation mode and the defrosting operation mode under low outdoor air temperature can be performed. Thus, the operation of the heat pump device 20 can be resumed right after switching of the operation mode, and therefore passenger's comfort can be further improved.

Since the discharged air temperature correction control is performed at steps SB3, SC3, a decrease in temperature of air discharged into the vehicle compartment upon switching of the heat pump device 20 to the defrosting operation mode under extremely-low outdoor air temperature or the defrosting operation mode under low outdoor air temperature can be reduced, and therefore passenger's comfort can be further improved.

Since the upper limit of the discharge amount of the electric compressor 30 is set in switching of the heat pump device 20 to the defrosting operation mode under extremely-low outdoor air temperature or the defrosting operation mode under low outdoor air temperature, an excessive increase in internal pressure of the downstream indoor heat exchanger 31 and the upstream indoor heat exchanger 32 can be reduced, and therefore the reliability of the heat pump device 20 can be enhanced.

Since the discharge amount of the electric compressor 30 is controlled in switching of the heat pump device 20 to the defrosting operation mode under extremely-low outdoor air temperature or the defrosting operation mode under low outdoor air temperature, an excessive increase in internal pressure of the downstream indoor heat exchanger 31 can be reduced. Thus, the reliability of the heat pump device 20 can be enhanced. Moreover, frost is prevented from being formed on the upstream indoor heat exchanger 32, and therefore high air conditioning performance can be realized.

Note that the discharged air temperature correction control is performed at steps SB3, SC3 in the first embodiment, but may be skipped.

The frosting determination at steps SB1, SC1 may be performed using a sensor configured to directly detect frost.

Although both of the high-pressure flow path switching valve 50 and the low-pressure flow path switching valve 51 of the heat pump device 20 are the three-way valves in the first embodiment, one or both of such valves may be configured in such a manner that two on-off valves are combined together. A flow path switching unit is not limited.

Second Embodiment

Figure 13:
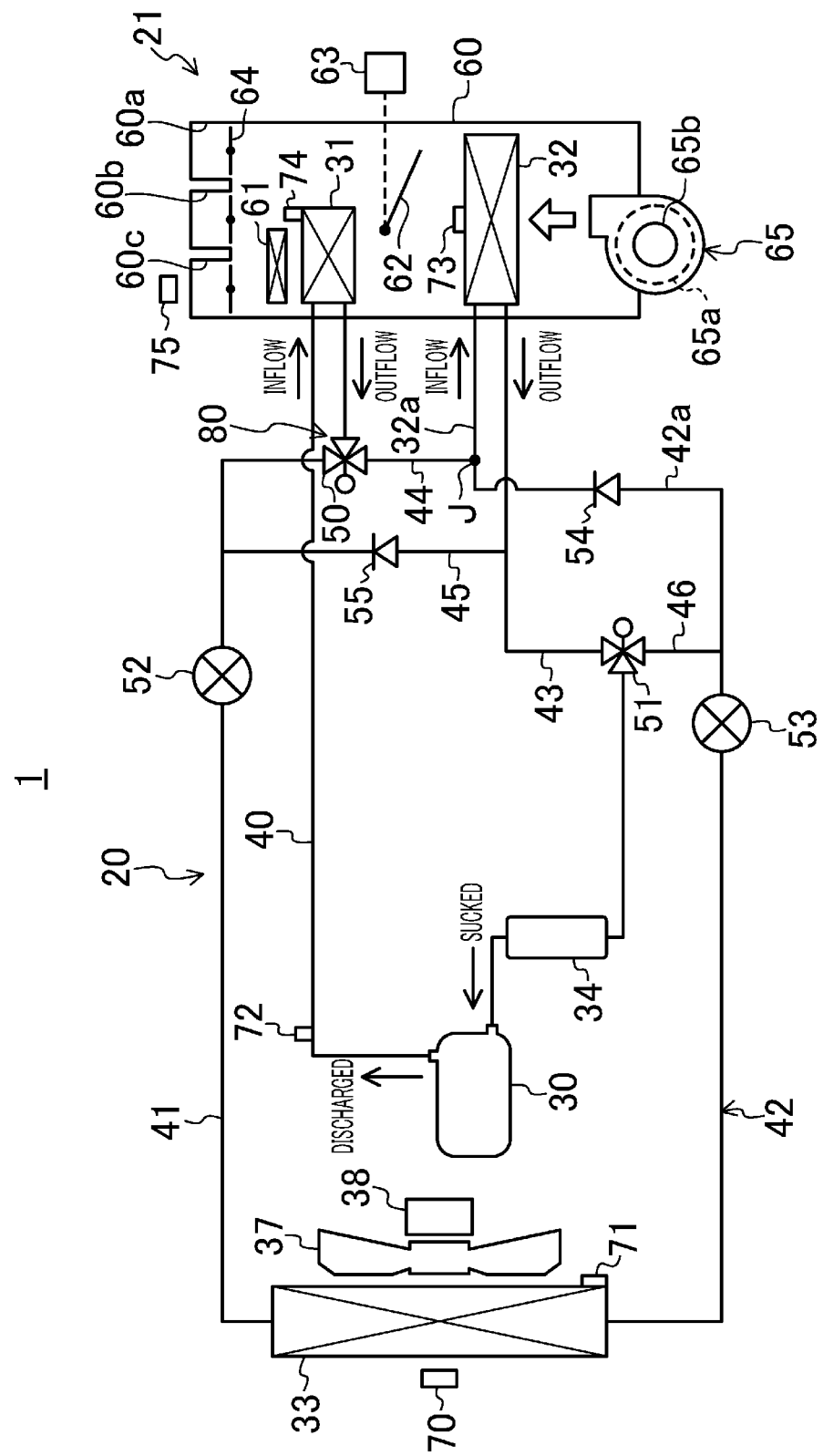
FIG. 13 is a schematic configuration diagram of a vehicle air conditioner of a second embodiment.

FIG. 13 is a schematic configuration diagram of a vehicle air conditioner 1 of a second embodiment (i.e., an embodiment of fourth and fifth aspects of the disclosure) of the present disclosure. The same reference numerals as those shown in the first embodiment will be used to represent equivalent elements in the present embodiment, and the description thereof will not be repeated. Differences from the first embodiment will be described in detail.

A pipe indicated by a reference numeral "45" in the second embodiment is a first branched refrigerant pipe 45.

The first branched refrigerant pipe 45 is branched from a main refrigerant pipe 41, and is connected to a main refrigerant pipe 43. A second branched refrigerant pipe 46 is branched from a main refrigerant pipe 42, and is connected to the main refrigerant pipe 43.

A pipe indicated by a reference numeral "44" in the second embodiment is a high-temperature refrigerant-dedicated pipe 44. The high-temperature refrigerant-dedicated pipe 44 is branched from the main refrigerant pipe 41, and is, through a connection member J, connected to an inlet pipe 32a forming part of an upstream indoor heat exchanger 32. The high-temperature refrigerant-dedicated pipe 44 is for supplying only high-temperature refrigerant to the upstream indoor heat exchanger 32.

Part of the main refrigerant pipe 42 closer to the upstream indoor heat exchanger 32 forms a low-temperature refrigerant-dedicated pipe 42a, and the low-temperature refrigerant-dedicated pipe 42a is for supplying only low-temperature refrigerant to the upstream indoor heat exchanger 32. A high-pressure flow path switching valve 50 and a low-pressure flow path switching valve 51 each serve as a flow path switching device 80 of the present disclosure. The high-temperature refrigerant-dedicated pipe 44 is connected to the high-pressure flow path switching valve 50. The second branched refrigerant pipe 46 is connected to the low-pressure flow path switching valve 51.

A second expansion valve 53 is disposed in the middle of the main refrigerant pipe 42. The low-temperature refrigerant-dedicated pipe 42a is part of the main refrigerant pipe 42 between the second expansion valve 53 and the connection member J.

A first check valve 54 is disposed in the middle of the low-temperature refrigerant-dedicated pipe 42a, and is configured to allow refrigerant to flow from an outdoor heat exchanger 33 toward the upstream indoor heat exchanger 32 in the low-temperature refrigerant-dedicated pipe 42a and to prevent refrigerant from flowing in an opposite direction. A second check valve 55 is disposed in the middle of the first branched refrigerant pipe 45.

Figure 14:
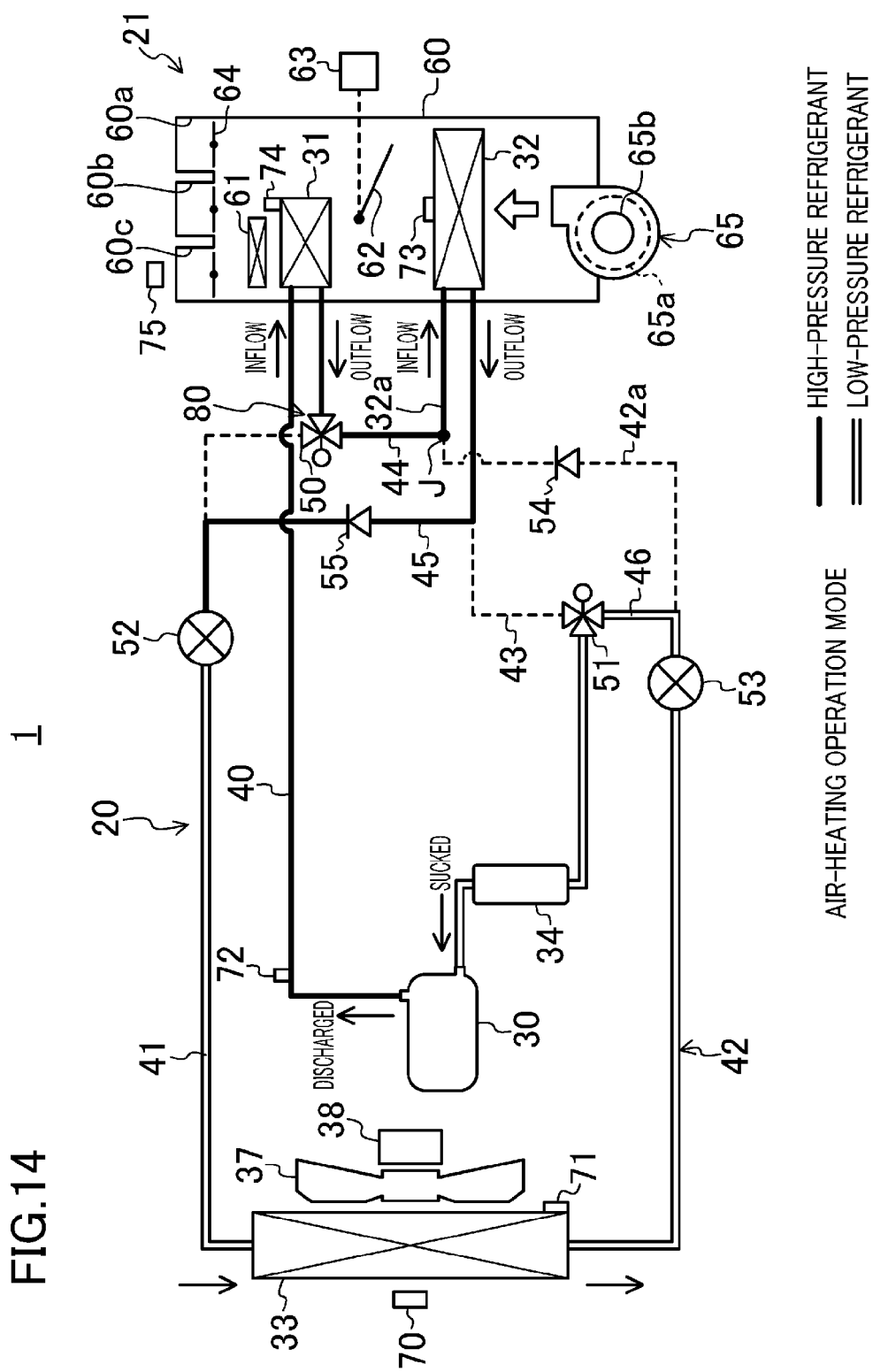
FIG. 14 is a diagram illustrating the case of an air-heating operation mode and corresponding to FIG. 13.

In an air-heating operation mode illustrated in FIG. 14, high-pressure refrigerant discharged from an electric compressor 30 flows into a downstream indoor heat exchanger 31 through a main refrigerant pipe 40, and circulates in the downstream indoor heat exchanger 31. The refrigerant having circulated in the downstream indoor heat exchanger 31 flows into the upstream indoor heat exchanger 32 after passing through the main refrigerant pipe 41, the high-temperature refrigerant-dedicated pipe 44, and the inlet pipe 32a in this order, and circulates in the upstream indoor heat exchanger 32. That is, since the high-temperature refrigerant flows into the downstream indoor heat exchanger 31 and the upstream indoor heat exchanger 32, air-conditioning air is heated by both of the downstream indoor heat exchanger 31 and the upstream indoor heat exchanger 32. As a result, a high air-heating capacity can be realized.

The refrigerant having circulated in the upstream indoor heat exchanger 32 flows from the main refrigerant pipe 43 to the main refrigerant pipe 41 through the first branched refrigerant pipe 45. The refrigerant flowing into the main refrigerant pipe 41 is expanded by passing through a first expansion valve 52, and flows into the outdoor heat exchanger 33. The refrigerant flowing into the outdoor heat exchanger 33 absorbs heat from outdoor air, and passes through the main refrigerant pipe 42 and the second branched refrigerant pipe 46 in this order. The refrigerant is sucked into the electric compressor 30 through the accumulator 34.

Figure 15:
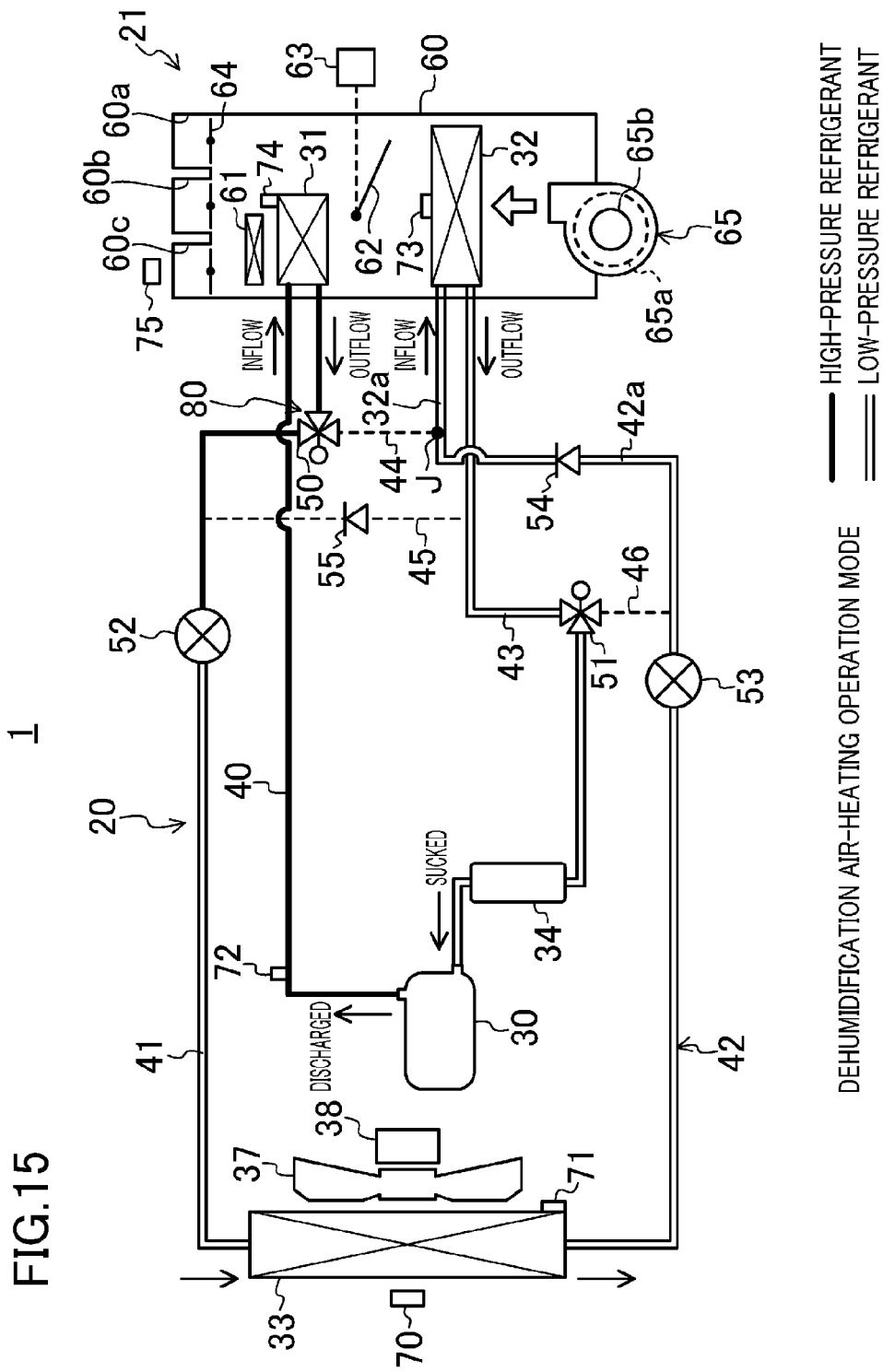
FIG. 15 is a diagram illustrating the case of a dehumidification air-heating operation mode and corresponding to FIG. 13.

In a dehumidification air-heating operation mode illustrated in FIG. 15, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 is expanded by passing through the first expansion valve 52 of the main refrigerant pipe 41, and flows into the outdoor heat exchanger 33. The refrigerant flowing into the outdoor heat exchanger 33 absorbs heat from outdoor air, and flows into the upstream indoor heat exchanger 32 after passing through the main refrigerant pipe 42, the low-temperature refrigerant-dedicated pipe 42a, and the inlet pipe 32a in this order. Then, the refrigerant circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 16:
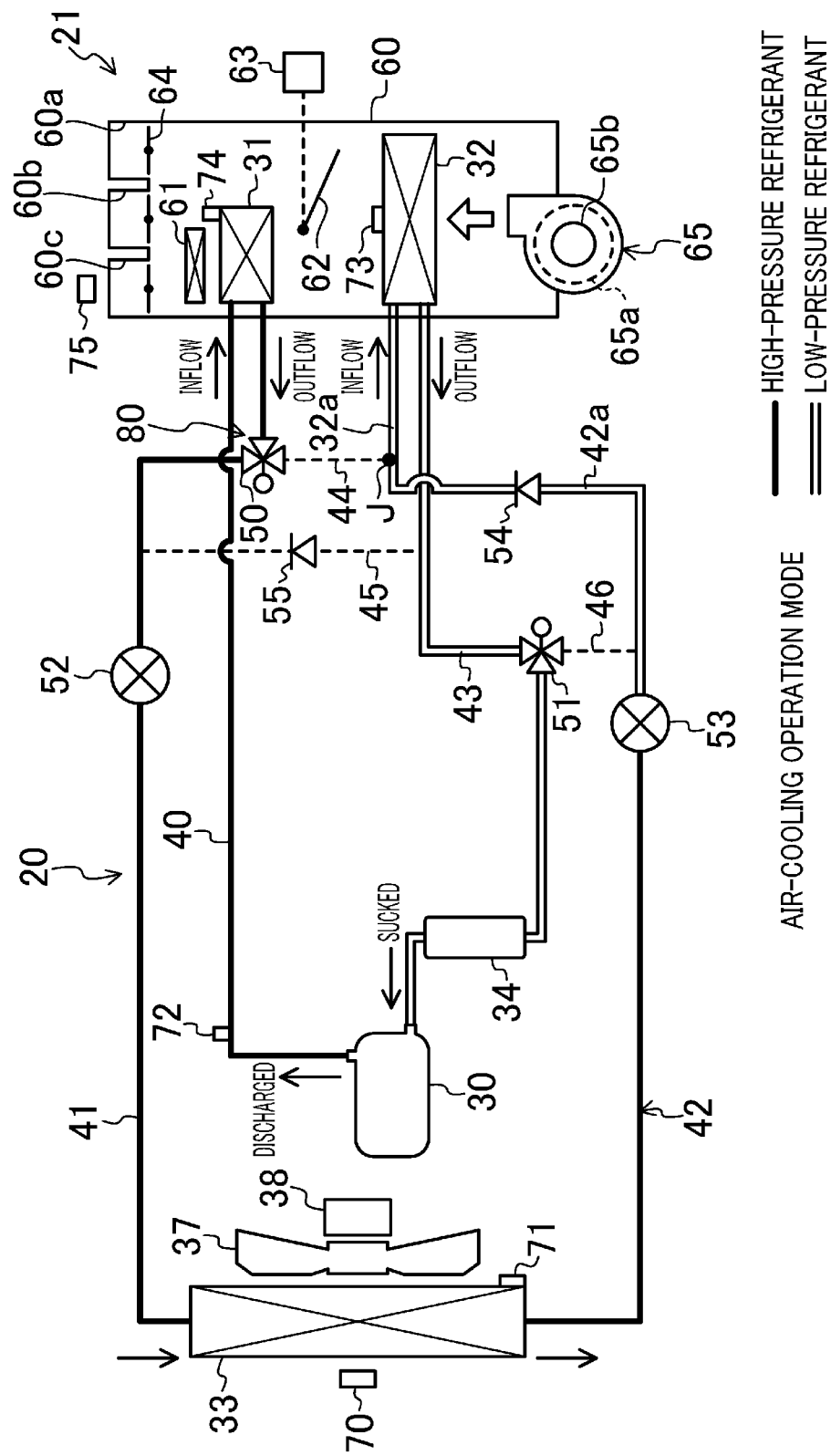
FIG. 16 is a diagram illustrating the case of an air-cooling operation mode and corresponding to FIG. 13.

In an air-cooling operation mode illustrated in FIG. 16, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows, without being expanded, into the outdoor heat exchanger 33 through the main refrigerant pipe 41. The refrigerant flowing into the outdoor heat exchanger 33 dissipates heat, and is expanded by passing through the second expansion valve 53 of the main refrigerant pipe 42. Then, the refrigerant flows into the upstream indoor heat exchanger 32 through the low-temperature refrigerant-dedicated pipe 42a and the inlet pipe 32a. The refrigerant flowing into the upstream indoor heat exchanger 32 circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 17:
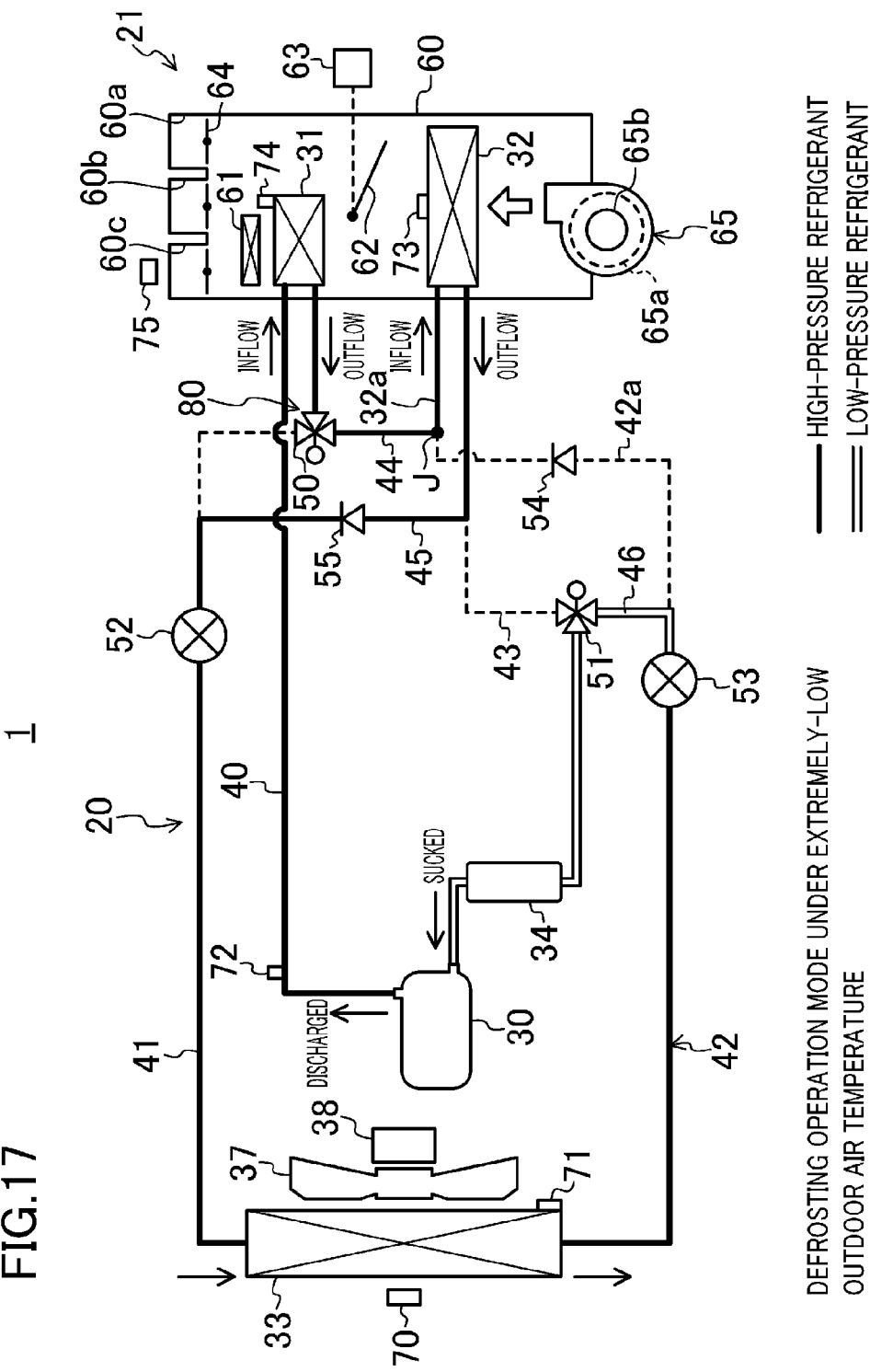
FIG. 17 is a diagram illustrating the case of a defrosting operation mode under extremely-low outdoor air temperature and corresponding to FIG. 13.

In a defrosting operation mode under extremely-low outdoor air temperature as illustrated in FIG. 17, the high-pressure flow path switching valve 50 and the low-pressure flow path switching valve 51 are in the same state as that of the air-heating operation mode. Moreover, the first expansion valve 52 is in a non-expansion state, and the second expansion valve 53 is in an expansion state. Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

Figure 18:
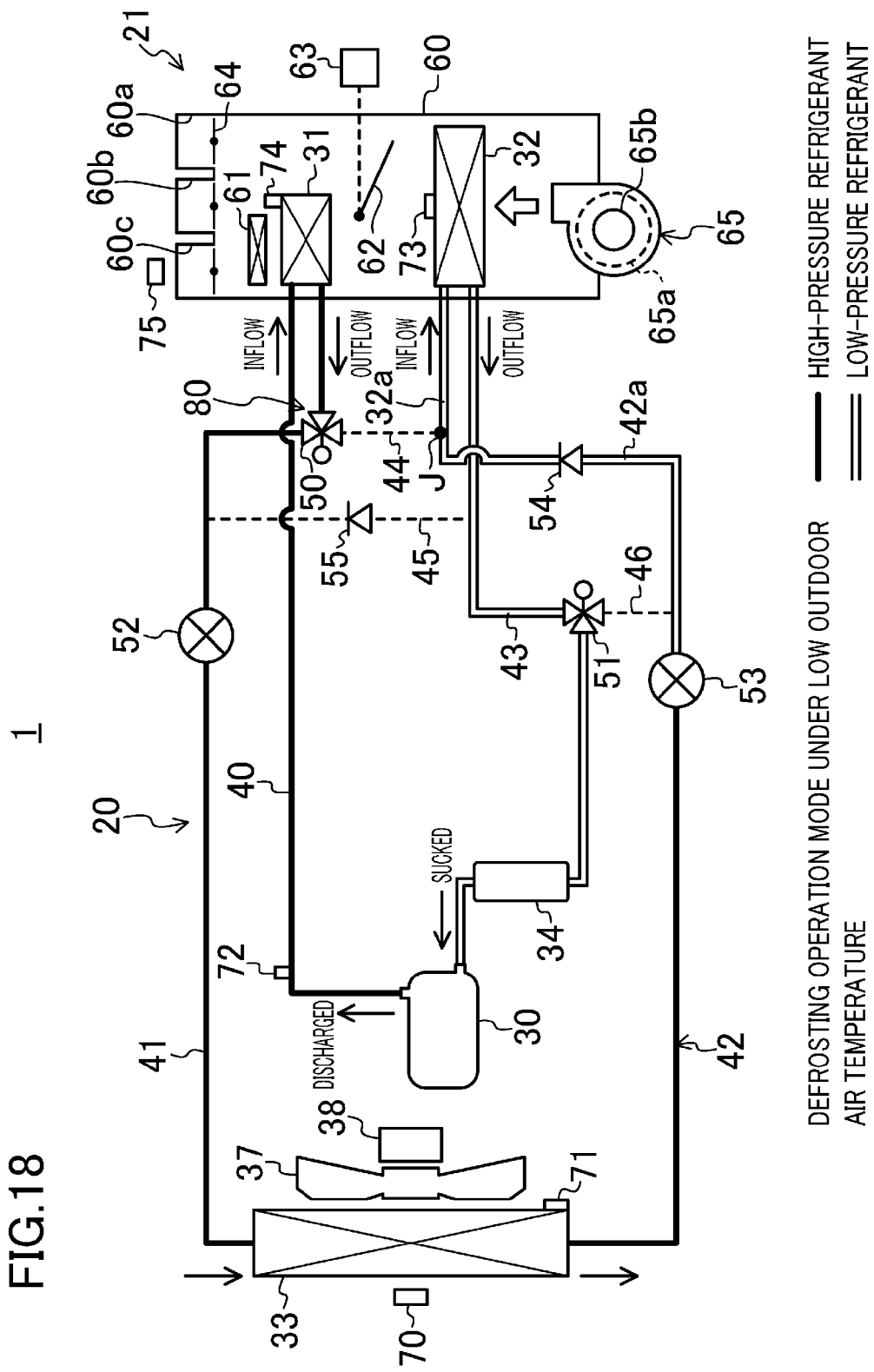
FIG. 18 is a diagram illustrating the case of a defrosting operation mode under low outdoor air temperature and corresponding to FIG. 13.

In a defrosting operation mode under low outdoor air temperature as illustrated in FIG. 18, the high-pressure flow path switching valve 50 and the low-pressure flow path switching valve 51 are in the same state as that of the dehumidification air-heating operation mode. Moreover, the first expansion valve 52 is in the non-expansion state, and the second expansion valve 53 is in the expansion state. Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

In any of the operation modes, refrigerant flowing out from the downstream indoor heat exchanger 31 is high-temperature refrigerant, and refrigerant flowing from the high-pressure flow path switching valve 50 to the high-temperature refrigerant-dedicated pipe 44 is high-temperature refrigerant. Moreover, in any of the operation modes, low-temperature refrigerant flows through the low-temperature refrigerant-dedicated pipe 42a of the main refrigerant pipe 42 closer to the upstream indoor heat exchanger 32 relative to the second expansion valve 53.

As described above, according to the vehicle air conditioner 1 of the second embodiment, high-temperature refrigerant is supplied to the upstream indoor heat exchanger 32 through the high-temperature refrigerant-dedicated pipe 44 in the air-heating operation mode. On the other hand, low-temperature refrigerant is supplied to the upstream indoor heat exchanger 32 through the low-temperature refrigerant-dedicated pipe 42a in the air-cooling operation mode.

Thus, when a heat pump device 20 is switched from the air-heating operation mode to the air-cooling operation mode, low-temperature refrigerant can be supplied to the upstream indoor heat exchanger 32 without the low-temperature refrigerant flowing through the high-temperature refrigerant-dedicated pipe 44 through which high-temperature refrigerant flows before switching of the operation mode. Consequently, occurrence of thermal loss can be reduced. Also when the heat pump device 20 is switched from the air-cooling operation mode to the air-heating operation mode, high-temperature refrigerant can be supplied to the upstream indoor heat exchanger 32 without the high-temperature refrigerant flowing through the low-temperature refrigerant-dedicated pipe 42a through which low-temperature refrigerant flows before switching of the operation mode. Consequently, occurrence of thermal loss can be reduced.

This can save energy, and can improve passenger's comfort.

Similarly, occurrence of thermal loss can be also reduced in the dehumidification air-heating operation mode, the defrosting operation mode under extremely-low outdoor air temperature, and the defrosting operation mode under low outdoor air temperature.

Although both of the high-pressure flow path switching valve 50 and the low-pressure flow path switching valve 51 of the heat pump device 20 are three-way valves in the second embodiment, one or both of such valves may be configured in such a manner that two on-off valves are combined together. A flow path switching unit is not limited.

Third Embodiment

Figure 19:
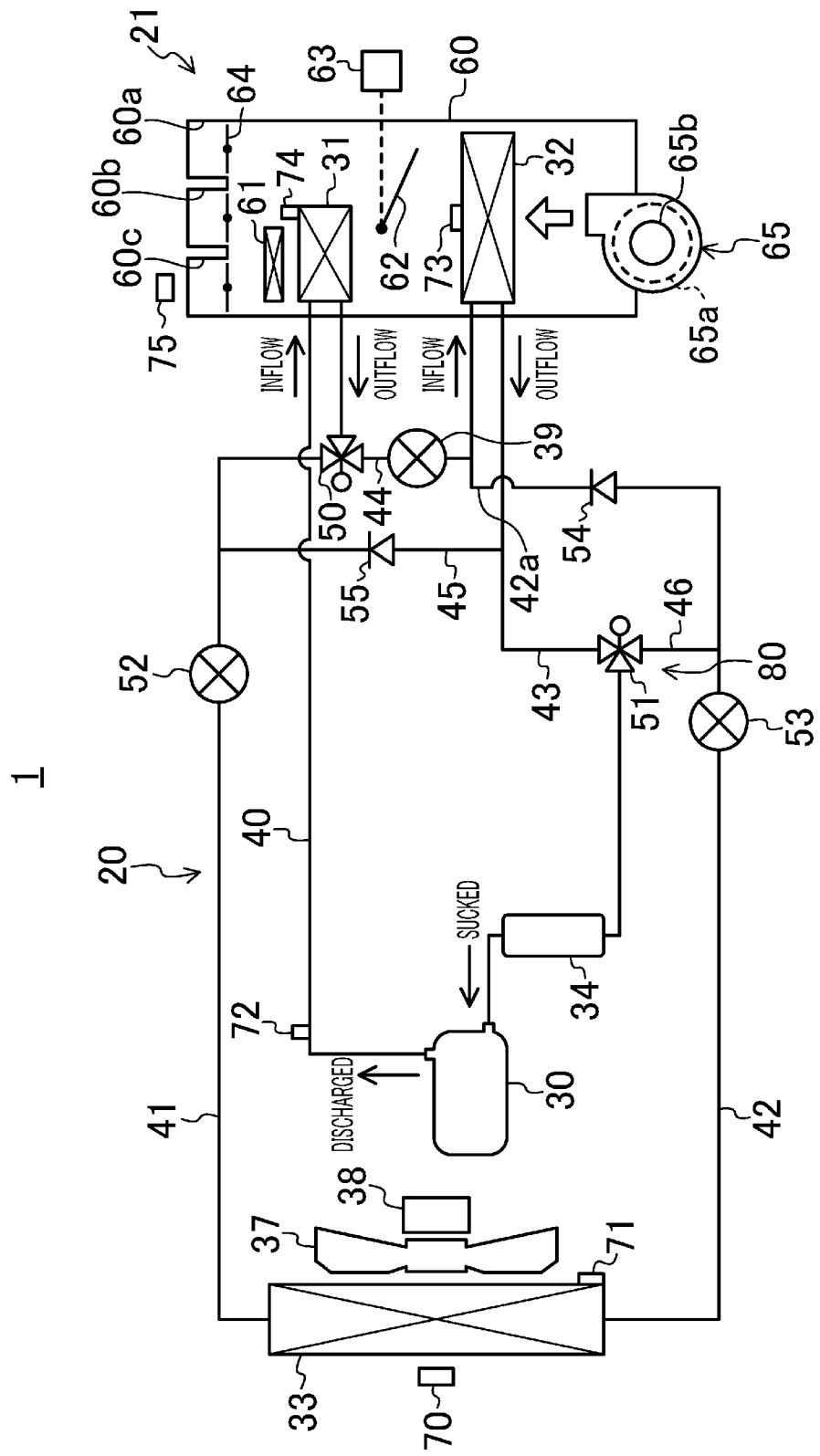
FIG. 19 is a schematic configuration diagram of a vehicle air conditioner of a third embodiment.

FIG. 19 is a schematic configuration diagram of a vehicle air conditioner 1 of a third embodiment (i.e., an embodiment of sixth to eighth aspects of the disclosure) of the present disclosure. The same reference numerals as those shown in the first embodiment will be used to represent equivalent elements in the present embodiment, and the description thereof will not be repeated. Differences from the first embodiment will be described in detail.

A pipe indicated by a reference numeral "45" in the third embodiment is a first branched refrigerant pipe 45. The first branched refrigerant pipe 45 is branched from a main refrigerant pipe 41, and is connected to a main refrigerant pipe 43. A second branched refrigerant pipe 46 is branched from part of a main refrigerant pipe 42 closer to an outdoor heat exchanger 33 relative to a low-temperature refrigerant-dedicated pipe 42a, and is connected to the main refrigerant pipe 43.

A pipe indicated by a reference numeral "44" in the third embodiment is a high-temperature refrigerant-dedicated pipe 44. The high-temperature refrigerant-dedicated pipe 44 is branched from the main refrigerant pipe 41, and is, through a connection member, connected to an inlet pipe forming part of an upstream indoor heat exchanger 32. The high-temperature refrigerant-dedicated pipe 44 is for supplying only high-temperature refrigerant (high-pressure refrigerant) to the upstream indoor heat exchanger 32, and serves as a high-pressure refrigerant pipe of the present disclosure.

Moreover, the high-temperature refrigerant-dedicated pipe 44 is, as described above, branched from the main refrigerant pipe 41 connected to a refrigerant outlet of the downstream indoor heat exchanger 31, and is connected to the inlet pipe of the upstream indoor heat exchanger 32. Thus, the high-temperature refrigerant-dedicated pipe 44 serves as a connection pipe connecting between the refrigerant outlet of the downstream indoor heat exchanger 31 and a refrigerant inlet of the upstream indoor heat exchanger 32.

Figure 20:
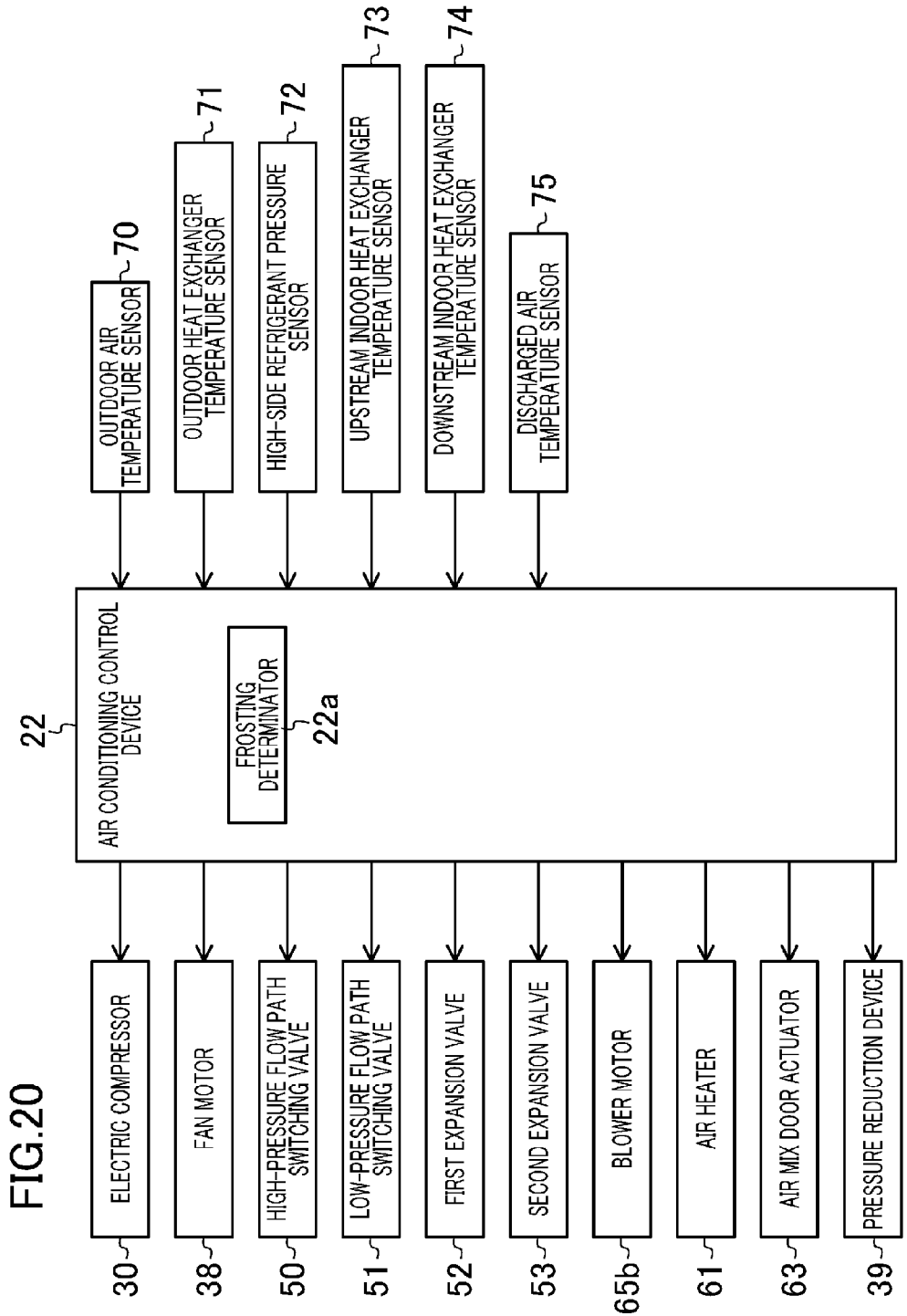
FIG. 20 is a block diagram of the vehicle air conditioner.

A pressure reduction device 39 is provided at the high-temperature refrigerant-dedicated pipe 44. The pressure reduction device 39 includes an electric pressure reduction valve configured to reduce the pressure of refrigerant flowing into the upstream indoor heat exchanger 32. The pressure reduction device 39 is connected to an air conditioning control device 22 as illustrated in FIG. 20, and the opening degree (pressure reduction degree) of the pressure reduction device 39 is controlled by the air conditioning control device 22.

The pressure reduction device 39 includes a sensor (not shown in the figure) configured to determine the pressure of refrigerant flowing into the upstream indoor heat exchanger 32, and the refrigerant pressure determined by the sensor is input to the air conditioning control device 22. The air conditioning control device 22 changes the pressure reduction degree of the pressure reduction device 39 based on the pressure value input from the sensor.

Specifically, when a heat pump device 20 is in a later-described air-heating operation mode, the pressure reduction device 39 is controlled to a pressure reduction state, i.e., the electric pressure reduction valve is controlled from an open state in a throttling direction. When the pressure reduction device 39 is in the pressure reduction state, a throttle amount is adjusted such that refrigerant having a temperature higher than the temperature of air-conditioning air flowing outside the upstream indoor heat exchanger 32 flows into the upstream indoor heat exchanger 32. Thus, the upstream indoor heat exchanger 32 serves as a radiator in the air-heating operation mode. Moreover, since the pressure reduction device 39 is provided, the pressure of refrigerant flowing into the upstream indoor heat exchanger 32 in the air-heating operation mode can be reduced.

The air conditioning control device 22 controls the pressure reduction device 39 such that the internal pressure of the upstream indoor heat exchanger 32 becomes equal to or less than a certain value. This prevents the internal pressure of the upstream indoor heat exchanger 32 from excessively increasing, and stabilizes the air-heating capacity of the upstream indoor heat exchanger 32.

As in the air-heating operation mode, the pressure reduction device 39 is also in the pressure reduction state in a later-described defrosting operation mode under extremely-low outdoor air temperature.

Part of the main refrigerant pipe 42 closer to the upstream indoor heat exchanger 32 forms the low-temperature refrigerant-dedicated pipe 42a, and the low-temperature refrigerant-dedicated pipe 42a is for supplying only low-temperature refrigerant (low-pressure refrigerant) to the upstream indoor heat exchanger 32. The low-temperature refrigerant-dedicated pipe 42a serves as a low-pressure refrigerant pipe of the present disclosure.

The heat pump device 20 further includes a high-pressure flow path switching valve (high-pressure on-off valve) 50, a low-pressure flow path switching valve (low-pressure on-off valve) 51, a first expansion valve 52, a second expansion valve 53, a first check valve 54, and a second check valve 55. Each of the high-pressure flow path switching valve 50 and the low-pressure flow path switching valve 51 is a flow path switching device 80 configured to select a refrigerant pipe such that refrigerant flows into the upstream indoor heat exchanger 32 through one of the high-temperature refrigerant-dedicated pipe 44 or the low-temperature refrigerant-dedicated pipe 42a.

The high-pressure flow path switching valve 50 is provided in the middle of the main refrigerant pipe 41, and is connected to the high-temperature refrigerant-dedicated pipe 44. The low-pressure flow path switching valve 51 is provided in the middle of the main refrigerant pipe 43, and is connected to the second branched refrigerant pipe 46.

The first expansion valve 52 is disposed at part of the main refrigerant pipe 41 closer to the outdoor heat exchanger 33 relative to the high-pressure flow path switching valve 50. The second expansion valve 53 is disposed in the middle of the main refrigerant pipe 42. The low-temperature refrigerant-dedicated pipe 42a is part of the main refrigerant pipe 42 between the second expansion valve 53 and the inlet pipe of the upstream indoor heat exchanger 32.

The first check valve 54 is disposed in the middle of the low-temperature refrigerant-dedicated pipe 42a, and is configured to allow refrigerant to flow from the outdoor heat exchanger 33 toward the upstream indoor heat exchanger 32 in the low-temperature refrigerant-dedicated pipe 42a and to prevent refrigerant from flowing in an opposite direction.

The second check valve 55 is disposed in the middle of the first branched refrigerant pipe 45, and is configured to allow refrigerant to flow from the main refrigerant pipe 43 toward the main refrigerant pipe 41 in the first branched refrigerant pipe 45 and to prevent refrigerant from flowing in an opposite direction.

The operation mode of the heat pump device 20 includes five types of operation modes: the air-heating operation mode; a dehumidification air-heating operation mode; an air-cooling operation mode; the defrosting operation mode under extremely-low outdoor air temperature; and a defrosting operation mode under low outdoor air temperature.

Figure 21:
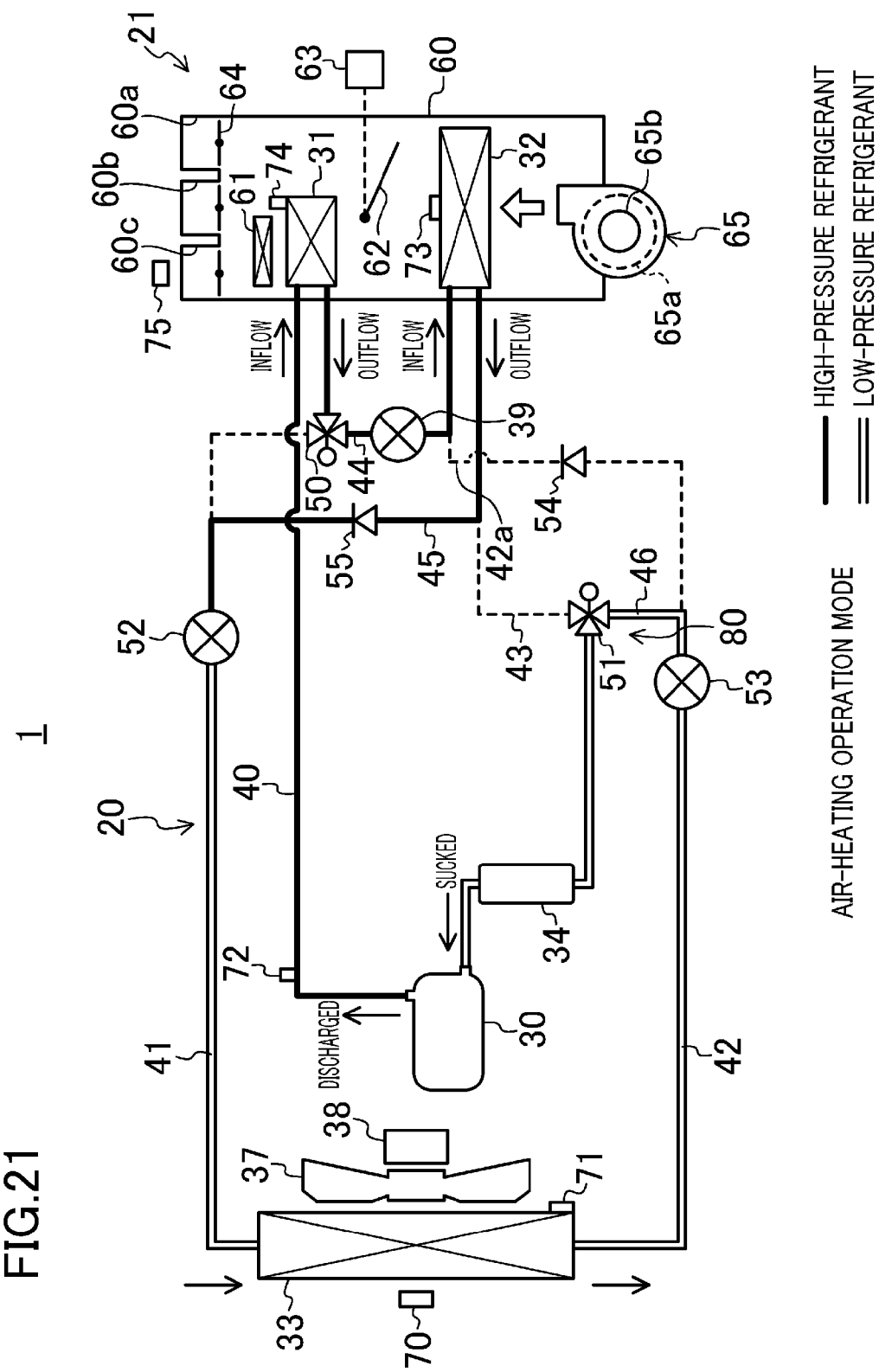
FIG. 21 is a diagram illustrating the case of an air-heating operation mode and corresponding to FIG. 19.

In the air-heating operation mode illustrated in FIG. 21, high-pressure refrigerant discharged from an electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows into the first branched refrigerant pipe 44 through the main refrigerant pipe 41, and then is depressurized by passing through the pressure reduction device 39. Subsequently, the refrigerant flows into the upstream indoor heat exchanger 32 through the inlet pipe thereof, and circulates in the upstream indoor heat exchanger 32.

The pressure reduction degree of the pressure reduction device 39 is set such that the temperature of refrigerant flowing into the upstream indoor heat exchanger 32 becomes higher than the temperature of air-conditioning air as described above. Accordingly, the surface temperature of the upstream indoor heat exchanger 32 increases higher than the temperature of air-conditioning air, and air-conditioning air passing through the upstream indoor heat exchanger 32 is heated.

That is, since high-temperature refrigerant flows into the downstream indoor heat exchanger 31 and the upstream indoor heat exchanger 32 in the air-heating operation mode, air-conditioning air is heated by both of the downstream indoor heat exchanger 31 and the upstream indoor heat exchanger 32. As a result, a high air-heating capacity can be realized.

Moreover, since depressurized refrigerant flows into the upstream indoor heat exchanger 32, the pressure capacity and repetitive compression strength of the upstream indoor heat exchanger 32 can be low.

The refrigerant having circulated in the upstream indoor heat exchanger 32 flows from the main refrigerant pipe 43 to the main refrigerant pipe 41 through the second branched refrigerant pipe 45. The refrigerant flowing into the main refrigerant pipe 41 is expanded by passing through the first expansion valve 52, and flows into the outdoor heat exchanger 33. The refrigerant flowing into the outdoor heat exchanger 33 absorbs heat from outdoor air. Then, the refrigerant passes through the main refrigerant pipe 42 and the second branched refrigerant pipe 46 in this order, and is sucked into the electric compressor 30 through an accumulator 34.

Figure 22:
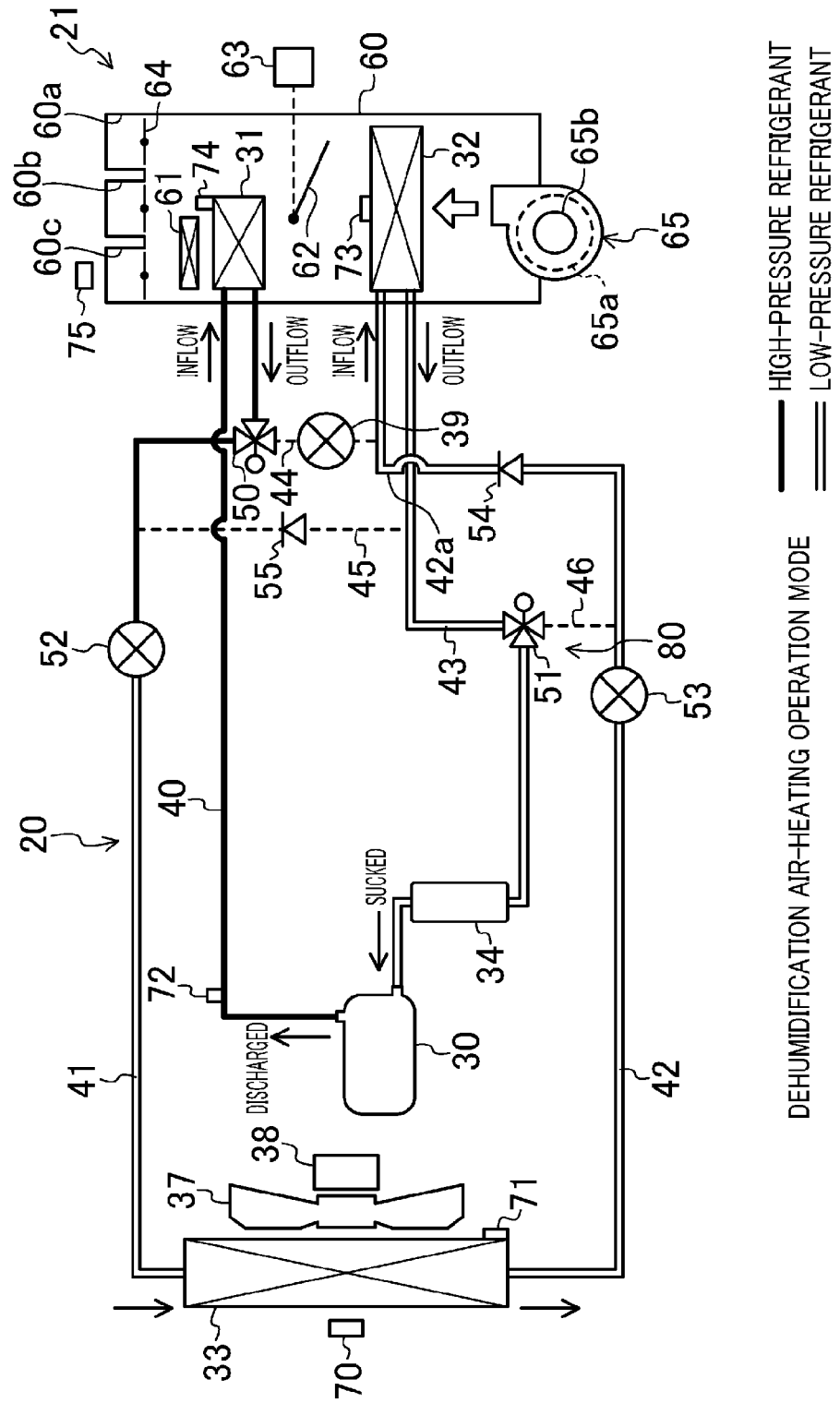
FIG. 22 is a diagram illustrating the case of a dehumidification air-heating operation mode and corresponding to FIG. 19.

In the dehumidification air-heating operation mode illustrated in FIG. 22, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 is expanded by passing through the first expansion valve 52 of the main refrigerant pipe 41, and flows into the outdoor heat exchanger 33. The refrigerant flowing into the outdoor heat exchanger 33 absorbs heat from outdoor air, and flows into the upstream indoor heat exchanger 32 after passing through the main refrigerant pipe 42 and the low-temperature refrigerant-dedicated pipe 42a in this order. Then, the refrigerant circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 23:
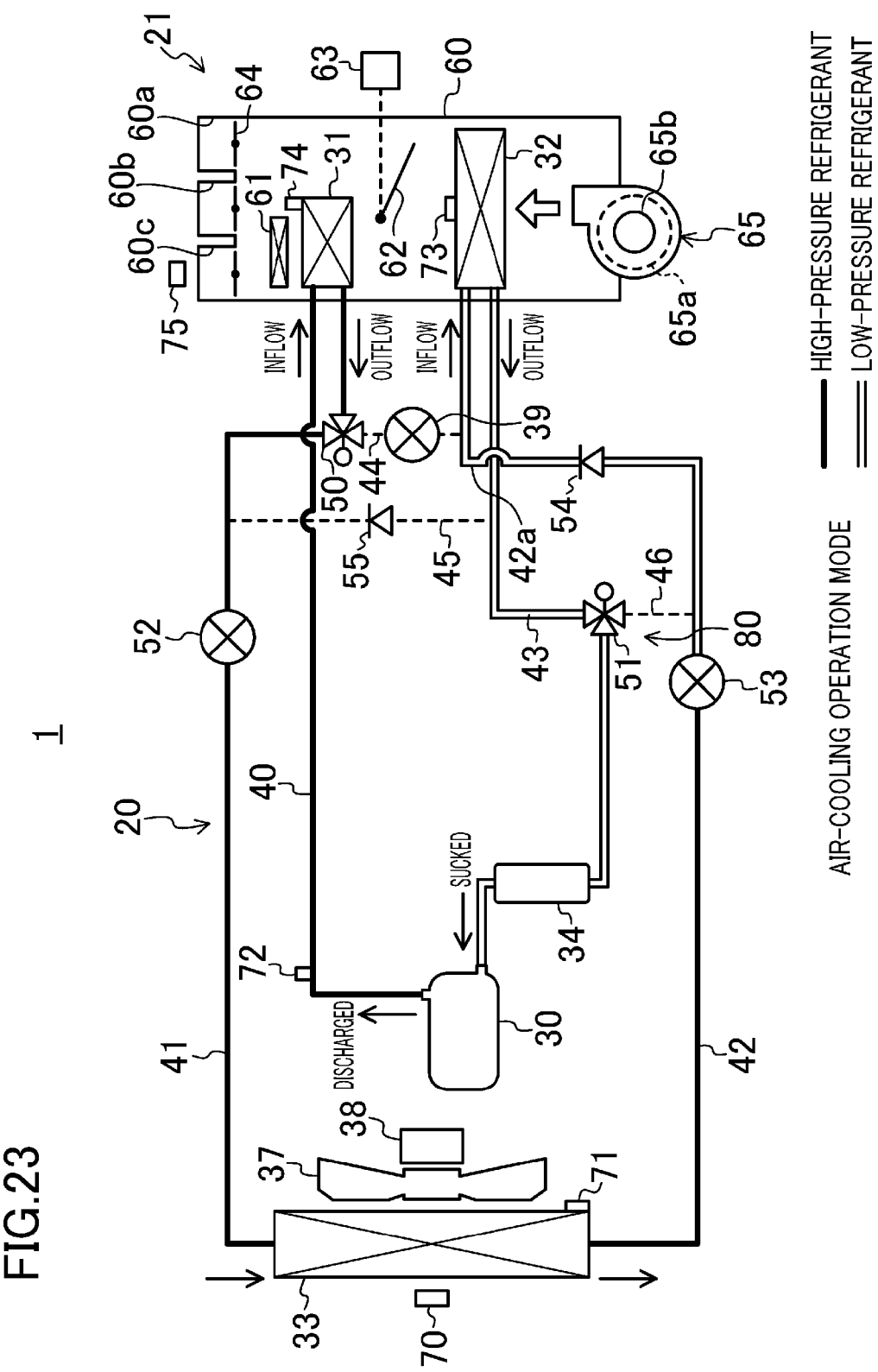
FIG. 23 is a diagram illustrating the case of an air-cooling operation mode and corresponding to FIG. 19.

In the air-cooling operation mode illustrated in FIG. 23, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows, without being expanded, into the outdoor heat exchanger 33 through the main refrigerant pipe 41. The refrigerant flowing into the outdoor heat exchanger 33 dissipates heat, and is expanded by passing through the second expansion valve 53 of the main refrigerant pipe 42. Then, the refrigerant flows into the upstream indoor heat exchanger 32 through the low-temperature refrigerant-dedicated pipe 42a. As just described, since low-pressure refrigerant flows into the upstream indoor heat exchanger 32 in the air-cooling operation mode, the pressure capacity and repetitive compression strength of the upstream indoor heat exchanger 32 can be low.

Although not shown in the figure, a pressure sensor configured to determine the internal pressure of the upstream indoor heat exchanger 32 may be provided, and the pressure reduction degree of the pressure reduction device 39 may be controlled based on the pressure value output from the pressure sensor. That is, when the internal pressure of the upstream indoor heat exchanger 32 is at a high level, the pressure reduction degree of the pressure reduction device 39 is increased in order to lower the internal pressure of the upstream indoor heat exchanger 32. On the other hand, when the internal pressure of the upstream indoor heat exchanger 32 is sufficiently low, the pressure reduction degree of the pressure reduction device 39 is lowered.

The air conditioning control device 22 may be configured to determine whether or not the received pressure reduction degree of the pressure reduction device 39 is the lower limit (i.e., the minimum) and to decrease the discharge amount of the electric compressor 30 of the heat pump device 20 when the pressure of refrigerant flowing into the upstream indoor heat exchanger 32 increases in the state in which the pressure reduction degree is the minimum. Thus, a change in energy amount consumed by the electric compressor 30 can be reduced, as well as reducing an increase in internal pressure of the upstream indoor heat exchanger 32.

Figure 24:
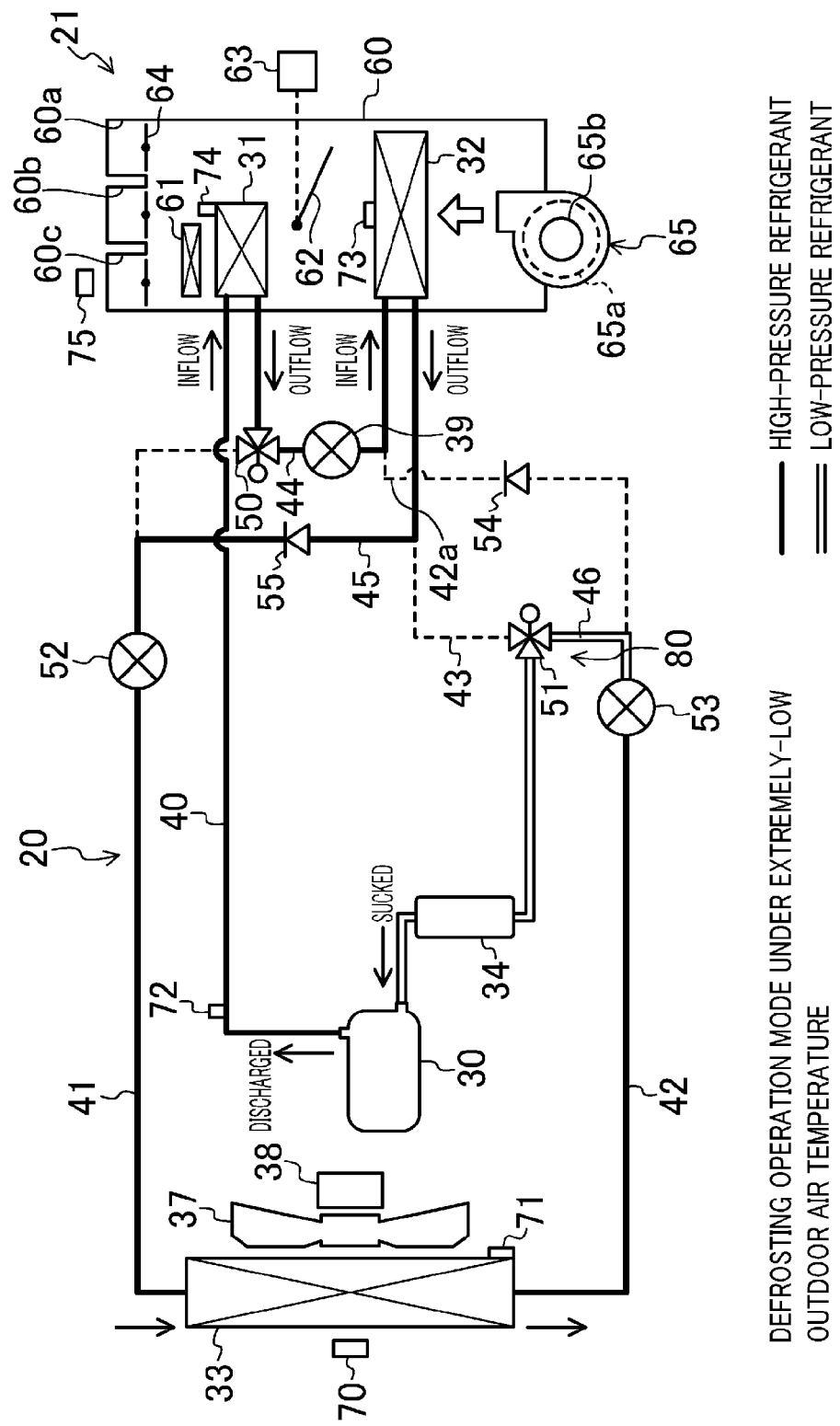
FIG. 24 is a diagram illustrating the case of a defrosting operation mode under extremely-low outdoor air temperature and corresponding to FIG. 19.

In the defrosting operation mode under extremely-low outdoor air temperature as illustrated in FIG. 24, the high-pressure flow path switching valve 50 and the low-pressure flow path switching valve 51 are in the same state as that of the air-heating operation mode. Moreover, the first expansion valve 52 is in a non-expansion state, and the second expansion valve 53 is in an expansion state. Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

In the defrosting operation mode under extremely-low outdoor air temperature, high-pressure refrigerant flowing out from the downstream indoor heat exchanger 31 is also depressurized by passing through the pressure reduction device 39, and then flows into the upstream indoor heat exchanger 32. Thus, the pressure capacity and repetitive compression strength of the upstream indoor heat exchanger 32 can be low. Moreover, air-conditioning air can be heated by the upstream indoor heat exchanger 32.

Figure 25:
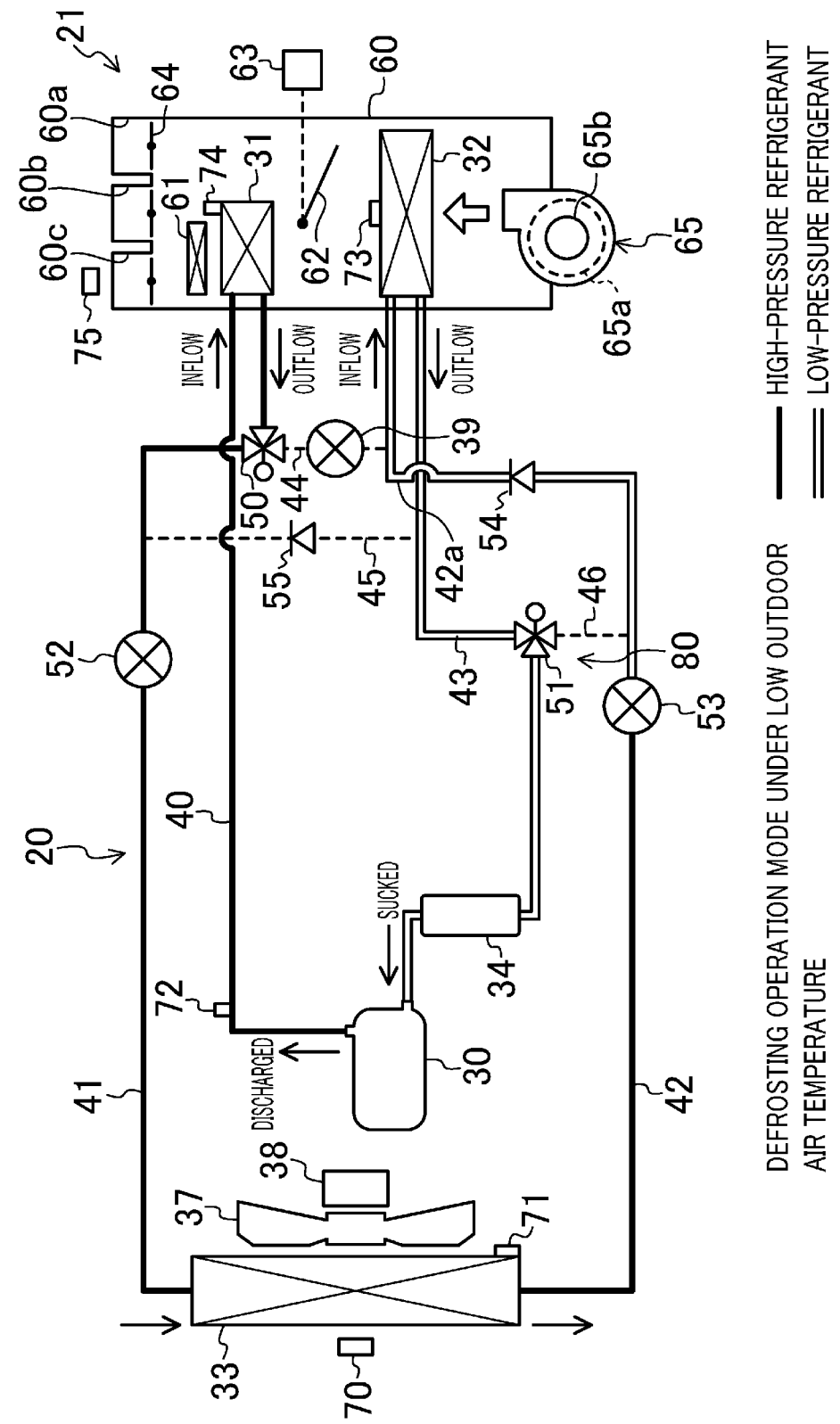
FIG. 25 is a diagram illustrating the case of a defrosting operation mode under low outdoor air temperature and corresponding to FIG. 19.

In the defrosting operation mode under low outdoor air temperature as illustrated in FIG. 25, the high-pressure flow path switching valve 50 and the low-pressure flow path switching valve 51 are in the same state as that of the dehumidification air-heating operation mode. Moreover, the first expansion valve 52 is in the non-expansion state, and the second expansion valve 53 is in the expansion state. Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

As described above, according to the vehicle air conditioner 1 of the third embodiment, refrigerant depressurized by the pressure reduction device 39 flows into the upstream indoor heat exchanger 32 in the air-heating operation mode. The pressure reduction degree of the pressure reduction device 39 in this state is set such that the upstream indoor heat exchanger 32 serves as the radiator. Thus, both of the downstream indoor heat exchanger 31 and the upstream indoor heat exchanger 32 can serve as the radiators. Consequently, a sufficient air-heating capacity in the air-heating operation mode can be realized.

Since refrigerant depressurized by the pressure reduction device 39 flows, as described above, into the upstream indoor heat exchanger 32, the internal pressure of the upstream indoor heat exchanger 32 decreases. Thus, the pressure capacity and repetitive compression strength of the upstream indoor heat exchanger 32 can be low, and the cost of the upstream indoor heat exchanger 32 can be reduced.

Although both of the high-pressure flow path switching valve 50 and the low-pressure flow path switching valve 51 of the heat pump device 20 are three-way valves in the third embodiment, one or both of such valves may be configured in such a manner that two on-off valves are combined together. A flow path switching unit is not limited.

Figure 26:
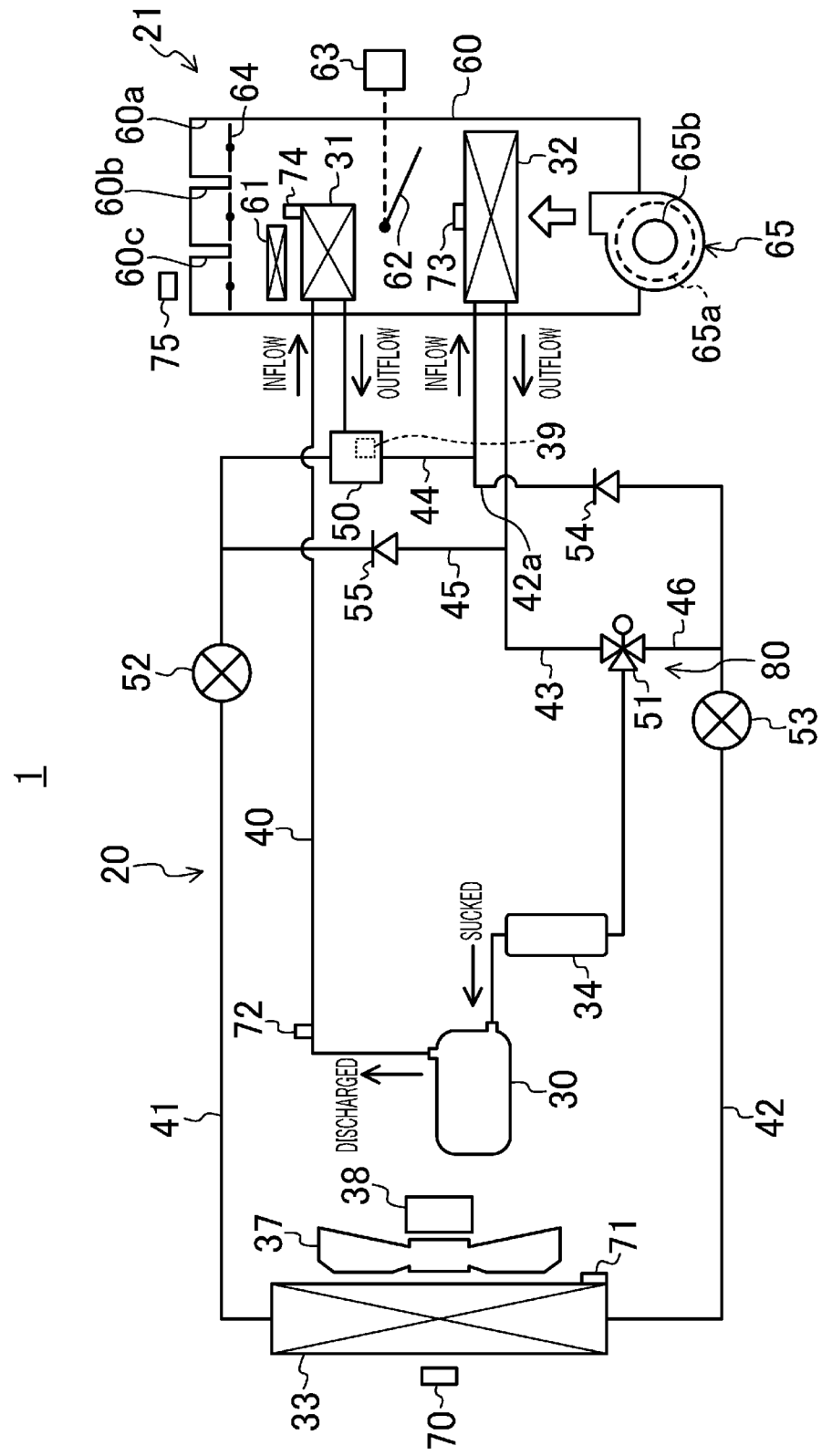
FIG. 26 is a diagram illustrating a variation and corresponding to FIG. 19.

The pressure reduction device 39 is provided in the middle of the high-temperature refrigerant-dedicated pipe 44 in the third embodiment, but the present disclosure is not limited to such a configuration. As in a variation illustrated in FIG. 26, the pressure reduction device 39 may be built in the high-pressure flow path switching valve 50. This reduces the number of components as compared to the case where the pressure reduction device 39 is provided independently of the high-pressure flow path switching valve 50. Moreover, both of a joint part of the high-pressure flow path switching valve 50 and a joint part of the pressure reduction device 39 are not necessarily formed, and only the joint part of the high-pressure flow path switching valve 50 may be formed. Thus, the number of joint parts among the refrigerant pipes in the heat pump device 20 can be reduced. Consequently, cost can be further reduced.

Moreover, although it has been, in the third embodiment, described that the pressure reduction device 39 includes the electric pressure reduction valve (variable throttle), the pressure reduction device 39 may include a fixed throttle such as an orifice.

Fourth Embodiment

Figure 27:
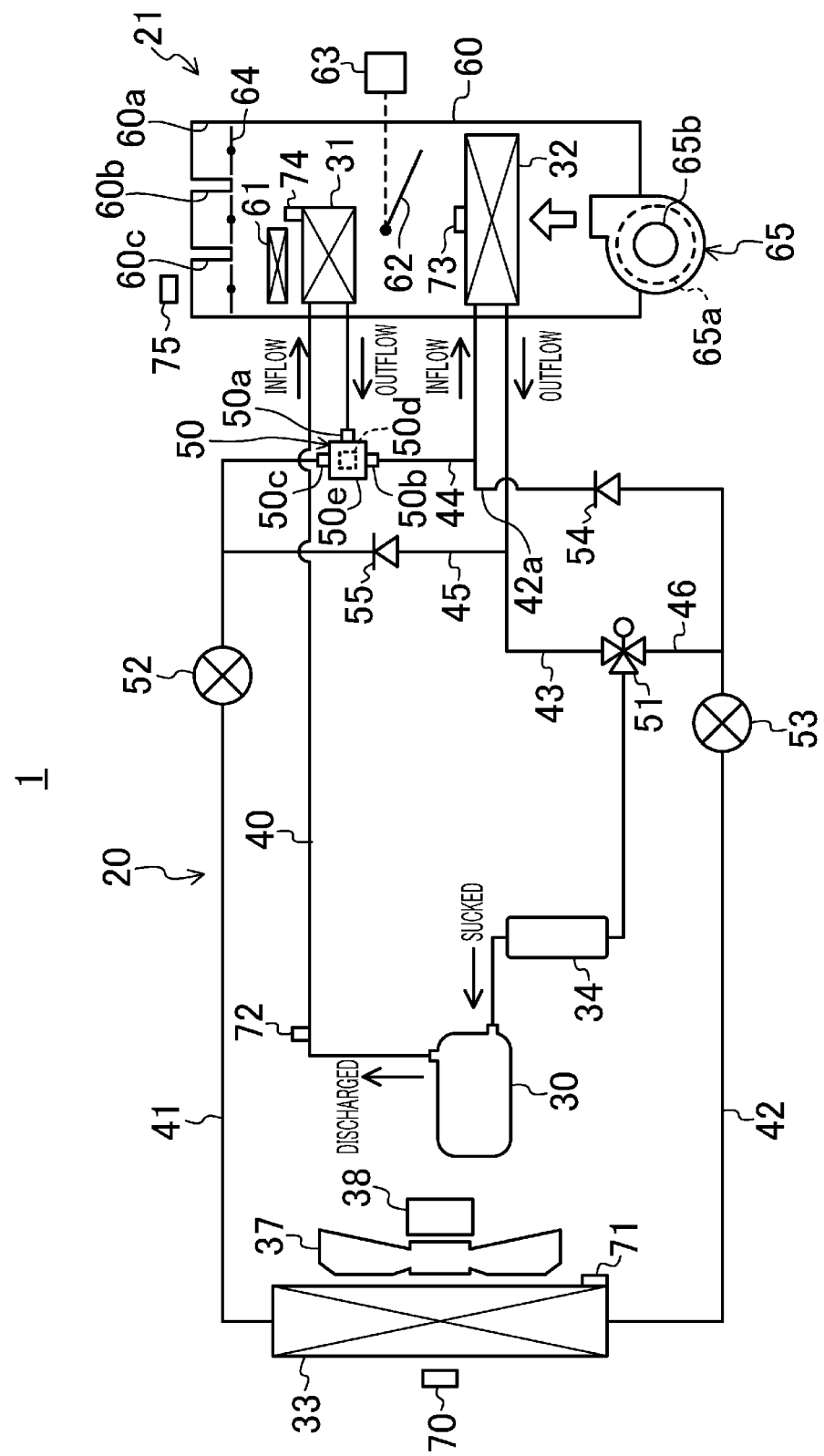
FIG. 27 is a schematic configuration diagram of a vehicle air conditioner of a fourth embodiment.

FIG. 27 is a schematic configuration diagram of a vehicle air conditioner 1 of a fourth embodiment (i.e., an embodiment of ninth and tenth aspects of the disclosure) of the present disclosure. The same reference numerals as those shown in the first embodiment will be used to represent equivalent elements in the present embodiment, and the description thereof will not be repeated. Differences from the first embodiment will be described in detail.

A pipe indicated by a reference numeral "45" in the fourth embodiment is a first branched refrigerant pipe 45. The first branched refrigerant pipe 45 is connected to a main refrigerant pipe 43. A second branched refrigerant pipe 46 is branched from part of a main refrigerant pipe 42 closer to an outdoor heat exchanger 33 relative to a low-temperature refrigerant-dedicated pipe 42a, and is connected to the main refrigerant pipe 43.

A pipe indicated by a reference numeral "44" in the fourth embodiment is a high-temperature refrigerant-dedicated pipe 44. The high-temperature refrigerant-dedicated pipe 44 is branched from a main refrigerant pipe 41, and is, through a connection member (not shown in the figure), connected to an inlet pipe forming part of an upstream indoor heat exchanger 32. The high-temperature refrigerant-dedicated pipe 44 is for supplying only high-temperature refrigerant (high-pressure refrigerant) to the upstream indoor heat exchanger 32.

Moreover, the high-temperature refrigerant-dedicated pipe 44 is, as described above, branched from the main refrigerant pipe 41 connected to a refrigerant outlet of a downstream indoor heat exchanger 31, and is connected to the inlet pipe of the upstream indoor heat exchanger 32. Thus, the high-temperature refrigerant-dedicated pipe 44 serves as a connection pipe connecting between the refrigerant outlet of the downstream indoor heat exchanger 31 and a refrigerant inlet of the upstream indoor heat exchanger 32.

Part of the main refrigerant pipe 42 closer to the upstream indoor heat exchanger 32 forms the low-temperature refrigerant-dedicated pipe 42a, and the low-temperature refrigerant-dedicated pipe 42a is for supplying only low-temperature refrigerant (low-pressure refrigerant) to the upstream indoor heat exchanger 32.

A high-pressure flow path switching valve 50 includes a refrigerant inlet 50a, an air-heating-side refrigerant outlet 50b, a non-air-heating-side refrigerant outlet 50c, a switching valve 50d, and a control valve 50e. The refrigerant inlet 50a is connected to the refrigerant outlet of the downstream indoor heat exchanger 31, and refrigerant flows from the downstream indoor heat exchanger 31 to the refrigerant inlet 50a. The air-heating-side refrigerant outlet 50b is connected to the refrigerant inlet of the upstream indoor heat exchanger 32 through the high-temperature refrigerant-dedicated pipe 44, and refrigerant flows into the upstream indoor heat exchanger 32 through the air-heating-side refrigerant outlet 50b. The non-air-heating-side refrigerant outlet 50c is connected to part of the heat pump device 20 other than the upstream indoor heat exchanger 32, specifically to an upstream part of the heat pump device 20 relative to a first expansion valve 52 in the flow direction of refrigerant, and refrigerant flows into such a part through the non-air-heating-side refrigerant outlet 50c.

The switching valve 50d of the high-pressure flow path switching valve 50 is a mechanical valve operated by the pressure of refrigerant on a refrigerant inlet side of the upstream indoor heat exchanger 32. When the pressure of refrigerant on the refrigerant inlet side of the upstream indoor heat exchanger 32 is lower than predetermined pressure, the switching valve 50d blocks the refrigerant inlet 50a and the non-air-heating-side refrigerant outlet 50c from communicating with each other. On the other hand, when the pressure of refrigerant on the refrigerant inlet side of the upstream indoor heat exchanger 32 reaches the predetermined pressure, the switching valve 50d allows the refrigerant inlet 50a and the non-air-heating-side refrigerant outlet 50c to communicate with each other, and is opened/closed such that refrigerant flows into the non-air-heating-side refrigerant outlet 50c. Since the pressure of refrigerant on the refrigerant inlet side of the upstream indoor heat exchanger 32 is substantially equal to the internal pressure of the upstream indoor heat exchanger 32, operation of the switching valve 50d can reduce an increase in internal pressure of the upstream indoor heat exchanger 32 beyond the predetermined pressure.

The predetermined pressure is set such that the maximum internal pressure of the upstream indoor heat exchanger 32 of the fourth embodiment is lower than the maximum internal pressure of an upstream indoor heat exchanger of a conventional heat pump device including no switching valve 50d.

Since a mechanical valve automatically opened/closed by refrigerant pressure without receiving an electrically-transmitted control signal is well-known, the detailed description of the structure of the switching valve 50d will be skipped.

The control valve 50e of the high-pressure flow path switching valve 50 is an electric three-way valve. The control valve 50e is controlled by an air conditioning control device 22, and is switchable between the state in which the control valve 50e causes the refrigerant inlet 50a and the air-heating-side refrigerant outlet 50b to communicate with each other and the state in which the control valve 50e causes the refrigerant inlet 50a and the non-air-heating-side refrigerant outlet 50c to communicate with each other.

A low-pressure flow path switching valve 51 is an electric three-way valve, and is controlled by the air conditioning control device 22. The low-pressure flow path switching valve 51 is provided in the middle of the main refrigerant pipe 43, and is connected to the second branched refrigerant pipe 46.

The first expansion valve 52 is disposed at part of the main refrigerant pipe 41 closer to the outdoor heat exchanger 33 relative to the high-pressure flow path switching valve 50. A second expansion valve 53 is disposed in the middle of the main refrigerant pipe 42. The low-temperature refrigerant-dedicated pipe 42a is part of the main refrigerant pipe 42 between the second expansion valve 53 and the inlet pipe of the upstream indoor heat exchanger 32.

A first check valve 54 is disposed in the middle of the low-temperature refrigerant-dedicated pipe 42a, and is configured to allow refrigerant to flow from the outdoor heat exchanger 33 toward the upstream indoor heat exchanger 32 in the low-temperature refrigerant-dedicated pipe 42a and to prevent refrigerant from flowing in an opposite direction.

A second check valve 55 is disposed in the middle of the first branched refrigerant pipe 45, and is configured to allow refrigerant to flow from the main refrigerant pipe 43 toward the main refrigerant pipe 41 in the first branched refrigerant pipe 45 and to prevent refrigerant from flowing in an opposite direction.

Figure 28:
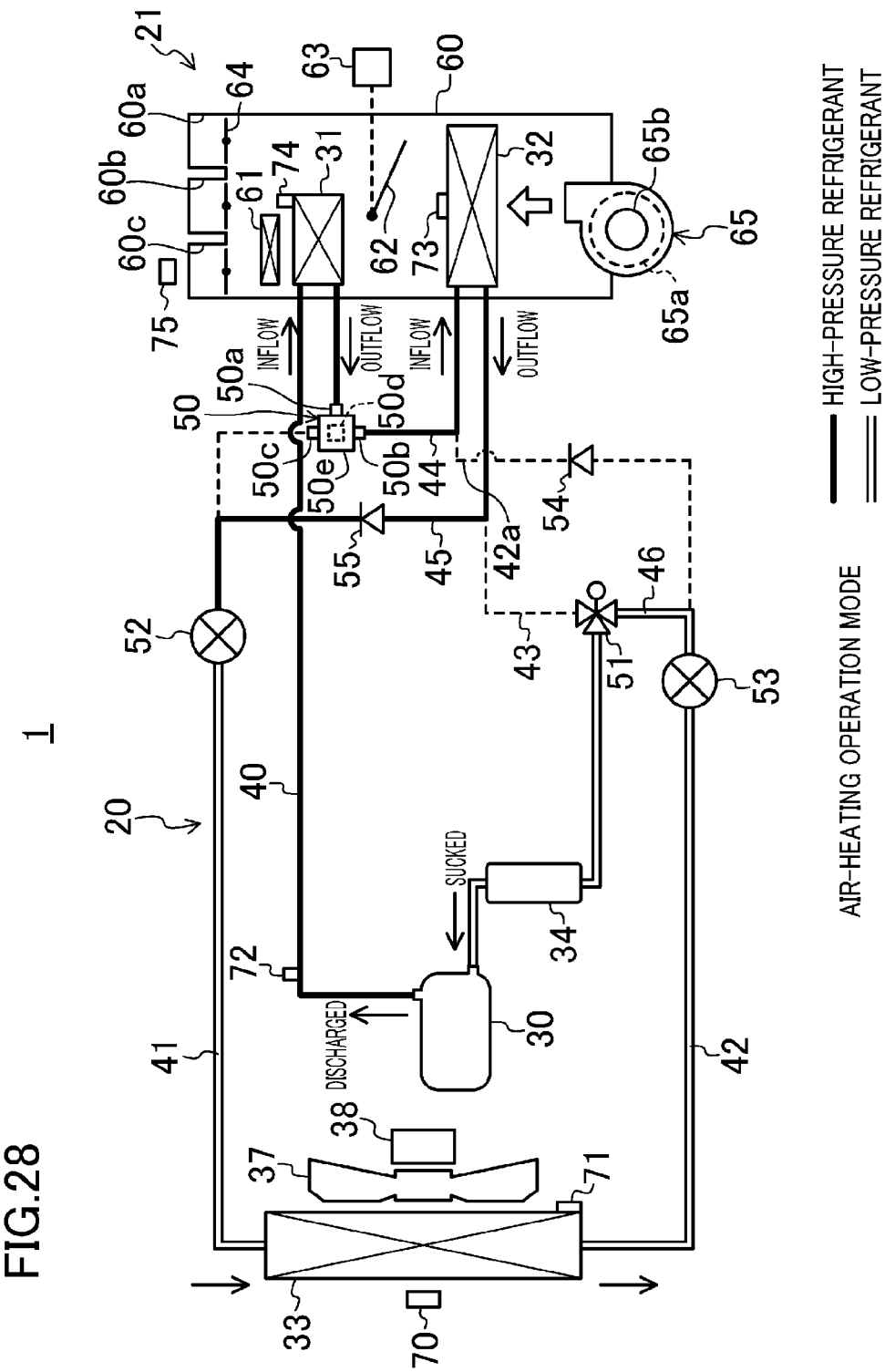
FIG. 28 is a diagram illustrating the case of an air-heating operation mode and corresponding to FIG. 27.

In an air-heating operation mode illustrated in FIG. 28, the high-pressure flow path switching valve 50 switches a flow path such that refrigerant flowing out from the downstream indoor heat exchanger 31 flows into the upstream indoor heat exchanger 32 through the refrigerant inlet thereof. Moreover, the low-pressure flow path switching valve 51 switches the flow path such that refrigerant flowing out from the outdoor heat exchanger 33 flows into an accumulator 34. The first expansion valve 52 is in an expansion state, and the second expansion valve 53 is in a non-expansion state.

Before an electric compressor 30 is operated, the pressure of refrigerant on the refrigerant inlet side of the upstream indoor heat exchanger 32 is lower than the predetermined pressure. Thus, the switching valve 50d of the high-pressure flow path switching valve 50 is automatically operated by such refrigerant pressure to block the refrigerant inlet 50a and the non-air-heating-side refrigerant outlet 50c from communicating with each other. Moreover, the control valve 50e of the high-pressure flow path switching valve 50 is operated to cause the refrigerant inlet 50a and the air-heating-side refrigerant outlet 50b to communicate with each other.

When the electric compressor 30 is operated in the foregoing state, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows from the main refrigerant pipe 41 to the high-temperature refrigerant-dedicated pipe 44 through the high-pressure flow path switching valve 50. Subsequently, the refrigerant flows into the upstream indoor heat exchanger 32 through the inlet pipe thereof, and circulates in the upstream indoor heat exchanger 32.

That is, since high-temperature refrigerant flows into the downstream indoor heat exchanger 31 and the upstream indoor heat exchanger 32 in the air-heating operation mode, air-conditioning air is heated by both of the downstream indoor heat exchanger 31 and the upstream indoor heat exchanger 32. As a result, a high air-heating capacity can be realized.

When the pressure of refrigerant on the refrigerant inlet side of the upstream indoor heat exchanger 32 increases to the predetermined pressure in the air-heating operation mode, the switching valve 50d of the high-pressure flow path switching valve 50 is automatically operated by such refrigerant pressure to cause the refrigerant inlet 50a and the non-air-heating-side refrigerant outlet 50c to communicate with each other. Communication between the refrigerant inlet 50a and the non-air-heating-side refrigerant outlet 50c causes part of refrigerant flowing into the refrigerant inlet 50a to bypass the upstream indoor heat exchanger 32 and to be supplied to the upstream side of the first expansion valve 52 in the flow direction of refrigerant through the non-air-heating-side refrigerant outlet 50c.

Since the internal pressure of the upstream indoor heat exchanger 32 can be maintained so as not to exceed the predetermined pressure, the pressure capacity and repetitive compression strength of the upstream indoor heat exchanger 32 of the fourth embodiment can be lower than those of an upstream indoor heat exchanger of a conventional heat pump device including no switching valve 50d.

Since only part of refrigerant bypasses the upstream indoor heat exchanger 32, the remaining high-temperature refrigerant can circulate in the upstream indoor heat exchanger 32. Thus, the air-heating capacity of the upstream indoor heat exchanger 32 can be ensured.

The refrigerant having circulated in the upstream indoor heat exchanger 32 flows from the main refrigerant pipe 43 to the main refrigerant pipe 41 through the second branched refrigerant pipe 45. The refrigerant flowing into the main refrigerant pipe 41 is expanded by passing through the first expansion valve 52, and flows into the outdoor heat exchanger 33. The refrigerant flowing into the outdoor heat exchanger 33 absorbs heat from outdoor air.

Since the refrigerant bypassing the upstream indoor heat exchanger 32 by the operation of the switching valve 50d of the high-pressure flow path switching valve 50 is directly supplied to the first expansion valve 52, a sufficient amount of heat absorbed by the outdoor heat exchanger 33 is ensured.

The refrigerant flowing out from the outdoor heat exchanger 33 passes through the main refrigerant pipe 42 and the second branched refrigerant pipe 46 in this order, and is sucked into the electric compressor 30 through the accumulator 34.

Figure 29:
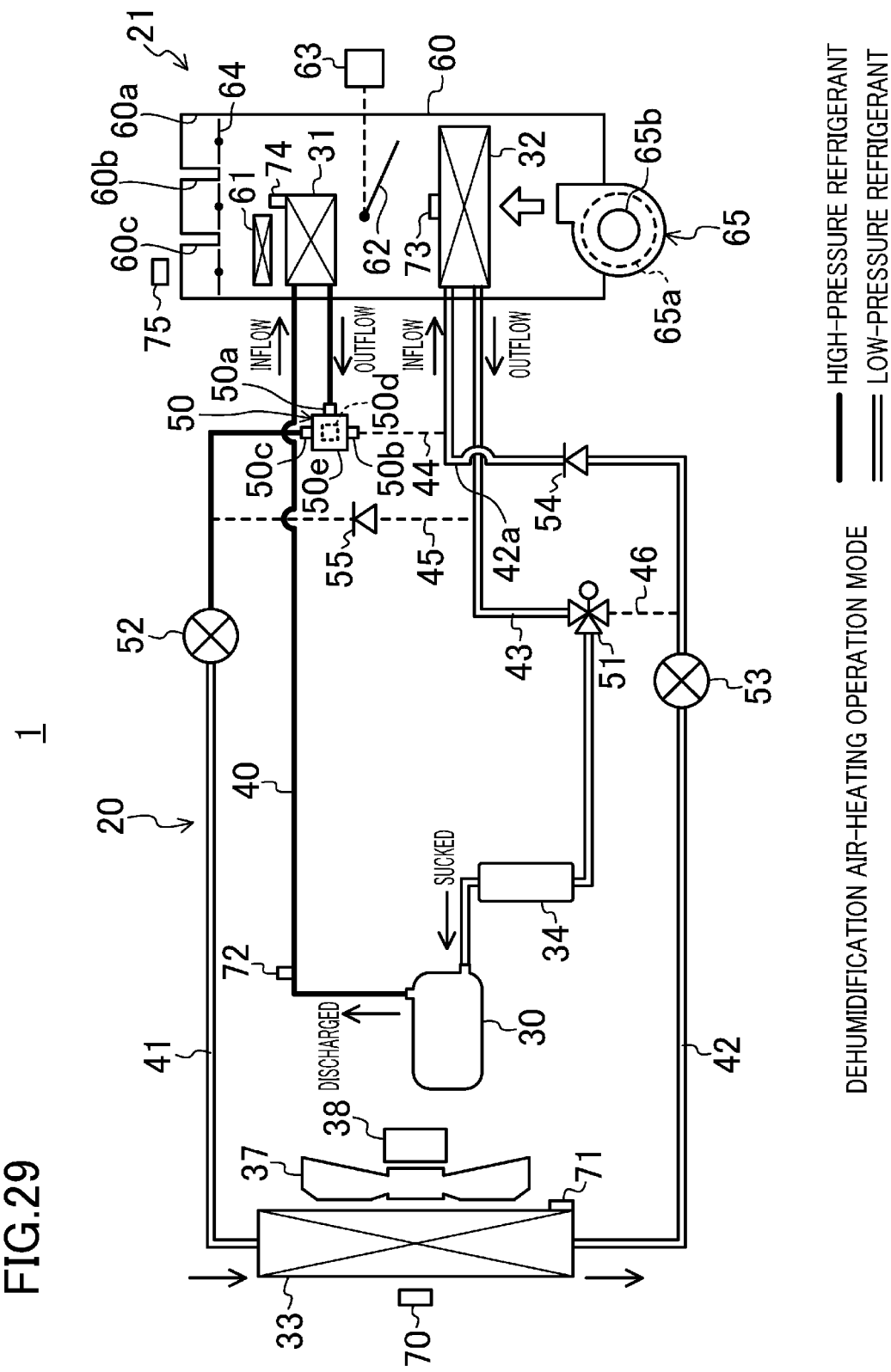
FIG. 29 is a diagram illustrating the case of a dehumidification air-heating operation mode and corresponding to FIG. 27.

In a dehumidification air-heating operation mode illustrated in FIG. 29, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 is expanded by passing through the first expansion valve 52 of the main refrigerant pipe 41, and flows into the outdoor heat exchanger 33. The refrigerant flowing into the outdoor heat exchanger 33 absorbs heat from outdoor air, and flows into the upstream indoor heat exchanger 32 after flowing through the main refrigerant pipe 42 and the low-temperature refrigerant-dedicated pipe 42a in this order. The refrigerant circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 30:
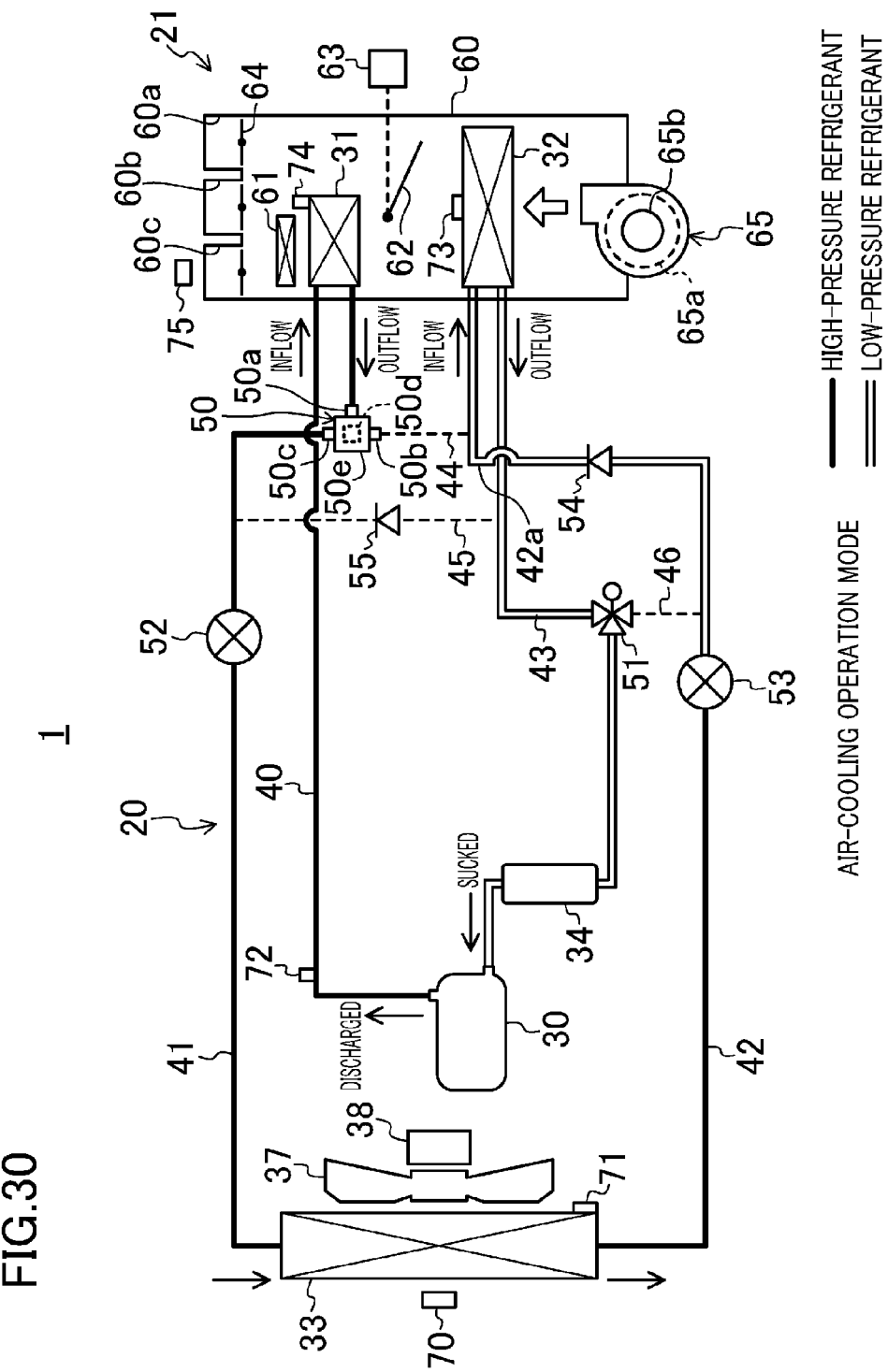
FIG. 30 is a diagram illustrating the case of an air-cooling operation mode and corresponding to FIG. 27.

In an air-cooling operation mode illustrated in FIG. 30, high-pressure refrigerant discharged from the electric compressor 30 flows into the downstream indoor heat exchanger 31 through the main refrigerant pipe 40, and circulates in the downstream indoor heat exchanger 31. The refrigerant having circulated in the downstream indoor heat exchanger 31 flows, without being expanded, into the outdoor heat exchanger 33 through the main refrigerant pipe 41. The refrigerant flowing into the outdoor heat exchanger 33 dissipates heat, and is expanded by passing through the second expansion valve 53 of the main refrigerant pipe 42. Subsequently, the refrigerant flows into the upstream indoor heat exchanger 32 through the low-temperature refrigerant-dedicated pipe 42a. Since low-pressure refrigerant flows into the upstream indoor heat exchanger 32 in the air-cooling operation mode, the pressure capacity and repetitive compression strength of the upstream indoor heat exchanger 32 can be low.

The refrigerant flowing into the upstream indoor heat exchanger 32 circulates in the upstream indoor heat exchanger 32 to absorb heat from air-conditioning air. The refrigerant having circulated in the upstream indoor heat exchanger 32 is sucked into the electric compressor 30 through the accumulator 34 of the main refrigerant pipe 43.

Figure 31:
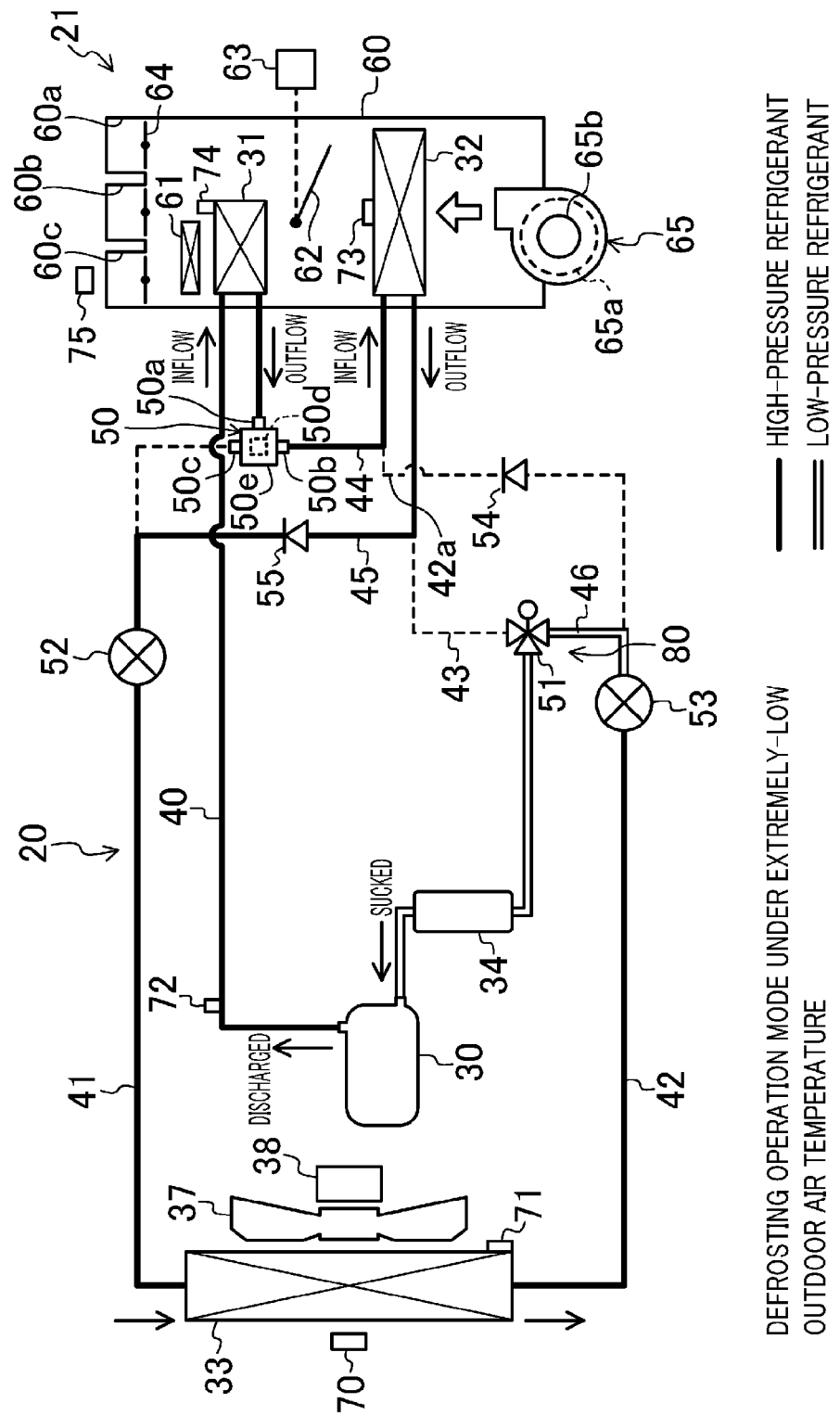
FIG. 31 is a diagram illustrating the case of a defrosting operation mode under extremely-low outdoor air temperature and corresponding to FIG. 27.

In a defrosting operation mode under extremely-low outdoor air temperature as illustrated in FIG. 31, the high-pressure flow path switching valve 50 and the low-pressure flow path switching valve 51 are in the same state as that of the air-heating operation mode. Moreover, the first expansion valve 52 is in the non-expansion state, and the second expansion valve 53 is in the expansion state. Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

Figure 32:
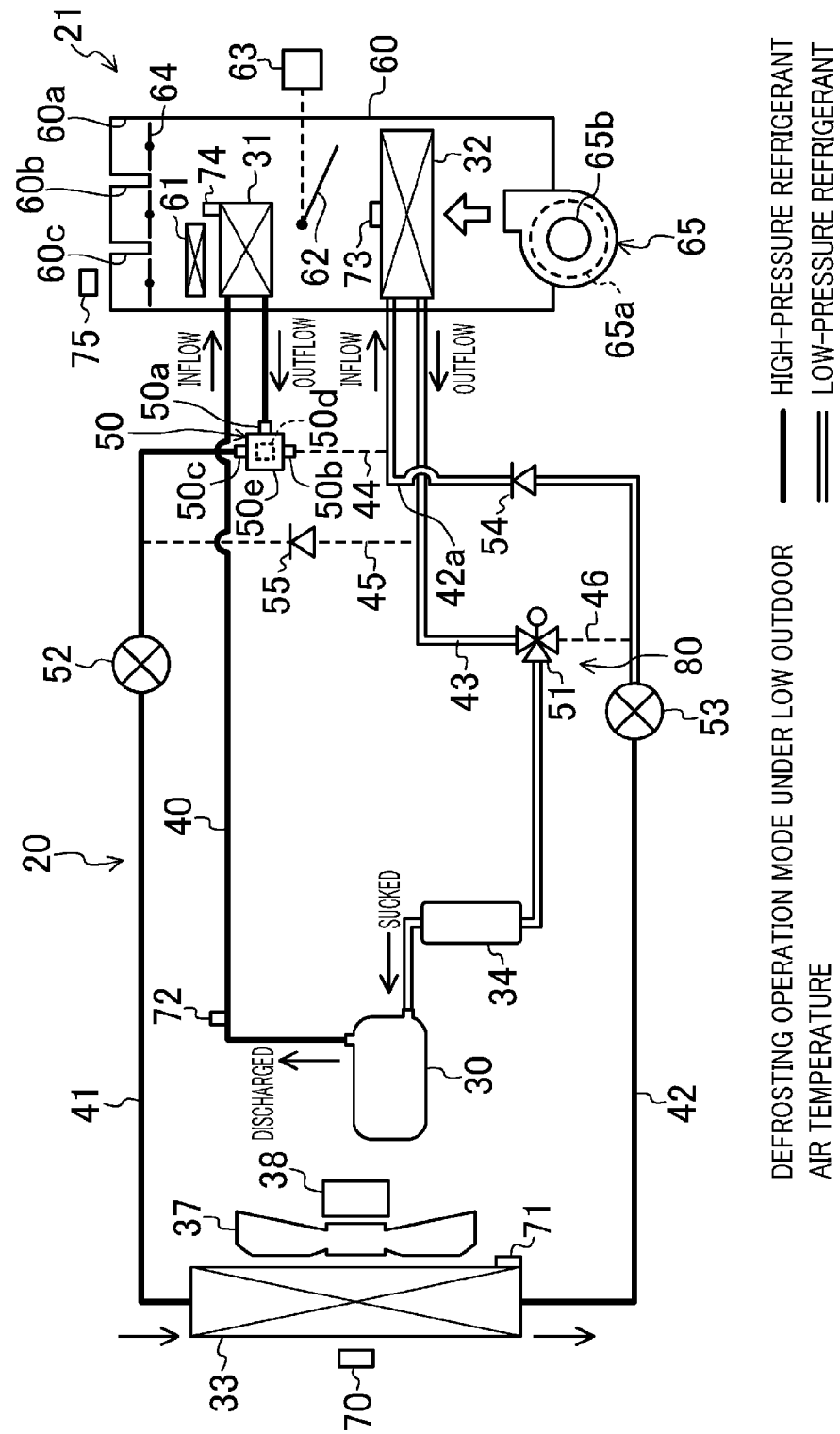
FIG. 32 is a diagram illustrating the case of a defrosting operation mode under low outdoor air temperature and corresponding to FIG. 27.

In a defrosting operation mode under low outdoor air temperature as illustrated in FIG. 32, the high-pressure flow path switching valve 50 and the low-pressure flow path switching valve 51 are in the same state as that of the dehumidification air-heating operation mode. Moreover, the first expansion valve 52 is in the non-expansion state, and the second expansion valve 53 is in the expansion state. Since the first expansion valve 52 is in the non-expansion state, high-temperature refrigerant flowing out from the downstream indoor heat exchanger 31 flows into the outdoor heat exchanger 33 in an unchanged form. Thus, the surface temperature of the outdoor heat exchanger 33 increases to melt frost.

As described above, according to the vehicle air conditioner 1 of the fourth embodiment, when the internal pressure of the upstream indoor heat exchanger 32 reaches the predetermined pressure in the air-heating operation mode in which the downstream and upstream indoor heat exchangers 31, 32 serve as radiators, refrigerant flows into part of the heat pump device 20 other than the upstream indoor heat exchanger 32. Thus, while an air-heating capacity in the air-heating operation mode is sufficiently increased, the pressure capacity and repetitive compression strength of the upstream indoor heat exchanger 32 serving as a heat absorber in the air-cooling operation mode can be low. Thus, cost can be reduced.

Since the switching valve 50d is the mechanical valve, cost can be further reduced with a simple configuration.

Refrigerant flowing out from the non-air-heating-side refrigerant outlet 50c is supplied to the first expansion valve 52 serving as a pressure reduction unit in the air-heating operation mode. Thus, while air-heating performance can be enhanced with a sufficient amount of heat absorbed by the outdoor heat exchanger 33 in the air-heating operation mode, an increase in pressure of the entirety of the heat pump device 20 can be reduced.

Fifth Embodiment

Figure 33:
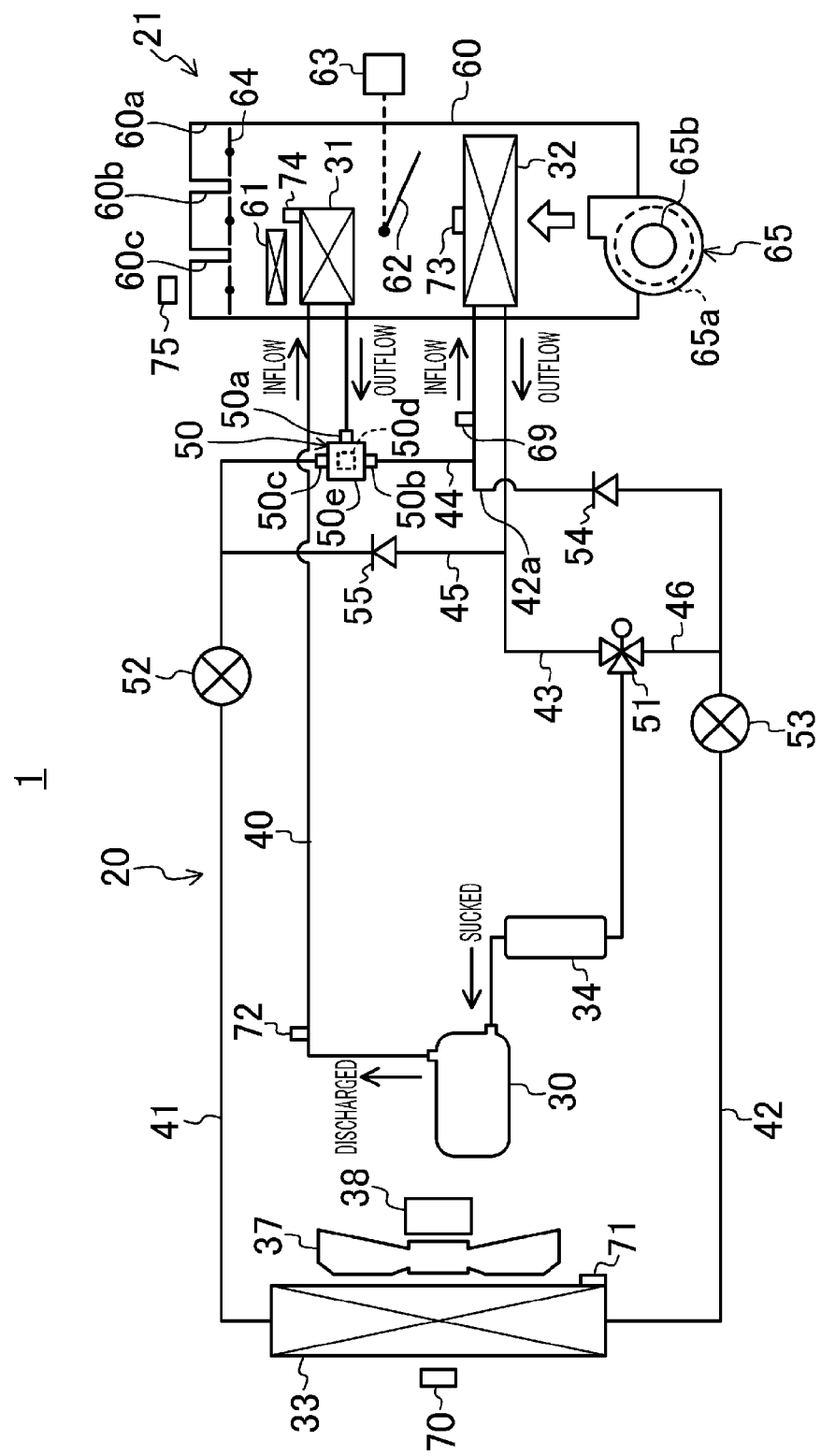
FIG. 33 is a schematic configuration diagram of a vehicle air conditioner of a fifth embodiment.

FIG. 33 is a schematic configuration diagram of a vehicle air conditioner 1 of a fifth embodiment of the present disclosure. The vehicle air conditioner 1 of the fifth embodiment is different from that of the fourth embodiment in that a switching valve 50d is electrically controlled. The same reference numerals as those shown in the fourth embodiment will be used to represent equivalent elements in the present embodiment, and the description thereof will not be repeated. Differences from the fourth embodiment will be described in detail.

A heat pump device 20 of the fifth embodiment includes a pressure sensor (corresponding to a pressure sensor of the present disclosure) 69 configured to determine the pressure of refrigerant on a refrigerant inlet side of an upstream indoor heat exchanger 32. The pressure sensor 69 is provided at a pipe connected to a refrigerant inlet of the upstream indoor heat exchanger 32, and is configured to determine the internal pressure of the pipe to obtain the pressure of refrigerant on the refrigerant inlet side of the upstream indoor heat exchanger 32. The pressure of refrigerant on the refrigerant inlet side of the upstream indoor heat exchanger 32 is substantially equal to the internal pressure of the upstream indoor heat exchanger 32. Note that the internal pressure of the upstream indoor heat exchanger 32 may be directly determined.

The pressure sensor 69 is connected to an air conditioning control device 22. The air conditioning control device 22 controls a switching valve 50d of a high-pressure flow path switching valve 50 based on the refrigerant pressure determined by the pressure sensor 69. Specifically, before the internal pressure of the upstream indoor heat exchanger 32 reaches predetermined pressure, the air conditioning control device 22 blocks a refrigerant inlet 50a and a non-air-heating-side refrigerant outlet 50c from communicating with each other. When it is determined that the internal pressure of the upstream indoor heat exchanger 32 reaches the predetermined pressure, the air conditioning control device 22 causes the refrigerant inlet 50a and the non-air-heating-side refrigerant outlet 50c to communicate with each other such that refrigerant flowing into the refrigerant inlet 50a flows through the non-air-heating-side refrigerant outlet 50c.

Since the switching valve 50d is, as just described, controlled during determination of the internal pressure of the upstream indoor heat exchanger 32 by the pressure sensor 69, the internal pressure of the upstream indoor heat exchanger 32 can be finely controlled. This realizes both of high air-heating performance and high durability of the upstream indoor heat exchanger 32.

According to the vehicle air conditioner 1 of the fifth embodiment, while an air-heating capacity in an air-heating operation mode can be sufficiently enhanced, the pressure capacity and repetitive compression strength of the upstream indoor heat exchanger 32 serving as a heat absorber in an air-cooling operation mode can be low as in the vehicle air conditioner 1 of the fourth embodiment. Thus, cost can be reduced.

In the fifth embodiment, when the internal pressure of the upstream indoor heat exchanger 32 reaches the predetermined pressure, refrigerant is supplied to a first expansion valve 52. However, the present disclosure is not limited to such a configuration. Refrigerant may be supplied to, e.g., a refrigerant inlet of a downstream indoor heat exchanger 31.

In the first to fifth embodiments, the case where the vehicle air conditioner 1 is mounted on the electric vehicle has been described. However, the present disclosure is not limited to such a case. The vehicle air conditioner 1 can be mounted on various types of automobiles such as hybrid vehicles each including an engine and a motor for running the vehicle.

As described above, the vehicle air conditioner of the present disclosure can be mounted on, e.g., an electric vehicle or a hybrid vehicle.

What is claimed is:

1. A vehicle air conditioner comprising:
    a heat pump device including
        a compressor configured to compress refrigerant,
        a first indoor heat exchanger disposed inside a vehicle compartment,
        a second indoor heat exchanger disposed upstream of the first indoor heat exchanger in a flow direction of air in the vehicle compartment, and
        an outdoor heat exchanger disposed outside the vehicle compartment; and
    an indoor air conditioning unit
        housing the first and second indoor heat exchangers,
        including an air blower configured to send air-conditioning air to the first and second indoor heat exchangers, and
        configured to generate conditioned air to supply the conditioned air into the vehicle compartment,
    wherein the heat pump device further includes an air conditioning control device configured to switch the heat pump device among a plurality of operation modes including
        an air-heating operation mode in which the first and second indoor heat exchangers serve as a radiator and the outdoor heat exchanger serves as a heat absorber and the refrigerant flows along a first refrigerant flow path which includes a main refrigerant pipe and a branch refrigerant pipe connected to the main refrigerant pipe in series such that the refrigerant flows from the second indoor heat exchanger to the outdoor heat exchanger through both the main refrigerant pipe and the branch refrigerant pipe, and
        an air-cooling operation mode in which the first indoor heat exchanger serves as a radiator, the second indoor heat exchanger serves as a heat absorber, and the outdoor heat exchanger serves as a radiator, and
        a first defrosting operation mode in which high-pressure refrigerant discharged from the compressor is guided to the outdoor heat exchanger while the first and second indoor heat exchangers serve as the radiators and
    the air conditioning control device is configured to
        switch a refrigerant flow path such that refrigerant is, in the air-cooling operation mode and the first defrosting operation mode, supplied to part of the outdoor heat exchanger serving as a refrigerant inlet in the air-heating operation mode, and
        switch the heat pump device from the air-heating operation mode to the first defrosting operation mode using a refrigerant flow path identical to the first refrigerant flow path used in the air-heating operation mode.

2. The vehicle air conditioner of claim 1, wherein
    the air conditioning control device is configured to further switch the heat pump device to
    a dehumidification air-heating operation mode in which the first indoor heat exchanger serves as a radiator and the second indoor heat exchanger and the outdoor heat exchanger serve as heat absorbers and the refrigerant flows along a second refrigerant flow path which includes a main refrigerant pipe and a branch pipe connected to the main refrigerant pipe in series such that the refrigerant flows from the first indoor heat exchanger to the outdoor heat exchanger through both the main refrigerant pipe and the branch pipe,
    a second defrosting operation mode in which high-pressure refrigerant discharged from the compressor is guided to the outdoor heat exchanger while the first indoor heat exchanger serves as the radiator and the second indoor heat exchanger serves as the heat absorber, and
    the air conditioning control device is configured to
    switch the refrigerant flow path such that refrigerant is, in the dehumidification air-heating operation mode and the second defrosting operation mode, supplied to the part of the outdoor heat exchanger serving as the refrigerant inlet in the air-heating operation mode, and
    switch the heat pump device to the second defrosting operation mode using a refrigerant flow path identical to the second refrigerant flow path used in the dehumidification air-heating operation mode.

* * * * *